(12) United States Patent
Cheney et al.

(10) Patent No.: US 11,279,996 B2
(45) Date of Patent: Mar. 22, 2022

(54) FULLY READABLE THERMAL SPRAY COATING

(71) Applicant: Oerlikon Metco (US) Inc., Westbury, NY (US)

(72) Inventors: Justin Lee Cheney, Encinitas, CA (US); Zubin Mody, San Diego, CA (US); David Jiang, San Diego, CA (US)

(73) Assignee: Oerlikon Metco (US) Inc., Westbury, NY (US)

(*) Notice: Subject to any disclaimer, the term of this patent is extended or adjusted under 35 U.S.C. 154(b) by 438 days.

(21) Appl. No.: 15/465,954

(22) Filed: Mar. 22, 2017

(65) Prior Publication Data

US 2017/0275748 A1  Sep. 28, 2017

Related U.S. Application Data

(60) Provisional application No. 62/311,757, filed on Mar. 22, 2016, provisional application No. 62/394,963, filed on Sep. 15, 2016.

(51) Int. Cl.

| | |
|---|---|
| *C23C 4/16* | (2016.01) |
| *C23C 24/04* | (2006.01) |
| *C23C 4/131* | (2016.01) |
| *C22C 38/58* | (2006.01) |
| *C22C 38/12* | (2006.01) |
| *C22C 38/22* | (2006.01) |
| *C22C 38/02* | (2006.01) |
| *C22C 38/56* | (2006.01) |
| *C22C 38/26* | (2006.01) |
| *C22C 38/00* | (2006.01) |
| *C22C 38/38* | (2006.01) |
| *B32B 15/01* | (2006.01) |
| *C22C 38/24* | (2006.01) |
| *C22C 38/08* | (2006.01) |
| *C22C 38/54* | (2006.01) |
| *C22C 38/04* | (2006.01) |
| *C22C 38/06* | (2006.01) |
| *C22C 38/46* | (2006.01) |
| *C22C 38/28* | (2006.01) |
| *C22C 38/34* | (2006.01) |
| *C22C 38/48* | (2006.01) |
| *C23C 4/06* | (2016.01) |

(52) U.S. Cl.
CPC .............. *C23C 4/16* (2013.01); *B32B 15/011* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/22* (2013.01); *C22C 38/24* (2013.01); *C22C 38/26* (2013.01); *C22C 38/28* (2013.01); *C22C 38/34* (2013.01); *C22C 38/38* (2013.01); *C22C 38/46* (2013.01); *C22C 38/48* (2013.01); *C22C 38/54* (2013.01); *C22C 38/56* (2013.01); *C22C 38/58* (2013.01); *C23C 4/06* (2013.01); *C23C 4/131* (2016.01); *C23C 24/04* (2013.01)

(58) Field of Classification Search
CPC ...................................................... C23C 4/131
See application file for complete search history.

(56) References Cited

U.S. PATENT DOCUMENTS

| | | |
|---|---|---|
| 2,043,952 A | 6/1936 | Ffield |
| 2,156,306 A | 5/1939 | Rapatz |
| 2,608,495 A | 8/1952 | Barry |
| 2,873,187 A | 2/1959 | Dyrkaez et al. |
| 2,936,229 A | 5/1960 | Shepard |
| 3,024,137 A | 3/1962 | Witherell |
| 3,113,021 A | 12/1963 | Witherell |
| 3,181,970 A | 5/1965 | Witherell et al. |
| 3,303,063 A | 2/1967 | Pietryka et al. |
| 3,448,241 A | 6/1969 | Buckingham et al. |
| 3,554,792 A | 1/1971 | Johnson |
| 3,650,734 A | 3/1972 | Kantor et al. |
| 3,843,359 A | 10/1974 | Fiene et al. |
| 3,859,060 A | 1/1975 | Eiselstein et al. |
| 3,942,954 A | 3/1976 | Frehn |
| 3,975,612 A | 8/1976 | Nakazaki et al. |
| 4,010,309 A | 3/1977 | Peterson |
| 4,017,339 A | 4/1977 | Okuda et al. |
| 4,042,383 A | 8/1977 | Petersen et al. |
| 4,066,451 A | 1/1978 | Rudy |

(Continued)

FOREIGN PATENT DOCUMENTS

| | | |
|---|---|---|
| CN | 101994076 | 3/2011 |
| CN | 102233490 A | 11/2011 |

(Continued)

OTHER PUBLICATIONS

Blau, Peter J . . . (1992). ASM Handbook, vol. 18—Friction, Lubrication, and Wear Technology. ASM International, p. 829-833. (Year: 1992).*
English machine translation of CN 102286702 A of Ding Liping published Dec. 2011 (Year: 2011).*
English machine translation of CN 104694840 A of Wang Lei published Jun. 2015 (Year: 2015).*
Tucker, R.C., 2013. ASM Handbook, vol. 5A, Thermal Spray Technology. ASM International. (Year: 2013).*
Tucker Jr., Robert C . . . (2013). ASM Handbook, vol. 05A—Thermal Spray Technology . ASM International. pp. 3-9, 32-53 (Year: 2013).*
Audouard, et al.: "Corrosion Performance and Field Experience With Super Duplex and Super Austenitic Stainless Steels in FGD Systems", Corrosion 2000; p. 4, table 2.

(Continued)

*Primary Examiner* — Jophy S. Koshy
(74) *Attorney, Agent, or Firm* — Knobbe Martens Olson & Bear, LLP

(57) ABSTRACT

Embodiments of an iron-based coating configured to be thermally sprayed are disclosed. The iron-based coatings can be fully readable, thus allowing for thickness measurements to be performed on the coating with standard magnetic measuring equipment. Further, the iron-based coating can have advantageous properties, such as high hardness, high wear resistance, and high adhesion strength.

13 Claims, 12 Drawing Sheets

(56) References Cited

U.S. PATENT DOCUMENTS

| | | | |
|---|---|---|---|
| 4,214,145 A | 7/1980 | Zvanut et al. | |
| 4,235,630 A | 11/1980 | Babu | |
| 4,255,709 A | 3/1981 | Zatsepium et al. | |
| 4,277,108 A | 7/1981 | Wallace | |
| 4,297,135 A | 10/1981 | Giessen et al. | |
| 4,365,994 A | 12/1982 | Ray | |
| 4,415,530 A | 11/1983 | Hunt | |
| 4,419,130 A | 12/1983 | Slaughter | |
| 4,576,653 A | 3/1986 | Ray | |
| 4,596,282 A | 6/1986 | Maddy et al. | |
| 4,606,977 A | 8/1986 | Dickson et al. | |
| 4,635,701 A | 1/1987 | Sare et al. | |
| 4,639,576 A | 1/1987 | Shoemaker et al. | |
| 4,666,797 A | 5/1987 | Newman et al. | |
| 4,673,550 A | 6/1987 | Dallaire et al. | |
| 4,762,681 A | 8/1988 | Tassen et al. | |
| 4,803,045 A | 2/1989 | Ohriner et al. | |
| 4,822,415 A | 4/1989 | Dorfman et al. | |
| 4,919,728 A | 4/1990 | Kohl et al. | |
| 4,981,644 A | 1/1991 | Chang | |
| 5,094,812 A | 3/1992 | Dulmaine et al. | |
| 5,252,149 A | 10/1993 | Dolman | |
| 5,306,358 A | 4/1994 | Lai et al. | |
| 5,375,759 A | 12/1994 | Hiraishi et al. | |
| 5,567,251 A | 10/1996 | Peker et al. | |
| 5,570,636 A | 11/1996 | Lewis | |
| 5,618,451 A | 4/1997 | Ni | |
| 5,820,939 A | 10/1998 | Popoola et al. | |
| 5,837,326 A | 11/1998 | Dallaire | |
| 5,858,558 A | 1/1999 | Zhao et al. | |
| 5,861,605 A | 1/1999 | Ogawa et al. | |
| 5,907,017 A | 5/1999 | Ober et al. | |
| 5,935,350 A | 8/1999 | Raghu et al. | |
| 5,942,289 A | 8/1999 | Jackson | |
| 5,988,302 A | 11/1999 | Sreshta et al. | |
| 6,117,493 A | 9/2000 | North | |
| 6,171,222 B1 | 1/2001 | Lakeland et al. | |
| 6,210,635 B1 | 4/2001 | Jackson et al. | |
| 6,232,000 B1 | 5/2001 | Singh et al. | |
| 6,326,582 B1 | 12/2001 | North | |
| 6,331,688 B1 | 12/2001 | Hallén et al. | |
| 6,332,936 B1 | 12/2001 | Hajaligo et al. | |
| 6,375,895 B1 | 4/2002 | Daemen | |
| 6,398,103 B2 | 6/2002 | Hasz et al. | |
| 6,441,334 B1 | 8/2002 | Aida et al. | |
| 6,582,126 B2 | 6/2003 | North | |
| 6,608,286 B2 | 8/2003 | Jiang | |
| 6,669,790 B1 | 12/2003 | Gundlach et al. | |
| 6,689,234 B2 | 2/2004 | Branagan | |
| 6,702,905 B1 | 3/2004 | Qiao et al. | |
| 6,702,906 B2 | 3/2004 | Ogawa et al. | |
| 6,750,430 B2 | 6/2004 | Kelly | |
| 7,052,561 B2 | 5/2006 | Lu et al. | |
| 7,219,727 B2 | 5/2007 | Slack et al. | |
| 7,285,151 B2 | 10/2007 | Sjodin et al. | |
| 7,361,411 B2 | 4/2008 | Daemen et al. | |
| 7,491,910 B2 | 2/2009 | Kapoor et al. | |
| 7,553,382 B2 | 6/2009 | Branagan et al. | |
| 7,569,286 B2 | 8/2009 | Daemen et al. | |
| 7,754,142 B2 * | 7/2010 | Liang | C22C 38/48 420/12 |
| 7,776,451 B2 | 8/2010 | Jiang et al. | |
| 7,935,198 B2 | 5/2011 | Branagan et al. | |
| 8,070,894 B2 | 12/2011 | Branagan | |
| 8,097,095 B2 | 1/2012 | Branagan | |
| 8,153,935 B2 | 4/2012 | Jang et al. | |
| 8,187,529 B2 | 5/2012 | Powell | |
| 8,187,725 B2 | 5/2012 | Kiser et al. | |
| 8,268,453 B2 | 9/2012 | Dallaire | |
| 8,474,541 B2 | 7/2013 | Branagan et al. | |
| 8,562,759 B2 | 10/2013 | Cheney et al. | |
| 8,562,760 B2 | 10/2013 | Cheney et al. | |
| 8,640,941 B2 | 2/2014 | Cheney | |
| 8,647,449 B2 | 2/2014 | Cheney et al. | |
| 8,658,934 B2 | 2/2014 | Branagan et al. | |
| 8,662,143 B1 | 3/2014 | Foster | |
| 8,702,835 B2 | 4/2014 | Yu et al. | |
| 8,703,046 B2 | 4/2014 | Hanejko et al. | |
| 8,704,134 B2 | 4/2014 | Branagan et al. | |
| 8,777,090 B2 | 7/2014 | Miller et al. | |
| 8,801,872 B2 | 8/2014 | Wright et al. | |
| 8,808,471 B2 | 8/2014 | Wright et al. | |
| 8,858,675 B2 | 10/2014 | Larsson | |
| 8,870,997 B2 | 10/2014 | Klekovkin et al. | |
| 8,911,662 B2 | 12/2014 | Larsson | |
| 8,920,938 B2 | 12/2014 | Hesse et al. | |
| 8,973,806 B2 | 3/2015 | Cheney | |
| 8,992,659 B2 | 3/2015 | Larsson et al. | |
| 9,051,635 B2 | 6/2015 | Jou | |
| 9,095,932 B2 | 8/2015 | Miller et al. | |
| 9,145,598 B2 | 9/2015 | Oshchepkov | |
| 9,174,293 B2 | 11/2015 | Lee | |
| 9,193,011 B2 | 11/2015 | Mars et al. | |
| 9,233,419 B2 | 1/2016 | Gries | |
| 9,255,309 B2 | 2/2016 | Aimone | |
| 9,309,585 B2 | 4/2016 | Cheney et al. | |
| 9,314,848 B2 | 4/2016 | Larsson | |
| 9,340,855 B2 | 5/2016 | Schade et al. | |
| 9,394,591 B2 | 7/2016 | Deodeshmukh et al. | |
| 9,399,907 B2 | 7/2016 | Mo et al. | |
| 9,469,890 B2 | 10/2016 | Bengtsson | |
| 9,540,711 B2 | 1/2017 | Fifield | |
| 9,580,773 B2 | 2/2017 | Aimone et al. | |
| 9,738,959 B2 | 8/2017 | Cheney et al. | |
| 2001/0019781 A1 | 9/2001 | Hasz | |
| 2002/0054972 A1 | 5/2002 | Charpentier et al. | |
| 2002/0098298 A1 | 7/2002 | Bolton et al. | |
| 2002/0148533 A1 | 10/2002 | Kim et al. | |
| 2004/0062677 A1 | 4/2004 | Chabenat et al. | |
| 2004/0079742 A1 | 4/2004 | Kelly | |
| 2004/0115086 A1 | 6/2004 | Chabenat et al. | |
| 2004/0206726 A1 | 10/2004 | Daemen et al. | |
| 2005/0047952 A1 | 3/2005 | Coleman | |
| 2005/0109431 A1 | 5/2005 | Kernan et al. | |
| 2006/0063020 A1 | 3/2006 | Barbezat | |
| 2006/0093752 A1 | 5/2006 | Darolia et al. | |
| 2006/0191606 A1 | 8/2006 | Ogawa et al. | |
| 2006/0260583 A1 | 11/2006 | Abi-Akar et al. | |
| 2007/0029295 A1 | 2/2007 | Branagan | |
| 2007/0090167 A1 | 4/2007 | Arjakine et al. | |
| 2007/0187369 A1 | 8/2007 | Menon et al. | |
| 2007/0219053 A1 | 9/2007 | Barufka et al. | |
| 2007/0253856 A1 | 11/2007 | Vecchio et al. | |
| 2007/0284018 A1 | 12/2007 | Hamano et al. | |
| 2008/0001115 A1 | 1/2008 | Qiao et al. | |
| 2008/0031769 A1 | 2/2008 | Yeh | |
| 2008/0149397 A1 | 6/2008 | Branagan | |
| 2008/0241580 A1 | 10/2008 | Kiser et al. | |
| 2008/0241584 A1 | 10/2008 | Daemen et al. | |
| 2008/0253918 A1 * | 10/2008 | Liang | C22C 38/42 420/12 |
| 2009/0017328 A1 | 1/2009 | Katoh et al. | |
| 2009/0123765 A1 | 5/2009 | Branagan | |
| 2009/0258250 A1 | 10/2009 | Daemen et al. | |
| 2009/0285715 A1 | 11/2009 | Arjakine et al. | |
| 2010/0009089 A1 | 1/2010 | Junod et al. | |
| 2010/0028706 A1 | 2/2010 | Hornschu et al. | |
| 2010/0044348 A1 | 2/2010 | Buchmann | |
| 2010/0101780 A1 | 4/2010 | Ballew et al. | |
| 2010/0155236 A1 | 6/2010 | Lee et al. | |
| 2010/0166594 A1 | 7/2010 | Hirata et al. | |
| 2010/0189588 A1 | 7/2010 | Kawatsu et al. | |
| 2010/0258217 A1 | 10/2010 | Kuehmann | |
| 2011/0004069 A1 | 1/2011 | Ochs et al. | |
| 2011/0064963 A1 | 3/2011 | Cheney et al. | |
| 2011/0139761 A1 | 6/2011 | Sugahara et al. | |
| 2011/0142713 A1 | 6/2011 | Kawasaki et al. | |
| 2011/0162612 A1 | 7/2011 | Qiao et al. | |
| 2011/0171485 A1 | 7/2011 | Kawamoto et al. | |
| 2011/0220415 A1 | 9/2011 | Jin et al. | |
| 2012/0055903 A1 | 3/2012 | Izutani et al. | |
| 2012/0103456 A1 | 5/2012 | Smith et al. | |
| 2012/0156020 A1 | 6/2012 | Kottilingam et al. | |
| 2012/0160363 A1 | 6/2012 | Jin et al. | |

(56) References Cited

U.S. PATENT DOCUMENTS

| | | |
|---|---|---|
| 2012/0288400 A1 | 11/2012 | Hirata et al. |
| 2013/0094900 A1 | 4/2013 | Folkmann et al. |
| 2013/0167965 A1 | 4/2013 | Cheney et al. |
| 2013/0224516 A1 | 8/2013 | Kusinski et al. |
| 2013/0260177 A1 | 10/2013 | Wallin et al. |
| 2013/0266798 A1 | 10/2013 | Cheney |
| 2013/0294962 A1 | 11/2013 | Wallin et al. |
| 2014/0024509 A1 | 1/2014 | Gerschefske |
| 2014/0044587 A1 | 2/2014 | Crook et al. |
| 2014/0044617 A1 | 2/2014 | Dreisinger |
| 2014/0006531 A1 | 3/2014 | Cheney |
| 2014/0060707 A1 | 3/2014 | Wright et al. |
| 2014/0105780 A1 | 4/2014 | Cheney |
| 2014/0131338 A1 | 5/2014 | Postle |
| 2014/0171367 A1 | 6/2014 | Murthy et al. |
| 2014/0219859 A1 | 8/2014 | Cheney |
| 2014/0234154 A1 | 8/2014 | Cheney et al. |
| 2014/0248509 A1 | 9/2014 | Cheney et al. |
| 2014/0263248 A1 | 9/2014 | Postle |
| 2014/0295194 A1 | 10/2014 | Yoshitaka et al. |
| 2014/0322064 A1 | 10/2014 | Gerk et al. |
| 2014/0356223 A1 | 12/2014 | Nilsson et al. |
| 2015/0004337 A1 | 1/2015 | Zimmermann et al. |
| 2015/0075681 A1 | 3/2015 | Wright et al. |
| 2015/0086413 A1 | 3/2015 | Wolverton et al. |
| 2015/0106035 A1 | 4/2015 | Vecchio et al. |
| 2015/0147591 A1 | 5/2015 | Cheney |
| 2015/0152994 A1 | 6/2015 | Bondil et al. |
| 2015/0252631 A1 | 9/2015 | Miller |
| 2015/0275341 A1 | 10/2015 | Cheney |
| 2015/0284817 A1 | 10/2015 | Snyder et al. |
| 2015/0284829 A1 | 10/2015 | Cheney |
| 2015/0298986 A1 | 10/2015 | Billieres et al. |
| 2015/0307968 A1 | 10/2015 | Mars et al. |
| 2015/0367454 A1 | 12/2015 | Cheney |
| 2016/0001368 A1 | 1/2016 | Gries et al. |
| 2016/0002752 A1 | 1/2016 | Srivastava et al. |
| 2016/0002764 A1 | 1/2016 | Gries et al. |
| 2016/0017463 A1 | 1/2016 | Cheney |
| 2016/0024621 A1 | 1/2016 | Cheney |
| 2016/0024624 A1 | 1/2016 | Cheney |
| 2016/0024628 A1 | 1/2016 | Cheney |
| 2016/0040262 A1 | 2/2016 | Snyder et al. |
| 2016/0083830 A1 | 3/2016 | Cheney |
| 2016/0114392 A1 | 4/2016 | Berg et al. |
| 2016/0138144 A1 | 5/2016 | Olsérius |
| 2016/0168670 A1 | 6/2016 | Cheney |
| 2016/0195216 A1 | 7/2016 | Bondil et al. |
| 2016/0201169 A1 | 7/2016 | Vecchio |
| 2016/0201170 A1 | 7/2016 | Vecchio |
| 2016/0215374 A1 | 7/2016 | Schade et al. |
| 2016/0222490 A1 | 8/2016 | Wright et al. |
| 2016/0243616 A1 | 8/2016 | Gries |
| 2016/0258044 A1 | 9/2016 | Litström et al. |
| 2016/0289001 A1 | 10/2016 | Shibata et al. |
| 2016/0289798 A1 | 10/2016 | Deodeshmukh et al. |
| 2016/0289799 A1 | 10/2016 | Crook et al. |
| 2016/0289803 A1 | 10/2016 | Cheney |
| 2016/0329139 A1 | 11/2016 | Jayaraman |
| 2016/0376686 A1 | 12/2016 | Jou |
| 2017/0009324 A1 | 1/2017 | Crook et al. |
| 2017/0014865 A1 | 1/2017 | Kusinski et al. |
| 2017/0044646 A1 | 2/2017 | Gong et al. |
| 2017/0066090 A1 | 3/2017 | Eibl |
| 2017/0067138 A1 | 3/2017 | Vecchio et al. |
| 2017/0080531 A1 | 3/2017 | Cheney |

FOREIGN PATENT DOCUMENTS

| | | |
|---|---|---|
| CN | 102286702 A * | 12/2011 |
| CN | 102357750 A | 2/2012 |
| CN | 104694840 A * | 6/2015 |
| CN | 104805391 | 7/2015 |
| DE | 27 54 437 | 7/1979 |
| DE | 33 20 513 | 12/1983 |
| DE | 42 02 828 | 8/1993 |
| EP | 0 365 884 | 5/1990 |
| EP | 1 270 755 | 1/2003 |
| EP | 1 338 663 | 8/2003 |
| EP | 2 305 415 | 8/2003 |
| EP | 1 857 204 | 11/2007 |
| EP | 2 064 359 | 6/2009 |
| EP | 2 388 345 | 11/2011 |
| EP | 2 628 825 | 8/2013 |
| EP | 2 660 342 | 11/2013 |
| EP | 2 072 627 | 4/2014 |
| EP | 2 730 355 | 5/2014 |
| EP | 2 743 361 | 6/2014 |
| EP | 2 104 753 | 7/2014 |
| EP | 2 778 247 | 9/2014 |
| EP | 2 563 942 | 10/2015 |
| EP | 3 034 637 | 6/2016 |
| EP | 2 235 225 | 10/2016 |
| EP | 3 093 858 | 11/2016 |
| EP | 2 890 823 | 3/2017 |
| GB | 2 153 846 A | 8/1985 |
| IN | MUMNP-2003-00842 | 4/2005 |
| JP | 47-1685 | 1/1972 |
| JP | 58-132393 | 8/1983 |
| JP | 60-133996 A | 7/1985 |
| JP | 63-026205 A | 2/1988 |
| JP | 03-133593 A | 6/1991 |
| JP | 03-248799 | 11/1991 |
| JP | 2008-261329 | 10/2008 |
| JP | 2012-000616 | 1/2012 |
| JP | 2015-083715 | 4/2015 |
| JP | 2015-526596 | 9/2015 |
| KR | 10-0935816 B1 | 1/2010 |
| TW | 200806801 A | 2/2008 |
| WO | WO 1984/000385 | 2/1984 |
| WO | WO 1984/004760 | 12/1984 |
| WO | WO 2006/086350 | 8/2006 |
| WO | WO 07/120194 | 10/2007 |
| WO | WO 2008/011448 | 5/2008 |
| WO | WO 2008/082353 | 7/2008 |
| WO | WO 2010/044740 | 4/2010 |
| WO | WO 2010/046224 | 4/2010 |
| WO | WO 2010/074634 | 7/2010 |
| WO | WO 2011/021751 | 2/2011 |
| WO | WO 2011/071054 | 6/2011 |
| WO | WO 2011/158706 | 12/2011 |
| WO | WO 2012/021186 | 2/2012 |
| WO | WO 2012/022874 | 2/2012 |
| WO | WO 2012/112844 | 8/2012 |
| WO | WO 2013/055652 | 4/2013 |
| WO | WO 2013/060839 | 5/2013 |
| WO | WO 2013/101561 | 7/2013 |
| WO | WO 2013/102650 | 7/2013 |
| WO | WO 2013/126134 | 8/2013 |
| WO | WO 2014/001544 | 1/2014 |
| WO | WO 2014/023646 | 2/2014 |
| WO | WO 2014/081491 | 5/2014 |
| WO | WO 2014/083544 | 6/2014 |
| WO | WO 2014/085319 | 6/2014 |
| WO | WO 2014/090922 | 6/2014 |
| WO | WO 2014/114714 | 7/2014 |
| WO | WO 2014/114715 | 7/2014 |
| WO | WO 2014/187867 | 11/2014 |
| WO | WO 2014/197088 | 12/2014 |
| WO | WO 2014/201239 | 12/2014 |
| WO | WO 2014/202488 | 12/2014 |
| WO | WO 2015/028358 | 3/2015 |
| WO | WO 2015/049309 | 4/2015 |
| WO | WO 2015/075122 | 5/2015 |
| WO | WO 2015/183955 | 12/2015 |
| WO | WO 2016/003520 | 1/2016 |
| WO | WO 2016/010599 | 1/2016 |
| WO | WO 2016/124532 | 8/2016 |
| WO | WO 2016/131702 | 8/2016 |

(56) References Cited

OTHER PUBLICATIONS

Branagan, et al.: Developing extreme hardness (>15GPa) in iron based nanocomosites, Composites Part A: Applied Science and Manufacturing, Elsevier Science Publishers B.V., Amsterdam, NL, vol. 33, No. 6, Jun. 1, 2002, pp. 855-859.

Chen et al.: "Characterization of Microstructure and Mechanical Properties of High Chromium Cast Irons Using SEM and Nanoindentation," JMEPEG 2015 (published online Oct. 30, 2014), vol. 24(1), pp. 98-105.

Cheney, et al.: "Development of quaternary Fe-based bulk metallic glasses," Materials Science and Engineering, vol. 492, No. 1-2, Sep. 25, 2008, pp. 230-235.

Cheney: Modeling the Glass Forming Ability of Metals. A Dissertation submitted in partial satisfaction of the Requirements for the degree of Doctor of Philosophy. University of California, San Diego. Dec. 2007.

Cr—C Phase Diagram [online], [retrieved on Jan. 27, 2015]. Retrieved from the Internet: http://www.azom.com/work/3ud2quvLOU9g4VBMjVEh_files/image002.gif.

Davis, Jr, ed. Stainless steels. ASM International, 1994; p. 447. http://www.crct.polymtl.ca/fact/documentation/BINARY/C-Nb.jpg>.

Iron-Carbon (Fe—C) Phase diagram [online], [retrieved on Jan. 27, 2014]. Retrieved from the internet: <URL:http://www.calphad.com/iron-carbon.html>.

Khalifa, et al.: "Effect of Mo—Fe substitution on glass forming ability, thermal stability, and hardness of Fe—C—B—Mo—Cr—W bulk amorphous alloys," Materials Science and Engineering, vol. 490, No. 1-2, Aug. 25, 2008, pp. 221-228.

Miracle, D.B.: The efficient cluster packing model—An atomic structural model for metallic glasses, Acta Materialia vol. 54, Issue 16, Sep. 2006, pp. 4317-4336.

Mo—C Phase Diagram [online], [retrieved on Feb. 27, 2015]. Retrieved from the internet: <URL: http://factsage.cn/fact/documentation/SGTE/C-Mo.jpg>.

Nb—C Phase Diagram [online], [retrieved on Feb. 27, 2015]. Retrieved from the internet: <URL: http://www.crct.polymtl.ca/fact/documentation/BINARY/C-Nb.jpg>.

Tillack, et al.: "Selection of Nickel, Nickel-Copper, Nickel-Cromium, and Nickel-Chromium-Iron Allows", ASM Handbook, Welding, Brazing and Soldering, vol. 6,Dec. 1, 1993 (Dec. 1, 1993) pp. 586-592, XP008097120, p. 589.

Titanium-Boron (TiB) Phase Diagram [online], [retrieved on Jan. 27, 2015]. Retrieved from the internet:<URL:http://www.calphad.com/titaniumboron.html>.

Yoo et al.: "The effect of boron on the wear behavior of iron-based hardfacing alloys for nuclear power plants valves," Journal of Nuclear Materials 352 (2006) 90-96.

International Search Report and Written Opinion re PCT Application No. PCT/US17/023629, dated Jul. 7, 2017.

\* cited by examiner

FULLY READABLE THERMAL SPRAY COATING

INCORPORATION BY REFERENCE TO ANY PRIORITY APPLICATIONS

This Application claims from the benefit of U.S. Provisional Application No. 62/311,757, filed Mar. 22, 2016, titled "FULLY READABLE THERMAL SPRAY COATING," and U.S. Provisional Application No. 62/394,963, filed Sep. 15, 2016, titled "FULLY READABLE THERMAL SPRAY COATING," the entirety of each of which is incorporated herein by reference.

BACKGROUND

Field

This disclosure generally relates to low magnetism iron-based alloys able to be thermally sprayed onto a substrate for use in corrosion and erosion environments while maintaining the ability to monitor the coating thickness using magnetic thickness gauges.

Description of the Related Art

There are many techniques utilized in thermal spraying a coating including twin wire arc spray (TWAS), high velocity oxygen spray (HVOF), plasma spray, combustion spray and detonation gun spray. While all of the methods are similar, TWAS is considered the simplest.

Alloy wires, either solid, metal, or flux cored, can be used as the feedstock for the twin wire arc spray process. As the spray wire is fed into the gun, it is melted into small particles. For example, two wires are simultaneously fed through the spray gun each applied with opposite voltage. The voltage gap arcs the two wires at a connection point in the gun, melting the wire at the tip. A gas stream is then applied behind the melt interface to atomize and spray the resultant liquid metal droplets onto a substrate to form a coating. Specifically, the particles are accelerated towards the substrate and impact in a semi-molten state. Upon impact, the particles flatten on top of the substrate or previously flattened particles, forming a mechanical bond. These layers of flattened particles also consist of small amounts of porosity and oxides between particles. The particle velocity can reach up to 100 m/s in TWAS and 600 m/s in Plasma and HVOF. The typical particle temperatures are between 1800-3500° C., though thermal spray has lower heat input compared to weld overlay because if the heat input is high, the substrate can experience embrittlement or dimensional warping.

Thermal spray coatings provide many benefits to harsh corrosion environments. For example, they can allow the use of boilers and tubes manufactured from inexpensive materials for the bulk of the part, while coating with a specialized corrosion resistant material capable of extended service life. Over time, the coating slowly corrodes and, rather than replace the entire boiler, a new layer of coating can be applied potentially extending the life of the boiler indefinitely.

The industry demand still remains for a "readable" thermal spray, which is typically executed with a paint gauge thickness measurement device such as an Elcometer 456 or similar. However, not all coating alloys are suitable for this technique. For example, few, if any, iron based thermal spray coatings are able to be measured using magnetic thickness gages as these conventional iron based coatings are magnetic. Thus, nickel-based coatings, which are typically non-magnetic, are used as they can be read with this technique. However, nickel-based materials are significantly more expensive than Fe-based materials. Therefore, due to the relative low cost and potential performance benefits of iron based alloys in comparison with nickel based alloys, there is a need for Fe-based readable alloys.

Further, currently used coatings which are able to be magnetically measured utilize an amorphous microstructure. In amorphous materials, the crystalline structure in normal metal alloys is prevented from forming by both alloying elements and cooling rate. A large amount of alloying elements of varying atomic sizes can cause random bonding within the metal and can prevent the formation of crystalline grains. If the cooling rate is sufficiently high, then a crystalline structure is also prevented from forming.

Additionally, in the alloys currently used for sprayed coatings, they remain "readable" at low temperatures below 600° C. If the operable temperature is above this, then devitrification occurs where the amorphous structure transforms into a nano-crystalline structure and loses is readability.

SUMMARY

Disclosed herein are embodiments of a thermal spray wire configured to form a coating by thermal spray, the thermal spray wire comprising an outer sheath and a powder core within the outer sheath, wherein the outer sheath and the powdered core combined comprise an alloy having an FCC-BCC transition temperature at or below 950K, at least 10 wt. % total solute element content, a total volume fraction of magnetic phases at 500° C. of below 50%, and a hard phase fraction sum of 20% or greater.

In some embodiments of the above-disclosed thermal spray wires, the outer sheath and the powder core can have a combined alloy composition of Fe and, in wt. %: C: about 2.9 to about 5; Cr: about 11.9 to about 19; Ni: about 17 to about 19; V: about 0 to about 2; Al: about 0 to about 2; Mn: about 0 to about 1.5; and Si: about 0 to about 0.5. In some embodiments of the above-disclosed thermal spray wires, the outer sheath and the powder core can have a combined alloy composition of Fe and, in wt. %: C: about 4.75 to about 5; Cr: about 17 to about 19; Ni: about 15 to about 19; V: about 1.25 to about 2.75; Al: about 0.75 to about 2.75; Mn: about 0.25 to about 2.25; and Si: about 0.1 to about 0.9. In some embodiments of the above-disclosed thermal spray wires, the outer sheath and the powder core can have a combined alloy composition of Fe and, in wt. %: C: about 4.76, Cr about 18.09, Mn about 1.03, Ni about 17.2, Si about 0.31, V about 1.9, Al about 1.92; C: about 5, Cr about 11.9, Mn about 1, Ni about 17, Si about 0.31, V about 1.9, Al about 1.9; or C: about 2.9, Cr about 13.3, Mn about 1, Ni about 19, Si about 0.23. In some embodiments of the above-disclosed thermal spray wires, the outer sheath and the powder core can have a combined alloy composition of Fe and, in wt. %: B: 2.4-3; C: 2-3; Cr: 0-12; Mn: 2-12; Nb: 0-4; Ni: 10-20; and Mn+Ni: 14-24.

Disclosed herein are embodiments of an Fe-based thermal spray coating formed from a thermal spray wire having an outer sheath and a powder core, the coating comprising an iron-based matrix, wherein the coating is fully readable, or fully readable, with a magnetic thickness gauge, and wherein the iron-based matrix comprises 50% or more austenite after exposure to temperatures between 500-800° C. for at least 24 hours and cooled at a rate of 1° C./s or less.

Further disclosed herein are embodiments of a thermal spray coating formed from an alloy, the coating comprising an iron-based matrix, and at least 5 wt. % elemental solute within the matrix, wherein the coating is non-magnetic and is fully readable with a magnetic thickness gauge, wherein the alloy has a thermodynamic stable transition from austenite to ferrite at 950 K or below, and wherein the sum of thermodynamically magnetic phases at 500° C. is at or below 0.5 mole fraction.

In some embodiments of the above-disclosed thermal spray coatings, the coating can have a high abrasion resistance as characterized by ASTM G65B mass loss of 1.4 grams or less. In some embodiments of the above-disclosed thermal spray coatings, the coating can have a wear loss of 0.6 g as measured according to ASTM G65 procedure B.

In some embodiments of the above-disclosed thermal spray coatings, the coating can have an adhesion strength of 5,000 psi or higher. In some embodiments of the above-disclosed thermal spray coatings, the coating can exhibit less than 200 mg loss in hot erosion testing at 600° C. and a 30° impingement angle.

In some embodiments of the above-disclosed thermal spray coatings, a thickness of the coating can be measured within 30% standard deviation in measurement by a magnetic thickness gauge after heating between 500-800° C. for at least 24 hours. In some embodiments of the above-disclosed thermal spray coatings, a thickness of the coating can be measured within 20% standard deviation in measurement by a magnetic thickness gauge after heating between 500-800° C. for at least 24 hours. In some embodiments of the above-disclosed thermal spray coatings, a thickness of the coating can be measured within 25% standard deviation in measurement by a magnetic thickness gauge after heating between 500-800° C. for at least 24 hours.

In some embodiments of the above-disclosed thermal spray coatings, the alloy can exhibit a thermodynamic stable transition from austenite to ferrite at 900 K or below. In some embodiments of the above-disclosed thermal spray coatings, a total volume fraction of magnetic phases in the coating can be below 50%. In some embodiments of the above-disclosed thermal spray coatings, the matrix can have over 90% austenite by volume and at least one non-magnetic oxide inclusion. In some embodiments of the above-disclosed thermal spray coatings, the coating can have a microhardness of 400 Vickers or higher.

In some embodiments of the above-disclosed thermal spray coatings, the iron based matrix can comprise 50% or more austenite after exposure to temperatures between 500-800° C. for at least 24 hours. In some embodiments of the above-disclosed thermal spray coatings, a thickness of the coating can be read by the magnetic thickness gauge within 30% of a 0-1 micrometer measurement after heating between 500-800° C.

Also disclosed herein are embodiments of a method of coating a substrate, the method comprising thermally spraying a cored wire having an outer sheath and an inner core onto a substrate, wherein the cored wire forms a coating on the substrate comprising a microstructure having at least 50% or more austenite as-sprayed, and wherein the coating comprises at least 50% or more austenite after exposure to temperatures between 500-800° C. for at least 24 hours and cooled at a rate of 1° C./s or less.

In some embodiments of the above-disclosed methods, a combination of the outer sheath and the powder core has an alloy composition of Fe and, in wt. %: C: about 2.9 to about 5; Cr: about 11.9 to about 19; Ni: about 17 to about 19; V: about 0 to about 2; Al: about 0 to about 2; Mn: about 0 to about 1.5; and Si: about 0 to about 0.5. In some embodiments of the above-disclosed methods, a combination of the outer sheath and the powder core has an alloy composition of Fe and, in wt. %: C: about 4.75 to about 5; Cr: about 17 to about 19; Ni: about 15 to about 19; V: about 1.25 to about 2.75; Al: about 0.75 to about 2.75; Mn: about 0.25 to about 2.25; and Si: about 0.1 to about 0.9. In some embodiments of the above-disclosed methods, a combination of the outer sheath and the powder core has an alloy composition of Fe and, in wt. %: C: about 4.76, Cr about 18.09, Mn about 1.03, Ni about 17.2, Si about 0.31, V about 1.9, Al about 1.92; C: about 5, Cr about 11.9, Mn about 1, Ni about 17, Si about 0.31, V about 1.9, Al about 1.9; or C: about 2.9, Cr about 13.3, Mn about 1, Ni about 19, Si about 0.23. In some embodiments of the above-disclosed methods, a combination of the outer sheath and the powder core has an alloy composition of Fe and, in wt. %: B: 2.4-3; C: 2-3; Cr: 0-12; Mn: 2-12; Nb: 0-4; Ni: 10-20; and Mn+Ni: 14-24.

In some embodiments of the above-disclosed methods, a thickness of the coating can be measured within 30% standard deviation in measurement by a magnetic thickness gauge after heating between 500-800° C. for at least 24 hours. In some embodiments of the above-disclosed methods, a thickness of the coating can be measured within 25% standard deviation in measurement by a magnetic thickness gauge after heating between 500-800° C. for at least 24 hours. In some embodiments of the above-disclosed methods, a thickness of the coating can be measured within 20% standard deviation in measurement by a magnetic thickness gauge after heating between 500-800° C. for at least 24 hours.

Further disclosed are components in power generation equipment that can at least be partially coated by the above disclosed coatings, with the above disclosed thermal spray wires, or using the above-disclosed methods.

DETAILED DESCRIPTION

Figure 1:
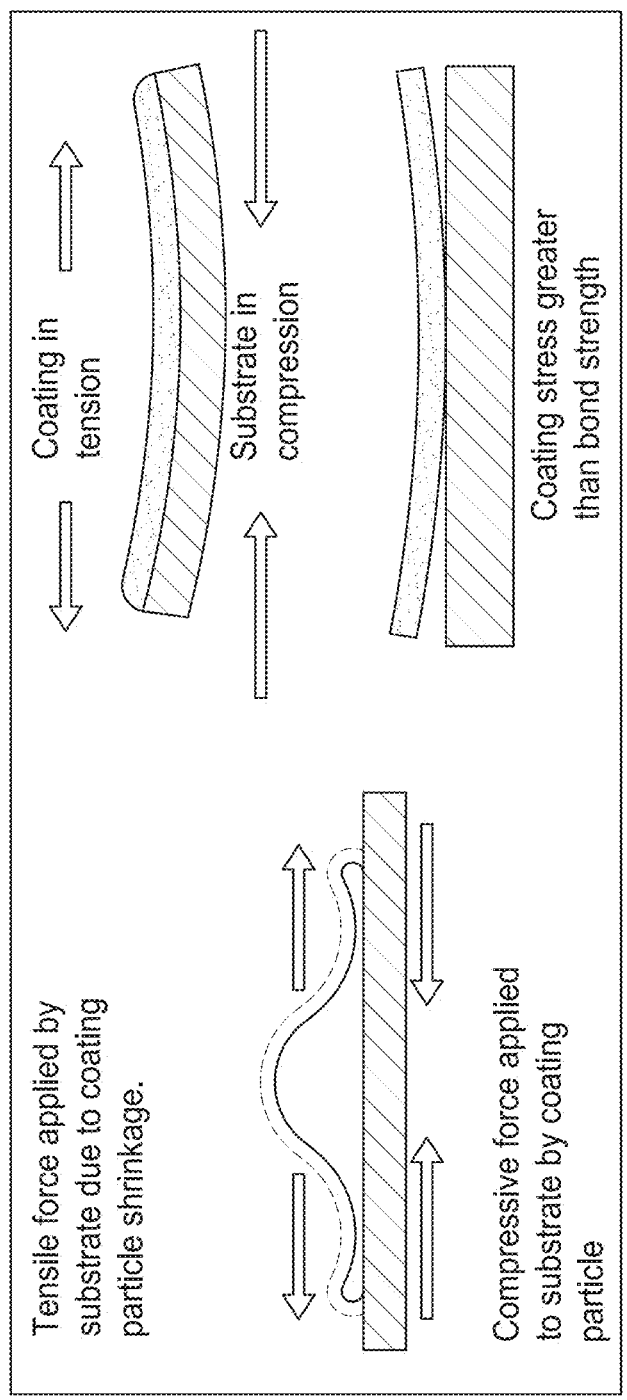
FIG. 1 is an illustration of the stresses experienced by a thermal spray coating and how they cause delamination.

The alloys disclosed herein can be used for the formation of coatings, particular those having advantageous physical properties while remaining readable to magnetic sensors. In some embodiments, the alloys can be iron-based alloys used in thermal spray coatings while still remaining magnetically readable.

In order to be readable, embodiments of the alloys listed in the present disclosure can be austenitic (e.g., face centered cubic (FCC) gamma-phase iron) and thus they are non-magnetic and do not interfere with magnetic thickness measurements. This allows quick measurement of many different locations during initial spraying without destructive testing to insure the correct thickness of coating is applied. It also allows for monitoring of the thickness during use to determine the remaining life of the coating.

Additionally, embodiments of the disclosed alloys can be used at high operation temperatures, which can be defined as the temperature in which the alloys remain austenitic as a coating (e.g., the melting temperature of the material). In some embodiments, the operating range for embodiments of the alloys can be from 0 to 1300° (or about 0 to about) 1300°, or generally between 0 and 0.95% of the melting temperature of the alloy (or between about 0 and about 0.95% of the melting temperature of the alloy).

In particular, some embodiments of the disclosure can exhibit "full readability" after exposure to the high temperatures, which may be experienced in critical and super critical boilers. Critical and super critical boilers may reach temperatures of about 500° C.-800° C. (or about 500 to about 800° C.) on the boiler wall. It is often difficult or impossible to know the operating temperature experienced on different sections of the boiler wall. Thus, it can be advantageous to use a similar calibration standard to read the coatings present at low temperature sections of the wall and high temperature sections of the wall. Coatings of this type may retain a substantial quantity of austenite after high temperature exposure, and thus have a relatively slow cooling to room temperature. Thermal spray alloys in which both the as-sprayed coating and the coating after exposure to high temperatures (e.g., between 500° C. (or about 500° C.) and 800° C. (or about 800° C.)) and slow cooling (for example a cooling rate of less than 1° C./s (or less than about 1° C./s)) can be read accurately and precisely using a similar calibration standard are defined as exhibiting "full readability".

For example, it is possible to achieve a reasonably accurate reading of certain alloys, such as the X3 coating discussed in detail below, if the Elcometer or similar measuring device (generally a dry film coating thickness gauge) is specifically calibrated to a heat treated coating of the particular alloy, such as X3, of a specific thickness. Such a process can enable accurate reading of the heat treated coating of that thickness only. However, as-sprayed coatings can have significantly different coating thicknesses throughout which will likely not be read accurately. Thus, since the thickness levels of a coating and the exposure temperature in a boiler are unknown, it can be advantageous to read coatings of various thicknesses and exposure temperatures via one common calibration step. Being able to read varied coatings after various exposure temperatures using one single common calibration standard is useful and defines the term "full readability" as used herein.

Thus, in some embodiments, a material can be fully readable if it can be read by an Elcometer, or similar magnetic measuring device, at various thicknesses and exposure temperatures via one calibration step.

Further, embodiments of the disclosed alloys can have high adhesion. With low adhesion, the coating can delaminate when exposed to large temperature changes due to thermal expansion mismatch with the substrate (see FIG. 1).

Also higher adhesion values allow for thicker coatings to be deposited which allows for longer service life with fewer replacements or repairs of the coatings. After a thermal spray coating is deposited, it remains in a state of tension. As coatings get thicker, this tension force increases and can exceed the adhesion strength of the coating, "peeling" away from the substrate.

Thermal sprays such as those disclosed herein can be used for many applications, but one specific application of interest for the present disclosure is industrial boilers, such as those used in coal power plants. These boilers are subject to extreme heat for extended periods of time. At the same time, there is ash and other combustion by-products released by the heating process which deposit on the boiler tubes and walls. Embodiments of the disclosed alloys can be advantageously used on industrial boilers.

The following terms will be used throughout the specification and will have the following meanings unless otherwise indicated.

Splat refers to the individual metal particle comprising the coating. The semi-molten metal sprayed from the thermal spray gun impacts the substrate or previously deposited particles, flattening and forming a mechanical bond.

Coating is the as-sprayed form of a metal onto a substrate for corrosion and/or erosion resistance. It is comprised of many splats layered together to form a layer with minimal porosity.

Adhesion refers to the mechanical bond between the thermal spray coating and the substrate.

Feedstock chemistry refers to the chemistry of the wire before it has been submitted to the twin wire arc spray process (or other thermal spray process). This can include the powder of a cored wire alone or the powder and the sheath of a cored wire in combination. Sheaths can be made of, for example, iron or steel. In some embodiments, the sheath can be a 300 series stainless steel such as 303 stainless steel. In some embodiments, the sheath can be a mild steel, such as a mild steel in a 420 series stainless steel.

Final coating chemistry refers to the chemistry of the coating after the wire has been melted and sprayed onto the substrate.

As disclosed herein, the term alloy can refer to the chemical composition forming a powder or wire feedstock used to form a metal component, the powder itself, the total composition of the powder and wire combination, and the composition of the metal component formed by the heating, sintering, and/or deposition of the powder or wire feedstock.

Thermal Spray Oxidation

In some embodiments, oxidation of elements during the thermal spray process, specifically the twin wire arc spray process, can affect the composition of the alloy and can make modelling inaccurate. Thus, the alloy can be modelled with a specified oxygen addition in order to predict the behavior of the alloy during the twin wire arc spray process. It has been determined through extensive experimentation, that 8 wt. % oxygen can be added to the alloy model in order to best predict the behavior of the twin wire arc spray process. This is further described in example 1 below. Oxygen is added to the model such that the relative ratio between elements in the computed alloy remains constant.

The oxygen addition to the model is used to account for the oxidation of certain elemental species during the thermal spray process. The oxidation reaction is not similar between all elements in the alloy, and certain elements will preferentially oxidize. This oxidation behavior is a key component in the understanding and design of thermal spray alloys.

The oxidation model described herein describes the process by which the feedstock alloy is transformed into the coating alloy. In the twin wire arc spray process, the feedstock alloy is in the form of two wires and contains a certain feedstock chemistry. During the twin wire arc spray process, these two wires are heated to above their melting temperature and sprayed through the air. During this step, the feedstock alloy will react with oxygen in the environment. The result of this oxidation reaction is the deposition of a coating chemistry onto the substrate which is different from the feedstock chemistry.

Figure 2:
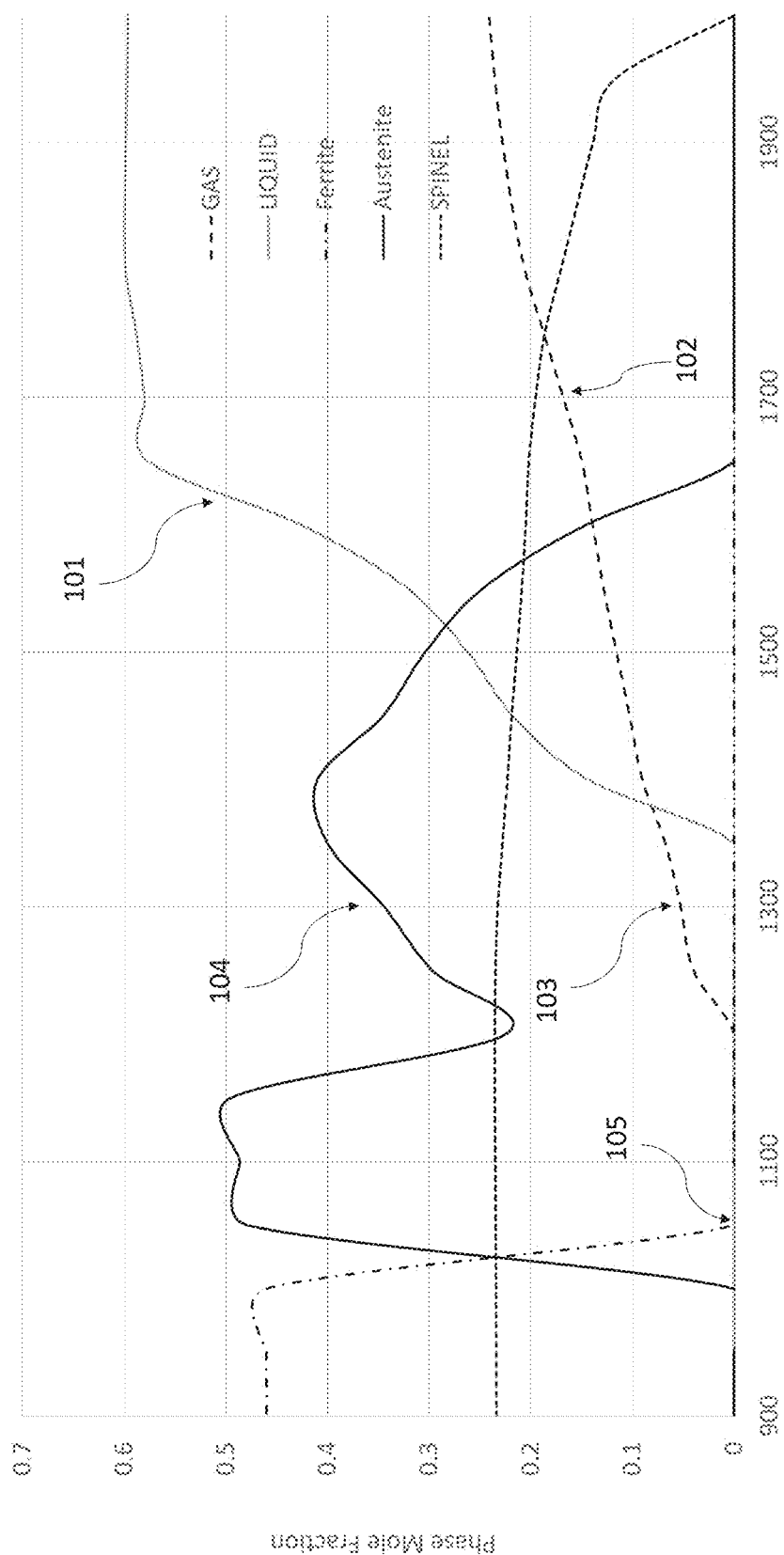
FIG. 2 shows a thermodynamic solidification model for Alloy X3.

The thermodynamic solidification model for Alloy X3 with 8 wt. % O added is shown in FIG. 2. This solidification diagram simulates the process by which a feedstock chemistry is melted, atomized, reacts with oxygen in the air, contacts the substrate, and finally cools to room temperature. Many oxides and secondary phases are present in this thermodynamic diagram so for clarity only specific phases are shown. As shown in FIG. 2, at extremely high temperatures, above 1900K, the alloy is composed of both a Fe-based liquid [101] and carbon dioxide gas [102]. Immediately, the effect of oxidation can be seen as carbon is oxidized and thereby removed from the feedstock composition. At 1900K the spinel oxide [103] begins to form which is a Cr, Mn, Al bearing oxide. Again, this oxidation effect will remove Al, Cr, and Mn from the feedstock chemistry and affect the coating chemistry and performance. At about 1600K, the austenite forms [104]. The austenite phase, depending on the alloy composition, may transition into ferrite [105] at a lower temperature.

FIG. 2 can thereby be used to separate the coating chemistry from the feedstock chemistry. As mentioned, FIG. 2 shows the preferential oxidation of certain elemental species into oxides such as carbon in $CO_2$ gas and Al, Mn, and Cr into a spinel. As these elements are oxidized, they are removed from the feedstock chemistry and no longer contribute to the microstructure of the coating chemistry itself.

Figure 11:
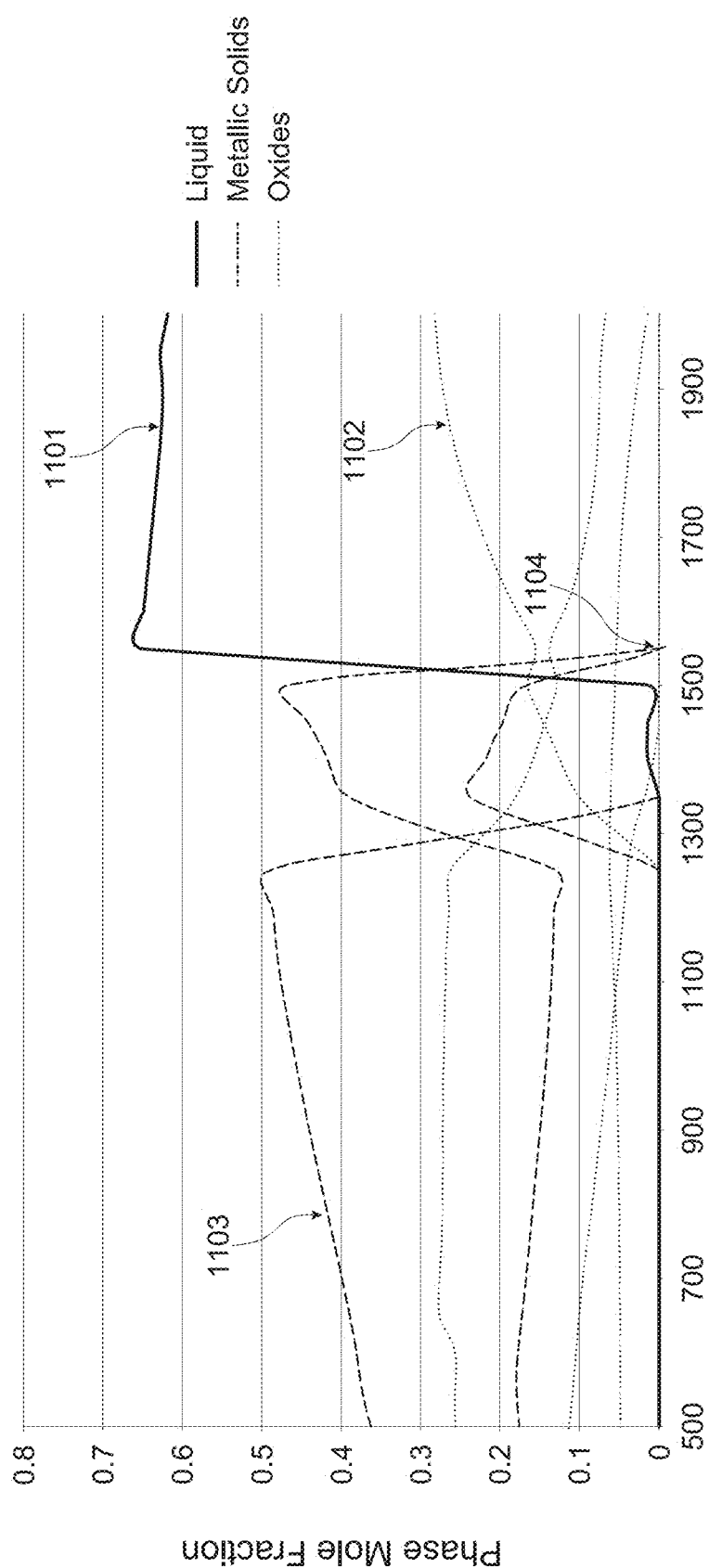
FIG. 11 shows a thermodynamic solidification model for Alloy X11 with 8% O added.

FIG. 11 shows the thermodynamic solidification model for Alloy X11 with 8% O added. This diagram distinguishes between three phase types: metallic liquid, metallic solid, and oxides (which can be present as solids, liquids, or gases). The liquid [1101] is present at high temperatures and is depicted by a solid black line. Oxides [1102] are present across the entire temperature range, are denoted by a dotted line and include $CO_2$ gas, and other solid oxides including corundum and spinel. The metallic solids [1103] are the phases of interest for understanding how the metallic coating ultimately performs. Again, the elemental phase of each solid is determined and a calculation is made to predict the coating chemistry, i.e. overall composition of the thermal spray splat after it has reacted with the air.

In some embodiments, the coating chemistry is the chemistry of the metallic liquid at one temperature step above the formation temperature of the first solid non-oxide phase. In some embodiments, the steps are approximately 50 K steps. In the example of FIG. 11, the first non-oxide solids form at 1550 K, and thus the coating chemistry is equal to the chemistry of the metallic liquid phase at 1600K.

In the case of Alloy X11 the coating chemistry is (in weight percent, balance Fe): C: 2.6, Cr: 13.2, Mn: 0.1, Ni: 19.6, V: 2.2. In some embodiments, the coating chemistry may be different than the wire chemistry as oxidation can reduce the elements. For example, the C in the wire chemistry can burn off in the process forming $CO_2$ and may not end up in the coating alloy.

Figure 12:
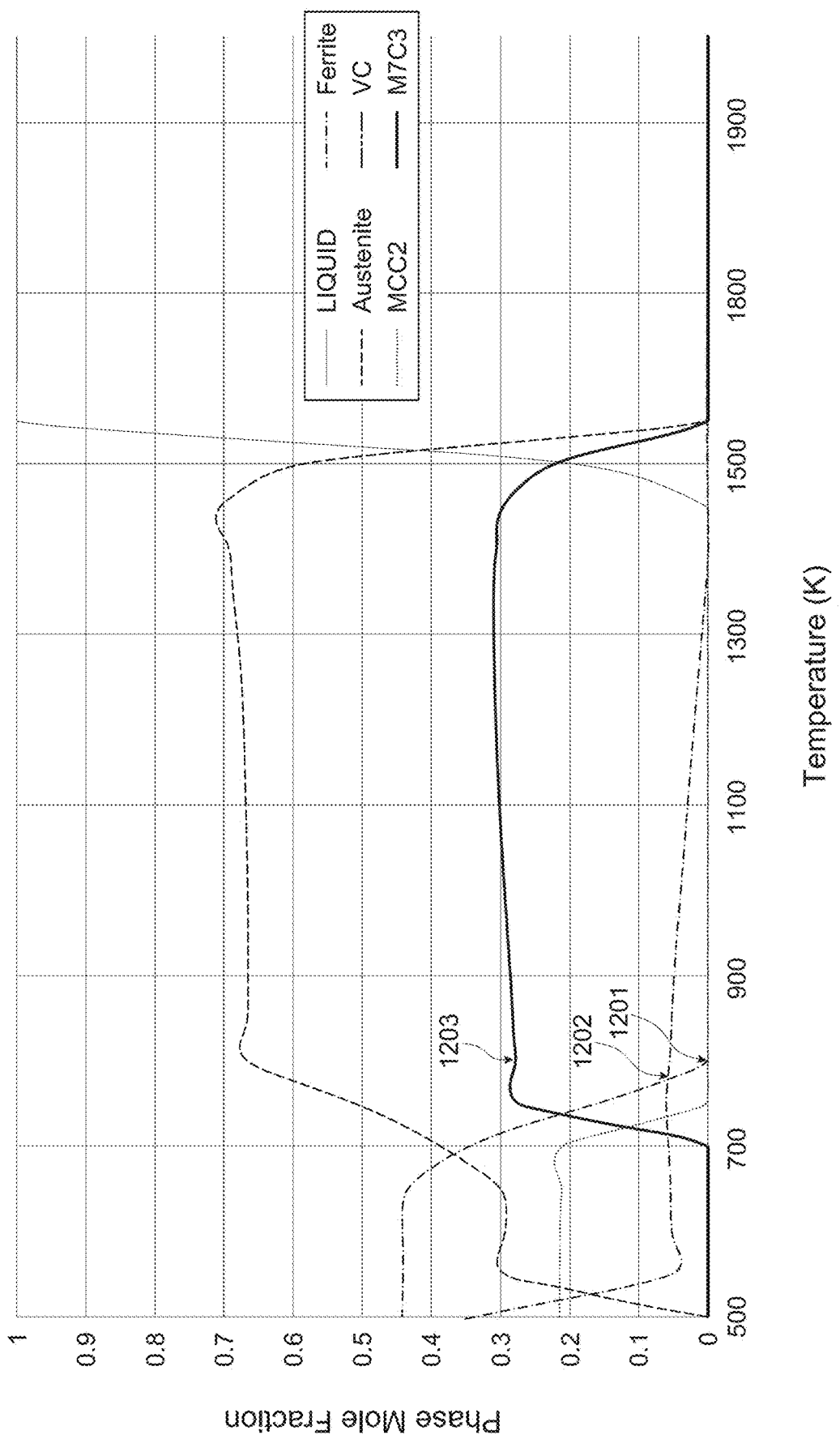
FIG. 12 shows a thermodynamic solidification model for a resultant coating chemistry of Alloy X11 after it has reacted with air.

FIG. 12 shows the thermodynamic solidification model for the resultant coating chemistry of Alloy X11 after it has reacted with air. In this case no oxygen is added, the model is now being used to predict the behavior of the coating as deposited. In summary, in order to understand the behavior of a single thermal spray alloy, in this case Alloy X11, two thermodynamic models are run as per below. The first chemistry is used to understand the behavior of the feedstock chemistry (within brackets) and the oxygen in the air during the thermal spray process. The second chemistry is calculated via the first thermodynamic model, and is the predicted coating chemistry. The coating chemistry is the result of certain elements in the feedstock wire preferentially reacting with oxygen to effectively form a different alloy. The coating chemistry is used to predict the performance of the alloy in service.

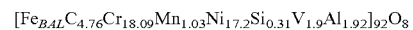

$$[Fe_{BAL}C_{4.76}Cr_{18.09}Mn_{1.03}Ni_{17.2}Si_{0.31}V_{1.9}Al_{1.92}]_{92}O_8 \qquad 1.$$

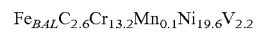

$$Fe_{BAL}C_{2.6}Cr_{13.2}Mn_{0.1}Ni_{19.6}V_{2.2} \qquad 2.$$

The coating chemistry dictates the actual performance of the coating. In some embodiments, the coating chemistry is used to predict the FCC-BCC transition temperature ($T_{\gamma\ to\ \alpha}$) and the solid solution strengthening behavior. If the feedstock chemistry is used to predict the $T_{\gamma\ to\ \alpha}$ and the solid solution strengthening behavior, then the predictions will be inaccurate. This inaccuracy can be demonstrated with the addition of Mn to an alloy. Mn is known to promote the formation of austenite. However, Mn is also known to oxidize very rapidly in air. Thus, a feedstock alloy containing Mn has some or all of the Mn oxidized during the thermal spray process. In this example, the coating alloy will no longer meet the thermodynamic criteria of this patent. This effect will specifically be shown in additional examples.

Alloy Composition

In some embodiments, alloys can be described by particular alloy compositions. Embodiments of chemistries of alloys within this disclosure are shown in Table 1. The chemistries disclosed within can be the combination of the sheath and the powder together for a cored wire.

TABLE 1

| Alloys manufactured into cored wire for thermal spray trials | | | | | | | | | | |
|---|---|---|---|---|---|---|---|---|---|---|
| Alloy | Mn | Cr | Nb | V | C | B | W | Si | Ti | Ni | Al |
| X1 | 12 | 5 | 4 | 0.5 | 4 | 0 | 5 | 0 | 0.2 | 1 | 0 |
| X2 | 11.88 | 4.95 | 3.96 | 0.495 | 3.96 | 0 | 4.95 | 0 | 0.198 | 2 | 0 |
| X3 | 12 | 5 | 4 | 0.5 | 4 | 0 | 5 | 0 | 0.2 | 2 | 1 |
| X4 | 12 | 5 | 4 | 0.5 | 4 | 0 | 5 | 0 | 0.2 | 0 | 2 |

In some embodiments, the alloys can be described by compositional ranges which meet the below disclosed thermodynamic criteria. In some embodiments, the alloy can comprise:

Al: 0-10 (or about 0 to about 10)
B: 0-3 (or about 0 to about 3)
C: 0-6 (or about 0 to about 6)
Mn: 0-16 (or about 0 to about 16)
Ni: 0-16 (or about 0 to about 16)
Si: 0-10 (or about 0 to about 10)

In some embodiments, the alloy may further comprise:
B+C: 1-6 (or about 1 to about 6)
Mn+Ni: 8-16 (or about 8 to about 16)
Al+Si: 0-14 (or about 0 to about 14)

In some embodiments, 0 wt. % Ni (or about 0 wt. % Ni) can be found in the alloy compositions. In some embodiments, 1-2 wt. % nickel can be used. In some embodiments, Mn can be exchanged out for Ni.

In some embodiments, the alloys can have a particular compositional ratio. For example, the alloy can have (Mn+Ni)/(Al+Si)=0.8 to 8 (or about 0.8 to about 8). This is the ratio of "austenite formers" to "ferrite stabilizing de-oxidizers," as discussed in detail below. However, it will be understood that Al and Si may not be in every alloy. For example, if high amounts of Mn+Ni (>10% or >about 10%) are used, Al+Si may not be used as there can be enough Mn and Ni in the final coating after oxidation takes place.

In some embodiments, the alloy can be described as having a austenitic (face centered cubic gamma phase) or semi-austenitic microstructure. In some embodiments, the alloy can have the microstructure in both the ingot and as-sprayed form and having a composition of, in wt. %: Mn: 10-18 (or about 10-about 18), Cr: 3-6 (or about 3-about 6), Nb: 3-6 (or about 3-about 6), V: 0-5 (or about 0-about 5), C: 2-5 (or about 2-about 5), W: 3-6 (or about 3-about 6), Ni: 0-3 (or about 0-about 3), Al: 0-3 (or about 0-about 3), Ti: 0-0.5 (or about 0-about 0.5) with the balance being Fe along with manufacturing impurities.

In some embodiments, the alloy can be any of the followings in wt. %:

TS4: Fe: bal, Mn: 12, Cr: 5, Nb: 4, V: 0.5, C: 4, W: 5, Ni: 0, Al: 2, Ti: 0.2 (or Fe: bal, Mn: about 12, Cr: about 5, Nb: about 4, V: about 0.5, C: about 4, W: about 5, Ni: about 0, Al: about 2, Ti: about 0.2)

TS3: Fe: bal, Mn: 12, Cr: 5, Nb: 4, V: 0.5, C: 4, W: 5, Ni: 2, Al: 1, Ti: 0.2 (or Fe: bal, Mn: about 12, Cr: about 5, Nb: about 4, V: about 0.5, C: about 4, W: about 5, Ni: about 2, Al: about 1, Ti: about 0.2)

TS2: Fe: bal, Mn: 12, Cr: 5, Nb: 4, V: 0.5, C: 4, W: 5, Ni: 2, Al: 0, Ti: 0.2 (or Fe: bal, Mn: about 12, Cr: about 5, Nb: about 4, V: about 0.5, C: about 4, W: about 5, Ni: about 2, Al: about 0, Ti: about 0.2)

TS1: Fe: bal, Mn: 12, Cr: 5, Nb: 4, V: 0.5, C: 4, W: 5, Ni: 1, Al: 0, Ti: 0.2 (or Fe: bal, Mn: about 12, Cr: about 5, Nb: about 4, V: about 0.5, C: about 4, W: about 5, Ni: about 1, Al: about 0, Ti: about 0.2)

In some embodiments, the alloys can be described as retaining a high fraction of austenite at 500° C. (or at about 500° C.) after reducing from a higher temperature (e.g., where the microstructure becomes "frozen" during cooling), which can enable them to be readable after high temperature exposure and thus "fully readable". Examples of such alloys are presented in Table 2. These alloys in Table 2 in some embodiments can be the wire chemistry.

TABLE 2

Alloys which exhibit "full readability" in wt. %, with Fe Balance.

| Alloy | B | C | Cr | Mn | Ni | Si | V | Al |
|---|---|---|---|---|---|---|---|---|
| X5 | 2.6 | 2.8 | 6 | 8 | 12 | 0 | 0 | 0 |
| X6 | 2.6 | 2.4 | 6 | 0 | 18 | 0 | 0 | 0 |
| X7 | 2.6 | 2.4 | 12 | 0 | 18 | 0 | 0 | 0 |
| X8 | 2.6 | 2.8 | 6 | 8 | 12 | 3.3 | 0 | 1.5 |
| X9 | 2.6 | 2.4 | 6 | 0 | 18 | 3.3 | 0 | 1.5 |
| X10 | 2.6 | 2.4 | 12 | 0 | 18 | 3.3 | 0 | 1.5 |
| X11 | 0 | 4.76 | 18.09 | 1.03 | 17.2 | 0.31 | 1.9 | 1.92 |
| X12 | 0 | 5 | 11.9 | 1 | 17 | 0.23 | 1.9 | 1.9 |
| X13 | 0 | 2.9 | 13.3 | 1 | 19 | 0.23 | 0 | 0 |

In some embodiments, the alloys can have a composition of Fe and, in wt. %:
B: 2.4-3 (or about 2.4 to about 3)
C: 2-3 (or about 2 to about 3)
Cr: 0-12 (or about 0 to about 12)
Mn: 2-12 (or about 2 to about 12)
Nb: 0-4 (or about 0 to about 4)
Ni: 10-20 (or about 10 to about 20)
Mn+Ni: 14-24 (or about 14 to about 24)

In some embodiments, the alloys can have a composition of Fe and, in wt. %:
C: 2.9-5 (or about 2.9 to about 5)
Cr: 11.9-19 (or about 11.9 to about 19)
Ni: 17-19 (or about 17 to about 19)
V: up to about 2 (or up to about 2)
Al: up to about 2 (or up to about 2)
Mn: up to about 1.5 (or up to about 1.5)
Si: up to about 0.5 (or up to about 0.5)

In some embodiments, the alloys can have a composition of Fe and, in wt. %:
C: 4.75 to 5 (or about 4.75 to about 5)
Cr: 17 to 19 (or about 17 to about 19)
Ni: 15 to 19 (or about 15 to about 19)
V: 1.25 to 2.75 (or about 1.25 to about 2.75)
Al: 0.75 to 2.75 (or about 0.75 to about 2.75)
Mn: 0.25 to 2.25 (or about 0.25 to about 2.25)
Si: 0.1 to 0.9 (or about 0.1 to about 0.9)

The disclosed alloys can incorporate the above elemental constituents to a total of 100 wt. %. In some embodiments, the alloy may include, may be limited to, or may consist essentially of the above named elements. In some embodiments, the alloy may include 2% or less of impurities. Impurities may be understood as elements or compositions that may be included in the alloys due to inclusion in the feedstock components, through introduction in the manufacturing process.

Further, the Fe content identified in all of the compositions described in the above paragraphs may be the balance of the composition as indicated above, or alternatively, the balance of the composition may comprise Fe and other elements. In some embodiments, the balance may consist essentially of Fe and may include incidental impurities. In some embodiments, the compositions can have at least 60 wt. % Fe (or at least about 60 wt. % Fe). In some embodiments, the composition can have between 60 and 80 wt. % Fe (or between about 60 and about 80 wt. % Fe).

Embodiments of the disclosed alloys can be described by elemental ranges that make up a reasonable manufacturing tolerance when producing this alloy in the form of 1/16" cored wire.

For all of the compositions discussed above, in some embodiments the compositions can be for a cored wire and include both the outer sheath and the powder within the sheath.

In some embodiments, the alloys disclosed herein as cored wires can form a readable coating. In some embodiments, the alloys disclosed herein as cored wires can form a fully readable coating.

Thermodynamic Criteria

In some embodiments, the alloys used for a thermal spray process can be fully described by thermodynamic criteria. Alloys which meet all the disclosed thermodynamic criteria have a high likelihood of exhibiting both the desired microstructural features and performance characteristics disclosed herein.

The first thermodynamic criteria is related to the FCC-BCC transition in the alloy. This transition temperature marks the transition of the steel matrix from an austenitic structure (FCC) to a ferritic structure (BCC). The FCC-BCC transition temperature will be hereby abbreviated by the symbol, $T_{\gamma\ to\ \alpha}$. $T_{\gamma\ to\ \alpha}$ acts as a predictor for the final matrix chemistry of the matrix phase. Alloys with relatively low $T_{\gamma\ to\ \alpha}$ will likely possessing form an austenitic matrix in the thermal sprayed coating form.

In some embodiments, the $T_{\gamma\ to\ \alpha}$ can be at or below 950K (or at or below about 950K). In some embodiments, the $T_{\gamma\ to\ \alpha}$ can be at or below 900K (or at or below about 900K). In some embodiments, the $T_{\gamma\ to\ \alpha}$ can be at or below 850K (or at or below about 850K).

In the case of FIG. 12, (alloy X11 coating chemistry), $T_{\gamma\ to\ \alpha}$ [1201] is 800K as no ferrite or cementite is present at 500° C. or above.

Another thermodynamic embodiment is related to the solid solution strengthening of the matrix phase. Solid solution strengthening can occur when dissimilar elements are added to the iron matrix. Elements which are added to the alloy chemistry, but which do not form secondary phases contribute to solid solution strengthening. In some embodiments, the solid solution strengthening of austenite is considered. As the total concentration of solute elements are added to the alloy increases, the solid solution strengthening effect increases. Some elements known to cause solid solution strengthening include boron, carbon, nitrogen, chromium, molybdenum, tungsten, and nickel. In addition, a broad spectrum of elements can contribute to the solid solution strengthening of austenitic steels including calcium, titanium, manganese, copper, zinc, yttrium, niobium, and tin. In some embodiments, all elements outside of Fe can be considered solid solution strengthening.

Accordingly, embodiments of the alloy can contain between 10 and 30 wt. % (or between about 10 and about 30 wt. %) total solute element content. In some embodiments, the alloy can contain at least 5 wt. % (or at least about 5 wt. %) elemental solute in the final matrix. In some embodiments, the alloy can contain at least 10 wt. % (or at least about 10 wt. %) elemental solute in the final matrix. In some embodiments, the alloy can contain at least 15 wt. % (or at least about 15 wt. %) elemental solute in the final matrix.

Another thermodynamic criterion is related to the sum of magnetic phases at room temperature in the alloy. In some embodiments, the chemistry of the thermal spray wire can be used to predict the sum of magnetic phases in the coating. The magnetic phases at room temperature can include ferrite (BCC iron) and a cementite. As the microstructure at between 400 to 550° C. (or between about 400 to about 550° C.) is "frozen" into the structure upon cooling to room temperature, the amount of magnetic phases at room temperature can match the amount of magnetic phases at 400-550° C. (or between about 400 to about 550"C). The total volume fraction of magnetic phases at 500° C. will be hereby abbreviated by the symbol, $P_{mag}$. Alloys with relatively low $P_{mag}$ will likely have an austenitic matrix. Other non-magnetic precipitates can form after heat-treatment, for example transition metal carbides and borides such as Cr carbides, Cr borides, and Fe borides, refractory carbides such as niobium, vanadium or titanium carbides, and graphite.

Figure 5:
FIG. 5 shows a thermodynamic solidification model for Alloy X5.

The calculation of $P_{mag}$ is illustrated in FIG. 5 for the Alloy X5. As shown in FIG. 5, the only magnetic phase at 500° C. is ferrite [302]. The non-magnetic phases are chrome-boride [301], austenite [304] and graphite [305]. [303] is the intersection between the ferrite phase [302] and the austenite phase [304]. Ferrite is the only magnetic phase present at 500° C. and so $P_{mag}$ here is the volume fraction of ferrite at 500° C., which is 28%. In the case of FIG. 12, (alloy X11 coating chemistry), $P_{mag}$ is zero as no ferrite or cementite is present at 500° C. or above.

In some embodiments, the $P_{mag}$ can be at or below 50% (or at or below about 50%). In some embodiments, the $P_{mag}$ can be at or below 40% (or at or below about 40%). In some embodiments, the $P_{mag}$ can be at or below 30% (or at or below about 30%). In some embodiments, the $P_{mag}$ can be at or below 10%. In some embodiments, the $P_{mag}$ can be at or below 5% (or at or below about 5%). In some embodiments, the $P_{mag}$ can be at 0% (or at or below about 0%).

Another thermodynamic criterion is related to the sum of hard phases after high temperature heat exposure in the alloy. In some embodiments, the chemistry of the thermal spray wire can be used to predict the sum of hard phases in the coating. Hard phases can include carbides, borides, and aluminides. In some embodiments, the hard phase fraction in the alloy is taken as the sum of hard phases in the alloy at 500° C.

The calculation of the sum of hard phases is illustrated in FIG. 12. Again, FIG. 11, depicts the coating chemistry of Alloy X11. The hard phases present in Alloy X11 at 500° C. (~800K) comprise vanadium carbide (VC) [1202] and chromium carbide ($M_7C3$) [1203]. For the coating chemistry of X11, the VC mole fraction is 5.5% and the $M_7C_3$ mole fraction is 27.9%, thus the sum of hard phases in the 11 alloy is 33.3%.

In some embodiments, the hard phase fraction sum can be 20 mole % (or about 20 mole %) or greater. In some embodiments, the hard phase fraction sum can be 25 mole % (or about 25 mole %) or greater. In some embodiments, the hard phase fraction sum can be 30 mole % (or about 30 mole %) or greater.

These thermodynamic criteria are related and can simultaneously be considered to design an effective alloy under this disclosure. As mentioned, Mn is an austenite stabilizer, can contribute to solid solution strengthening, but is also prone to rapid oxidation. Navigating these related criteria for complex alloy systems of three or more elements requires the use of advanced computational metallurgy. As another example, aluminum and/or silicon can be added to the feedstock alloy to preferentially oxidize and protect other elements from oxidation. However, Al and Si will tend to stabilize ferrite resulting in a coating which will not be readable. Almost every alloying element is an austenite or ferrite stabilizer, can contribute in some way to solid solution strengthening, and has stronger or weaker oxidation thermodynamics in relation to the other alloying elements. Thus, the type of alloying element and the relative ratios between them must be precisely controlled within narrow compositional ranges in order to meet the embodiments of this disclosure.

Microstructural Criteria

In some embodiments, the alloy can be fully described by microstructural characteristics. The microstructural features of the alloy are relevant in the coating form, after spray has been completed, as opposed to the structure of the feedstock wire.

One microstructural criterion is the presence of austenite in the coating. Austenite is the non-magnetic form of iron, and the coating microstructure must be primarily austenite in order for the coating to be nonmagnetic and furthermore readable.

In some embodiments, the austenite (or FCC gamma-phase iron) can make up 50% (or about 50%) or more of the volume fraction of the coating. In some embodiments, the austenite (or FCC gamma-phase iron) can make up 90% (or about 90%) or more of the volume fraction of the coating. In some embodiments, the austenite (or FCC gamma-phase iron) can make up 99% (or about 99%) or more of the volume fraction of the coating. In some embodiments, the austenite (or FCC gamma-phase iron) can make up 100% (or about 100%) of the volume fraction of the coating. Generally, a thermal spray coating is composed of many different splats of different composition. Having high austenite levels can be achieved by ensuring even the splat with the poorest composition for austenite formation is of a composition which forms austenite such that the average coating chemistry is well into the austenite forming region.

Another microstructural criterion is the microhardness of the coating. The microhardness of the alloy is dependent on the solid solution strengthening and increases the wear resistance of the material.

In some embodiments, the microhardness of the alloy coating can be 400 HV or above (or about 400 HV or above). In some embodiments, the microhardness of the alloy coating can be 450 HV or above (or about 450 HV or above). In some embodiments, the microhardness of the alloy coating can be 500 HV or above (or about 500 HV or above).

Alloy X11 has 500 Vickers microhardness, and thus meets this microstructural criterion.

Figure 3:
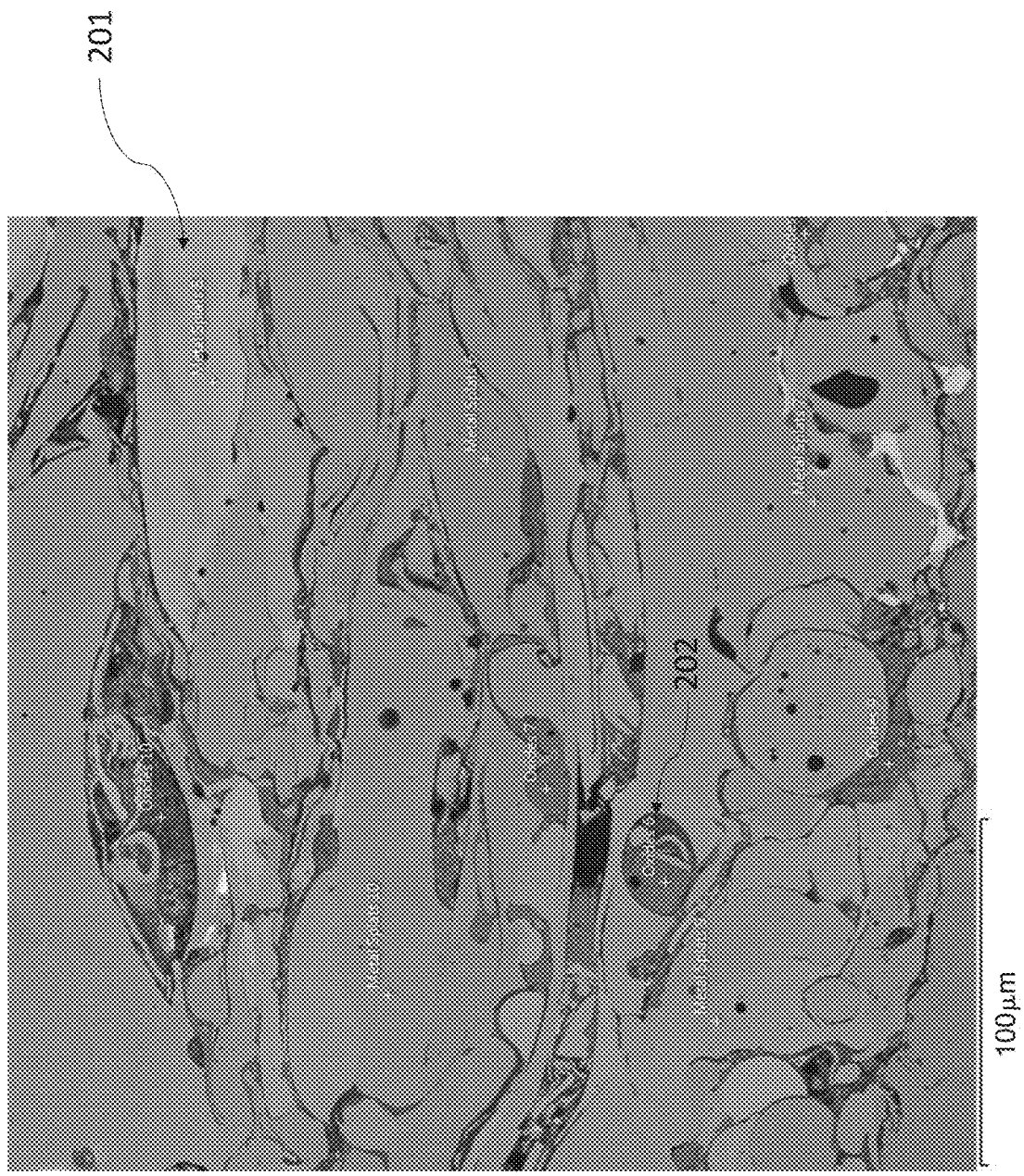
FIG. 3 shows the microstructure for Alloy X3 as a scanning electron micrograph.

A scanning electron micrograph of Alloy X3 is shown in FIG. 3. This micrograph represents a typical embodiment of this disclosure, whereby Fe-based austenite splats [201] and embedded oxides [202] are built up to form the coating structure.

Figure 10:
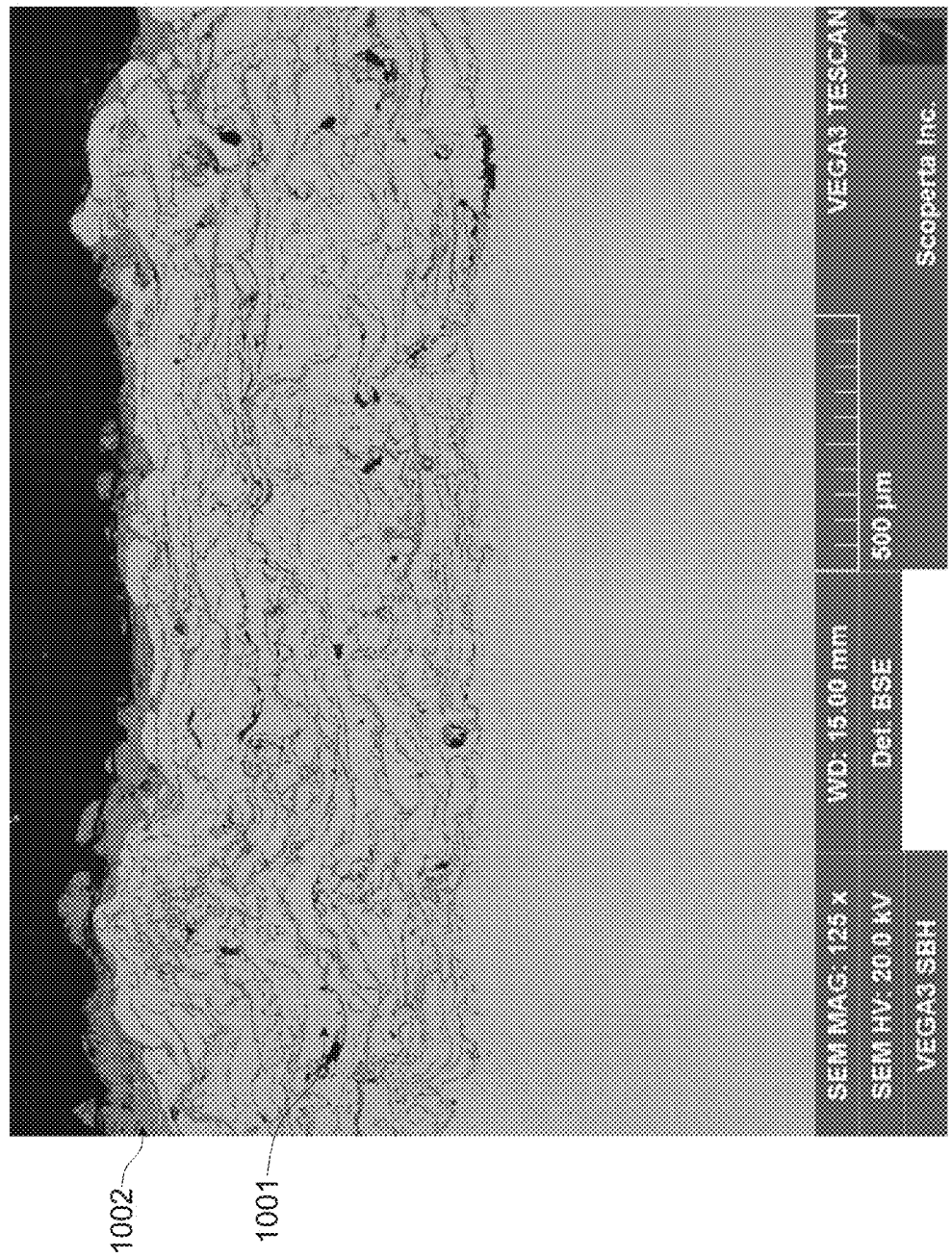
FIG. 10 shows the microstructure for Alloy X11 as a scanning electron micrograph.

A scanning electron micrograph of Alloy X11 is shown in FIG. 10. This micrograph after exposure to 800° C. in an open air furnace for 24 hrs. The X11 alloy retains its advantageous microstructure after heat treatment which is composed of primarily austenitic splats [1001]. Also, at elevated temperatures it is common to develop a small oxide skin [1002], however, the majority of the alloy remains metallic in nature.

Figure 6:
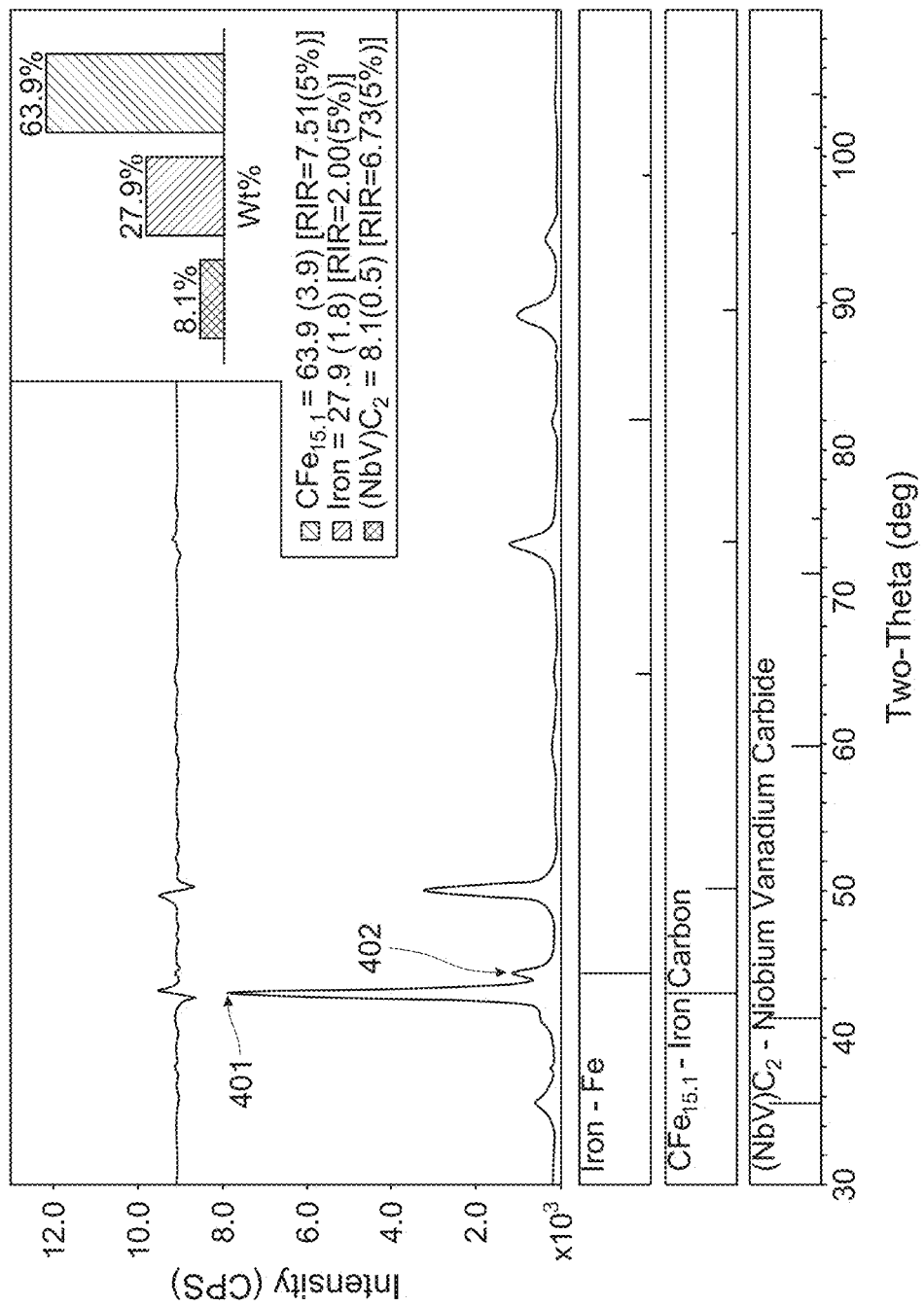
FIG. 6 shows an X-ray diffraction pattern for Alloy X3 prior to heating.

Another microstructural criterion can be related to the retention of austenite after exposure to high temperatures up to 800° C. (or up to about 800° C.). Only coatings which are substantially austenitic can maintain readability. An X-Ray diffraction pattern of Alloy X3 is shown in FIG. 6. FIG. 6 shows that Alloy X3 in the as-sprayed condition reveal an X-ray diffraction pattern of primarily austenite [401] and small amounts of ferrite [402]. Specifically, there is 64% (or about 64%) austenite as measured via the X-ray diffraction method which enables the coating to be readable in the as-sprayed condition.

Figure 7:
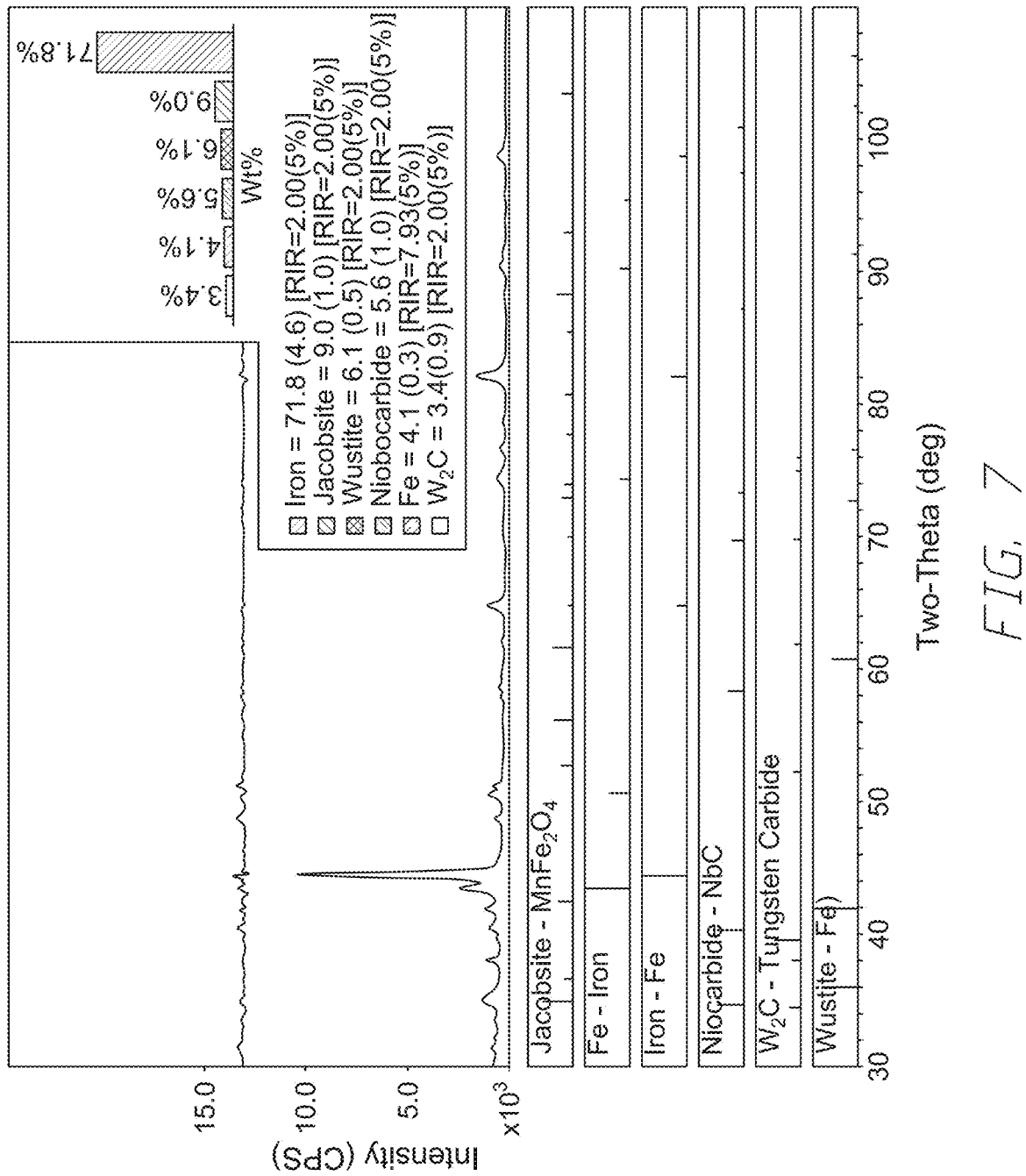
FIG. 7 shows an X-ray diffraction pattern for Alloy X3 after heating.

In contrast, an X-Ray diffraction pattern of X3 after exposure to 800° C. for 24 hours is shown in FIG. 7. The volume fraction of the coating is now predominantly composed of a mixture of magnetic phases such as ferrite and/or cementite [502]. The volume fraction of nonmagnetic phases, such as austenite [501], is very low. The low presence of austenite after exposure to high temperatures up to 800° C. in Alloy X3 does not exhibit "full readability" at 800° C. Further, Alloy X3 does not exhibit "fully readability" even at 500° C.

Figure 8:
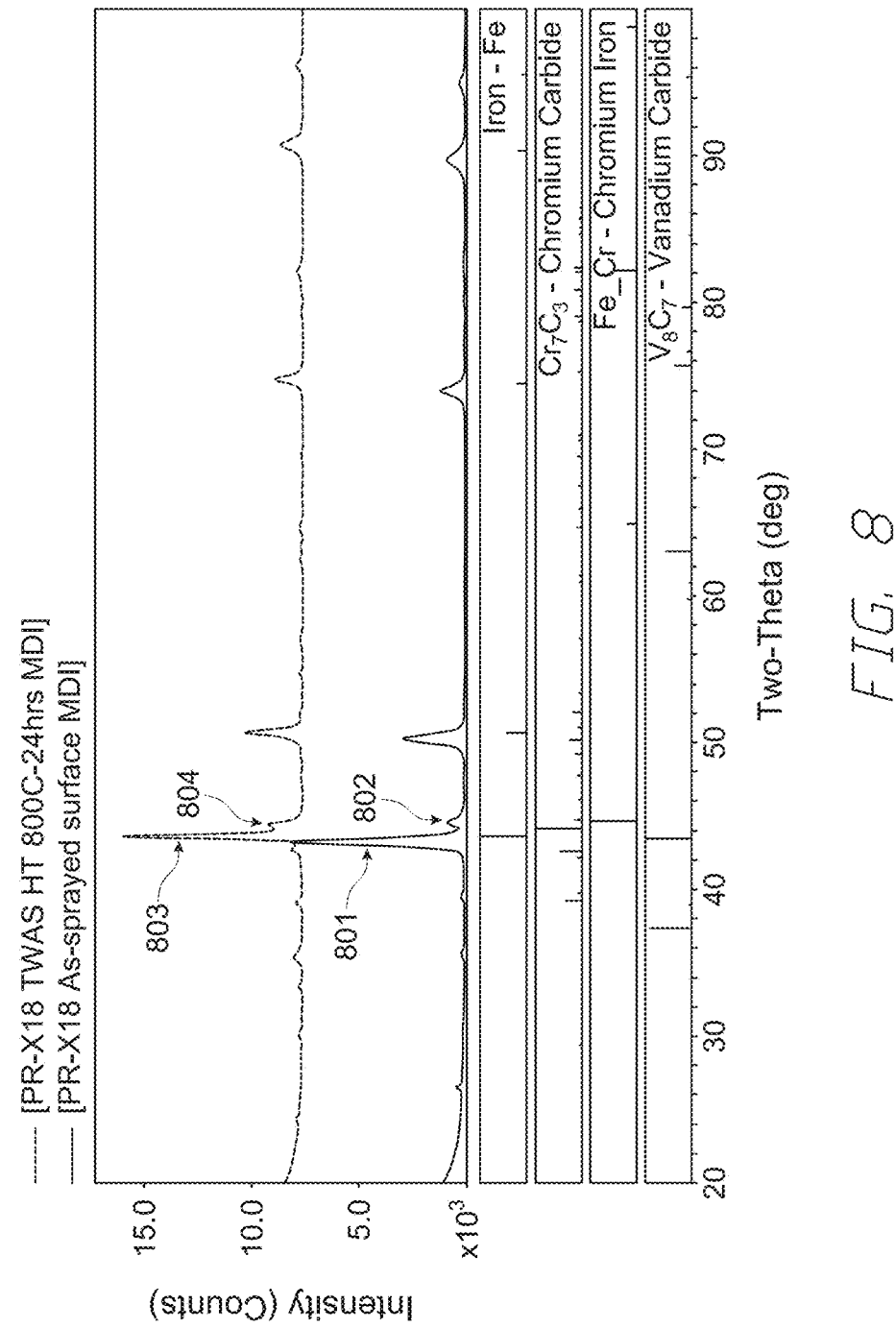
FIG. 8 shows an X-Ray diffraction pattern of X11 in both the as-sprayed condition and after exposure to 800° C. for 24 hrs.

In contrast, the X-Ray diffraction pattern of X11 in both the as-sprayed condition and after exposure to 800° C. for 24 hrs is shown in FIG. 8. In the as-sprayed condition, X11 shows a similar microstructure as X3, with a dominant austenite peak [801] and a minor ferrite peak [802] indicating a austenite content of 50 volume % or more. However, the X11 is unique from X3 in that the dominant austenite peak [803] and minor ferrite peak [804] is retained after exposure to 800° C. for 24 hrs.

In some embodiments, after exposure to high temperatures up to 800° C. (or up to about 800° C.) for at least 24 hours the austenite can make up 50% (or about 50%) or more of the volume fraction of the coating. In some embodiments, after exposure to high temperatures up to 800° C. (or up to about 800° C.) for at least 24 hours the austenite can make up 90% (or about 90%) or more of the volume fraction of the coating. In some embodiments, after exposure to high temperatures up to 800° C. (or up to about 800° C.) for at least 24 hours the austenite can make up 99% (or about 99%) or more of the volume fraction of the coating. In some embodiments, after exposure to high temperatures up to 800° C. (or up to about 800° C.) for at least 24 hours the austenite can make up 100% (or about 100%) of the volume fraction of the coating. After 24 hours, there should be no further changes to the material. Once the appropriate temperature is reached, the material can be cooled at a slow cooling rate of less than 1° C./s (or less than about 1° C./s).

Performance Criteria

In some embodiments, the alloy can be fully described by a set of performance characteristics. These performance characteristics can be relevant to the alloy coating after deposition, as opposed to the feedstock of the alloy prior to thermal spray processing.

One performance criteria is related to the as-sprayed readability of the coating. Readability is a trait by which the coating thickness can be measured using a paint thickness gauge, such as an Elcometer 456 or similar. Most iron based thermal spray coatings are magnetic due to the significant portion of either ferrite or martensite in the coating. Embodiments of the disclosure disclose alloys which are primarily non-magnetic as-sprayed and after exposure to temperatures up to 800° C. and can be thus read with standard paint thickness gauge equipment (e.g., dry film thickness gauge or coating thickness gauge).

Specifically, coating readability can be measured by measuring an as-sprayed thermal spray coupon via a standard 0-1 micrometer (providing the "true" measurement of the thickness) and an Elcometer 456 gauge (providing the magnetic measurement of the thickness) in similar locations on the as-sprayed coating. If the thickness measurements are comparable between both techniques, the coating is readable. If the thickness measurements are not comparable, or there is a large degree of scatter in the magnetic coating thickness measurements, the coating is not readable.

In some embodiments, the magnetic thickness measurement of the as-sprayed coating can be within 30% (or about 30%) of the micrometer measurement. In some embodiments, the magnetic thickness measurement of the as-sprayed coating can be within 25% (or about 25%) of the micrometer measurement. In some embodiments, the magnetic thickness measurement of the as-sprayed coating can be within 20% (or about 20%) of the micrometer measurement. In some embodiments, the magnetic thickness measurement of the as-sprayed coating can be within 15% (or about 15%) of the micrometer measurement. In some embodiments, the magnetic thickness measurement of the as-sprayed coating can be within 10% (or about 10%) of the micrometer measurement.

An additional performance criterion can be the readability of the thermal spray coating after exposure to higher temperatures up to 800° C. (or up to about 800° C.). The readability of the heat-treated coating can be measured by first measuring an as-sprayed thermal spray coupon via a standard 0-1 micrometer and calibrating an Elcometer 456 gauge in similar locations on the as-sprayed thermal spray coupon. After calibration to the as-sprayed coupon, the thickness of the heat-treated coating can be measured using the Elcometer 456 gauge and also measured using standard 0-1 micrometer measurements on the heat-treated coating. If the thickness measurements on the heat-treated coupon are comparable between both the Elcometer and micrometer techniques, the coating is "fully readable". If the thickness measurements are not comparable, or there is a large degree of scatter in the magnetic coating thickness measurements, the coating is not "fully readable".

In some embodiments, the magnetic thickness measurement of the heat-treated coating can be within 30% (or within about 30%) of the micrometer measurement. In some embodiments, the magnetic thickness measurement of the heat-treated coating can be within 25% (or within about 25%) of the micrometer measurement. In some embodiments, the magnetic thickness measurement of the heat-treated coating can be within 20% (or within about 20%) of the micrometer measurement. In some embodiments, the magnetic thickness measurement of the heat-treated coating can be within 15% (or about 15%) of the micrometer measurement. In some embodiments, the magnetic thickness measurement of the heat-treated coating can be within 10% (or about 10%) of the micrometer measurement.

Alloy X3 is not "fully readable" after exposure to higher temperatures up to 800° C. As shown in Table 3, after measuring the thickness of the coating using an Elcometer 456, the magnetic thickness measurements of the heat-treated coupons exceed 20% of the micrometer measurements. While there is relatively low scatter, inaccuracy of above 20% in the Elcometer measurements indicates the heat-treated coating is not fully readable. Note that the Elcometer can be calibrated such that it measures one coating thickness very accurately, however, it is not accurate over the entire temperature range. The function of readability in practice is to measure unknown coating thicknesses of a coating which cannot be measured via any other technique other than an Elcometer. Thus, accuracy and precision over the entire thickness range can be advantageous.

TABLE 3

Average Elcometer readings in thousandths of an inch of Alloy X3 after exposure to 800 C. for 24 hours

| 0-1 Micrometer Reading | Average Elcometer Reading | Elcometer Standard Deviation | % Inaccuracy |
|---|---|---|---|
| 4 | 4.0 | 0.66 | 0% |
| 10 | 5.5 | 0.70 | −44.7% |
| 17 | 5.5 | 0.80 | −67.5% |
| 39 | 9.6 | 1.48 | −75.5% |
| 61 | 12.3 | 1.27 | −79.9% |

Alloy X11 is a fully readable alloy as shown in the below table. Table 4 demonstrates the accuracy of Elcometer thickness measurements after high temperature exposure. The Elcometer readings generally show a lower coating thickness due to the presence of the oxide film, which is inherently included in the physical micrometer measurement. The measured thickness loss due to oxide growth becomes a more significant contributor to the inaccuracy as the coating thickness decreases. This is because the oxide layer is on the order of 2-3 mils regardless of the coating thickness. Oxide growth affect s the Elcometer readings because it is often at least somewhat magnetic in nature. However, since the metallic coating is the true functional layer in most applications, it can be advantageous to not include the oxide layer thickness in the measurement of the coating. The full details of this testing are provided in Example 7.

Alloy X11 meets the 'fully readable' performance criteria according to these measurements.

TABLE 4

Average Elcometer readings in thousandths of an inch of Alloy X11 after exposure to 800 C. for 24 hours

| 0-1 Micrometer Reading | Average Elcometer Reading | Elcometer Standard Deviation | % Inaccuracy |
|---|---|---|---|
| 19 | 13.7 | 2.4 | 28% |
| 39 | 34.4 | 2.2 | 12% |
| 53 | 52.4 | 3.6 | 1% |

In some embodiments, thermal spray operators can measure readability by measuring one spot with the Elcometer many times. The Elcometer will always register a reading of measurement but a magnetic coating will cause the measurement readings to vary wildly. A readable coating may also show a different measurement reading with each measurement, but will be a standard deviation around the actual physical thickness. In some embodiments, the magnetic thickness gauge can have a 30% (or about 30%) standard deviation in measurements or less. In some embodiments, the magnetic thickness gauge can have a 28% (or about 28%) standard deviation in measurements or less. In some embodiments, the magnetic thickness gauge can have a 25% (or about 25%) standard deviation in measurements or less. In some embodiments, the magnetic thickness gauge can have a 20% (or about 20%) standard deviation in measurements or less. some embodiments, the magnetic thickness gauge can have a 15% (or about 15%) standard deviation in measurements or less.

Another performance characteristic is the wear resistance of the material. There are two wear measurement test relevant to this disclosure, ASTM G65 Procedure B and hot erosion testing under ASTM G76, the entirety of both of which are hereby incorporated by reference. Both techniques are relevant to a common application of thermal spray coatings, the protection of boiler tubes in power generation equipment.

In some embodiments, the ASTM G65B mass loss of the coating can be 0.75 grams or less (or about 0.75 grams or less). In some embodiments, the ASTM G65B mass loss of the coating can be 0.6 grams or less (or about 0.6 grams or less). In some embodiments, the ASTM G65B mass loss of the coating can be 0.5 grams or less (or about 0.5 grams or less).

In some embodiments, the coating can be measured for mass loss under hot erosion testing using 30° (or about 30°)

impingement angle, 600° C. (or about 600° C.) operation temperature, and Ottawa 50/70 silica sand. In some embodiments, the alloy can lose less than 400 mg (or less than about 400 mg) in hot erosion testing. In some embodiments, the alloy can lose less than 300 mg (or less than about 300 mg) in hot erosion testing. In some embodiments, the alloy can lose less than 200 mg (or less than about 200 mg) in hot erosion testing. In some embodiments, the alloy can lose less than 100 mg (or less than about 100 mg) in hot erosion testing.

Alloy X11 exhibited 80 mg of mass loss in ASTM G76 hot erosion testing and thus meets the erosion performance criteria.

Another performance criterion is related to the adhesion of the coating. Adhesion of a thermal spray coating can be measured via ASTM 4541 or ASTM C633, the entirety of each of which is incorporated by reference in its entirety. It can be advantageous for the coating to have a high adhesion in order to prevent spalling or other premature failure of the coating during service or application.

In some embodiments, the adhesion strength can be 5,000 psi (or about 5,000 psi) or higher. In some embodiments, the adhesion strength can be 6,000 psi (or about 5,000 psi) or higher. In some embodiments, the adhesion strength can be 7,000 psi (or about 7,000 psi) or higher. These values apply to both the ASTM 4541 and ASTM C633 tests.

Alloy X11 tested at over 9,000 psi adhesion strength. In this test the testing glue failed so it is only known that the X11 coating had at least 9,000 psi adhesion to the substrate.

EXAMPLES

The following examples are intended to be illustrative and non-limiting.

Example 1

In order to quantify the effect of oxidation on the difference between feedstock chemistry and coating chemistry of coating produced via the twin wire arc spray process, extensive experimentation was conducted. The purpose of this experimentation was to determine an oxygen content to be used in the modelling of future alloys found within this disclosure. Three alloys where sprayed in this example via the twin wire arc spray process, as listed according to feedstock chemistry below in Table 5. Alloys E1-E3, which are known and non-readable thermal spray alloys, were sprayed in addition to the X3 alloy described above.

TABLE 5

List of feedstock chemistries provided in Example 1 used to develop the oxidation mode employed in the design method used in this disclosure

| Alloy | Al   | Cr   | Mn  | Mo | Nb   | Si  | Ti | V | W |
|-------|------|------|-----|----|------|-----|----|---|---|
| E1    | 2    | 0    | 5   | 13 | 0    | 10  | 0  | 0 | 0 |
| E2    | 0    | 26.5 | 1.6 | 0  | 0    | 1.6 | 0  | 0 | 0 |
| E3    | 1.92 | 12.5 | 1   | 0  | 5.75 | 1   | 0  | 0 | 0 |

The three alloys present in Table 5 represent the feedstock chemistry of the wires prior to being subject to the twin wire arc spray process. In each case, the alloy was subject to the twin wire arc spray process under similar spray parameters and deposited onto a separate steel coupon corresponding to each alloy. The coating chemistry of each alloy was measured via energy dispersive spectroscopy in a scanning electron microscope. The results of the coating chemistries for each alloy is shown in Table 6. As evident, the feedstock chemistry is not equivalent to the resultant coating chemistry. For example, the Mn content is significantly reduced when used in the feedstock chemistry at levels above 2 wt. %.

TABLE 6

Coating chemistry of alloys evaluated in Example 1.

| Alloy | Al   | Cr   | Mn   | Mo | Nb  | Si   | Ti   | V    | W   |
|-------|------|------|------|----|-----|------|------|------|-----|
| X3    | 1.8  | 5.9  | 8.2  | 0  | 4.5 | 0    | 0.34 | 0.85 | 5.3 |
| E1    | 1.7  | 0    | 2.5  | 15 | 0   | 9.25 | 0    | 0    | 0   |
| E2    | 0    | 29.5 | 1.06 | 0  | 0   | 1.3  | 0    | 0    | 0   |
| E3    | 1.04 | 14.3 | 1.05 | 0  | 4.8 | 0.53 | 0    | 0    | 0   |

Finally, as shown in Table 7, the percent difference between the feedstock chemistry and the coating chemistry for elements which oxidized during the spray process are shown in Table 7. As shown, aluminum, manganese, niobium, and silicon can oxidize and have reduced or eliminated contribution to the coating microstructure and performance accordingly. Understanding and predicting this oxidation is thus useful in developing next generation thermal spray coating alloys with high performance.

TABLE 7

Drop in coating alloy content from feedstock alloy content for alloys evaluated in Example 1.

| Alloy | Al   | Mn     | Nb   | Si    |
|-------|------|--------|------|-------|
| X3    | −12% | −31.5% | —    | —     |
| E1    | −16% | −50.8% | —    | −7.5% |
| E2    | —    | −37.7% | —    | −17.5%|
| E3    | −48% | —      | −20% | −47%  |

It was determined through careful experimentation that 8 wt. % oxygen can be added to the model when evaluating the thermodynamic properties of twin wire arc spray feedstock chemistries. For example, a potential feedstock chemistry such as X3 would be modelled via the following: $[Fe_{BAL}Al_{1.8}Cr_{5.9}Mn_{8.2}Nb_{4.5}Ti_{0.34}V_{0.85}W_{5.3}]_{92}O_8$. In the case of X3, the 8 wt. % oxygen model shows good correlation between the calculated coating chemistry and the experimentally measured coating chemistry. The comparison between the calculated and measured results is shown in Table 8. In particular, Mn, which can be advantageous for the stabilization of austenite and the readability performance criteria is predicted very well.

TABLE 8

Comparison between experimental and measured coating chemistry

| X3         | Al   | Ti   | V    | Cr   | Mn   | Fe    | Nb   | W    |
|------------|------|------|------|------|------|-------|------|------|
| Calculated | 0.01 | 0.01 | 0.57 | 2.74 | 8.73 | 77.33 | 3.93 | 5.75 |
| Measured   | 1.76 | 0.34 | 0.85 | 5.92 | 8.22 | 73.17 | 4.45 | 5.29 |

Example 2

In order to qualify the adhesion performance, the following test was executed.

Both the X3 and X4 alloy discussed above were tested. The samples were placed onto a fixed jig, and a robotic arm carrying the spray gun was made to raster across the samples such that a controlled coating thickness could be built up. In order to quantify the effect of coating angle samples were held at an angle of 90°, 60°, and 45° with the spray direction. Furthermore, the samples were sprayed at varying spray distances of 6" and 9". The purpose of this spray trial was to gauge the potential of these alloys to efficiently adhere to a substrate under a variety of plausible spray conditions. The substrates were 3"×3"×¼" steel coupons and grit blasted to a minimum 2.5 mil blast profile. The samples were sprayed with the following spray parameters hereby referred to as "Spray Parameters 1"

TAFA 8830 Blue Air Cap
60 psi
32 V
250 Amps

Each alloy was sprayed to a target of 20 mils (0.020"). The adhesion results as a function of alloy and spray angle are shown in Table 9 for Alloy X3 and Table 10 for Alloy X4. Based on these results, both X3 and X4 alloys deposit >5,000 psi adhesion strength coatings in the twin wire arc spray process.

TABLE 9

Adhesion values in psi of Alloy X3 as a function of spray parameter

| Alloy X3 | 90° | 60° | 45° |
|---|---|---|---|
| 6" | 5,800 | 5,708 | 6,596 |
| 9" | 7,033 | 5,640 | 8,064 |

TABLE 10

Adhesion values in psi of Alloy X4 as a function of spray parameter

| Alloy X4 | 90° | 60° | 45° |
|---|---|---|---|
| 6" | 6,988 | 6,064 | 6,232 |
| 9" | 5,852 | 5,624 | 7,038 |

Example 3

In order to qualify the X3 and X4 for utility as a twin wire arc spray product, the deposition efficiency was measured. Deposition efficiency is the measure of how much material attaches to the substrate by weight divided by how much material is sprayed by weight. A sufficiently high deposition efficiency, typically >60% (or >about 60%), is advantageous for use. In this experiment, Alloy X3 and X4 were sprayed onto a 12"×12" rotating steel plate. The gun was held fixed in such a manner that the entire spray pattern would intersect the steel plate. The weight of wire used and the weight of coating accumulating on the plate were measured for each material to determine deposition efficiency. X3 had a measured deposit efficiency of 64% and 67% in two measurements. X4 had a deposition efficiency measurement of 70%, 71%, and 76% in three measurements.

Similar deposit efficiency testing was conducted using the X11 alloy. The deposit efficiency was measured to be 70% (or about 70%).

Example 4

In order to qualify the utility of the disclosed alloys in certain applications where abrasion performance is necessary, several wear tests were performed on the coating. For a comparative measure the non-readable and known wear resistant Fe-based coating, E2, was tested as well. The results are shown in Table 11. As shown, the X3 alloy was within the 15% scatter of the standard wear resistant material. This level of scatter is typical to the scatter of the test itself, and one would expect both coating to perform similarly in the field. Thus, it can be said that the X3 alloy possess similar wear resistance as the E2 alloy, however it is also readable.

TABLE 11

Wear testing results

| Alloy | Vickers Hardness | ASTM G65 (mg lost) | Hot Erosion Loss (mg lost) |
|---|---|---|---|
| X3 | 460 | 0.45 | 172.6, 178.3 |
| X4 | 400 | 0.59 | |
| E2 | Not measured | 0.38 | 164, 168.6 |

Example 5

In order to measure the readability of each alloy careful experimentation was performed. Thermal spray coating specimens were produced such that ½ of a steel panel was sprayed and the other half of the panel was left un-sprayed. This type of sample allowed for simple comparison between a 0-1 micrometer measurement technique and an Elcometer. In this experiment, the 0-1 micrometer measurement is the accurate reading, an Elcometer reading is taken for comparison purposes to determine it the coating is readable. It is part of standard practice to calibrate the Elcometer using the intended coating to be read, and that was executed with a nominal 15 mil coating. 5 coatings of varied thicknesses were then measured using both the micrometer and the calibrated Elcometer. All samples were sprayed using "Spray Parameters 1" with a 6" spray distance and 90° spray angle. The results of the readability measurements are shown in Table 12, which demonstrates to one skilled in the art that the X3 alloys is indeed readable. Readability is indicated by a relatively low scatter, and % inaccuracy of below 20%, in the Elcometer measurements.

TABLE 12

Readability Measurements of Alloy X3

| 0-1 Micrometer Reading | Elcometer Reading | Elcometer Standard Deviation | % Inaccuracy |
|---|---|---|---|
| 6 | 6 | ±1 mil | 17% |
| 11-12 | 11-12 | ±1.6 mil | 13% |
| 17-18 | 17-18 | ±1.8 mil | 10% |
| 22-24 | 22-24 | ±2.5 mil | 11% |
| 34-36 | 34-36 | ±4.1 mil | 12% |

Example 6

Alloy X11, X12, and X13 were manufactured into the form of a cored wire for the purposes of demonstrating this disclosure. The sheath and powder composition were set to allow for a homogenous splat chemistry throughout the coating structure. In the case of all three wires, X11, X12, and X13, a 304 stainless still sheath was used to form the cored wire. The 304SS alloy has significant Ni content, and thus the nickel content is more homogenously distributed throughout the splats which make up the coating than it would otherwise be if the Ni content of the cored wire was present entirely in the powder component. This design method can be realized when comparing the nickel distribution in the splat chemistry for the X10 alloy, which was manufactured with all the alloy Ni coming from the powder component. As shown in Table 2, while the X10 alloy has a relatively high average Ni content in the coating, the actual Ni content in a splat varies significantly. The minimum Nickel content found in a splat was 3 wt. % which would indicate a magnetic phase structure using the thermodynamic criteria disclosed herein. The X11 coating, however, shows a lower variation in Nickel content and a higher minimum Nickel concentration amongst the splats queried. This indicated that all the splats are non-magnetic in nature and that readability will not be negatively affected.

In some embodiments, an article of manufacture is disclosed whereby a minimum nickel content is present in the sheath used in the construction of a cored wire. In some embodiments, the minimum nickel content can be 1 wt. % (or about 1 wt. %). In some embodiments, the minimum nickel content can be 5 wt. % (or about 5 wt. %). Some embodiments, the minimum nickel content can be 8 wt. % (or about 8 wt. %). In some embodiments, the sheath can be a 300 series stainless steel alloy. In some embodiments, the sheath can be a 304 stainless steel.

TABLE 13

Energy Dispersive Spectroscopy Measurements Made with a Scanning Electron Microscope for the Chemistry of 10 Individual and Unique Splats in the X10 and X11 as-sprayed coatings

|  | X10 | X11 |
|---|---|---|
| Average | 16% | 17% |
| Standard Deviation | 3.3% | 1.5% |
| Minimum | 8% | 13% |
| Maximum | 20% | 20% |

Table 13 shows that the coating is homogenous in chemistry. A homogenous coating can be ensured if the 304SS strip is used to make the cored wire. If the coating chemistry is not homogenous, then some splats in the coating may not be magnetic and the coating may not be readable. For example, if the coating was very inhomogeneous, this results in some splats of effectively low Ni content resulting in them being magnetic.

The manufacturing technique for X11, X12, and X13 can be advantageous because it results in more homogenous distribution of Ni in the splats, and thereby limits the frequency of splats are not austenitic due to lower than targeted nickel content. The specific manufacturing recipe for the X11, X12, and X13 wires are shown in Table 14. In all cases, 304 SS strip is used. The remaining ingredients specify the mix of powders used to create the cored wire. The powder components are prescribed in terms of % of total powder mix. However, the total powder mix actually occupies 20-40% by the total weight fraction of a cored wire with the sheath making up the remaining portion.

TABLE 14

Specifics of powder fill used to create X11, X12, and X13 cored wires

| | POWDER FILL | | | | | | | |
|---|---|---|---|---|---|---|---|---|
| Make | Al | Ni | Fe—V | C | Cr—Fe—C | Fe—C | Fe | STRIP |
| X11 | 6.37% | 39.20% | 7.87% | 13.15% | 29.78% | 3.62% | 0.00% | 304 SS |
| X12 | 6.32% | 38.92% | 7.81% | 15.70% | 0.00% | 31.10% | 0.00% | 304 SS |
| X13 | 0.00% | 45.74% | 0.00% | 8.11% | 15.73% | 0.00% | 30.42% | 304 SS |

Example 7

The X11, X12, and X13 wires were sprayed onto sample plates to demonstrate all the performance criteria of this disclosure. The sample plates were sprayed to a variety of nominal thicknesses: about 5 mils, about 10 mils, about 15 mils, about 30 mils, and about 50 mils. Two sets of each coating thickness were deposited. The purpose of spraying these plates was to determine the readability of the coatings in the as-sprayed condition and after heat treatment to various temperatures. The coatings were first verified to be readable in the as-sprayed condition. Then, the coatings were placed in an open air furnace at 500° C. and left at temperature for 24 hrs. The coatings were cooled, at a slow rate of 1 C/s or less, achieved by turning the furnace off and allowing them to remain in the furnace. The coatings were verified as readable after that temperature exposure, which represents a sub-critical boiler wall temperature. Then, the coatings were placed in an open air furnace at 800° C. and left for 24 hrs. 800° C. represents a critical or super critical boiler wall temperature, and is also above the ferrite to austenite transition temperature for this alloy and all known steel alloys. Thus, it represents a temperature at which phase equilibrium can be achieved when held at temperature for 24 hrs. Again, the coupons were allowed to slow cool and the readability was again measured. The results of this study are shown in Table 15 below, and indicate that all three wires are "fully readable" under the definitions of this disclosure.

TABLE 15

Thickness Measurements of Alloys X11, X12, and X13 in as-sprayed conditions and after high temperature exposure

| ALLOY X11 | | | | | |
|---|---|---|---|---|---|
| | Micrometer Reading | | | | |
| | 4 | 7 | 19 | 39 | 53 |
| As-Sprayed | 1 | 3.6 | 13.7 | 34.4 | 52.4 |
| 500 C. Exposure | 1.7 | 4.7 | 16.5 | 36.4 | 50 |
| 800 C. Exposure | 3 | 5.8 | 11 | 26 | 52 |

| ALLOY X12 | | | | | |
|---|---|---|---|---|---|
| | Micrometer Reading | | | | |
| | 4 | 10 | 18 | 36 | 54 |
| As-Sprayed | 0.7 | 3.8 | 11.1 | 24.4 | 53.8 |
| 500 C. Exposure | 1.8 | 6.1 | 17.6 | 37.1 | 53.9 |
| 800 C. Exposure | 5.9 | 4.0 | 12.1 | 24.0 | 51.2 |

TABLE 15-continued

Thickness Measurements of Alloys X11, X12, and X13 in as-sprayed conditions and after high temperature exposure

| | ALLOY X13 | | | | |
|---|---|---|---|---|---|
| | Micrometer Reading | | | | |
| | 4 | 9 | 17 | 38 | 56 |
| As-Sprayed | 2.1 | 5.4 | 14.4 | 35.9 | 54.8 |
| 500 C. Exposure | 2.7 | 4.4 | 12.3 | 26.9 | 56.0 |
| 800 C. Exposure | 2.7 | 3.7 | 11.5 | 34.0 | 55.2 |

Figure 9:
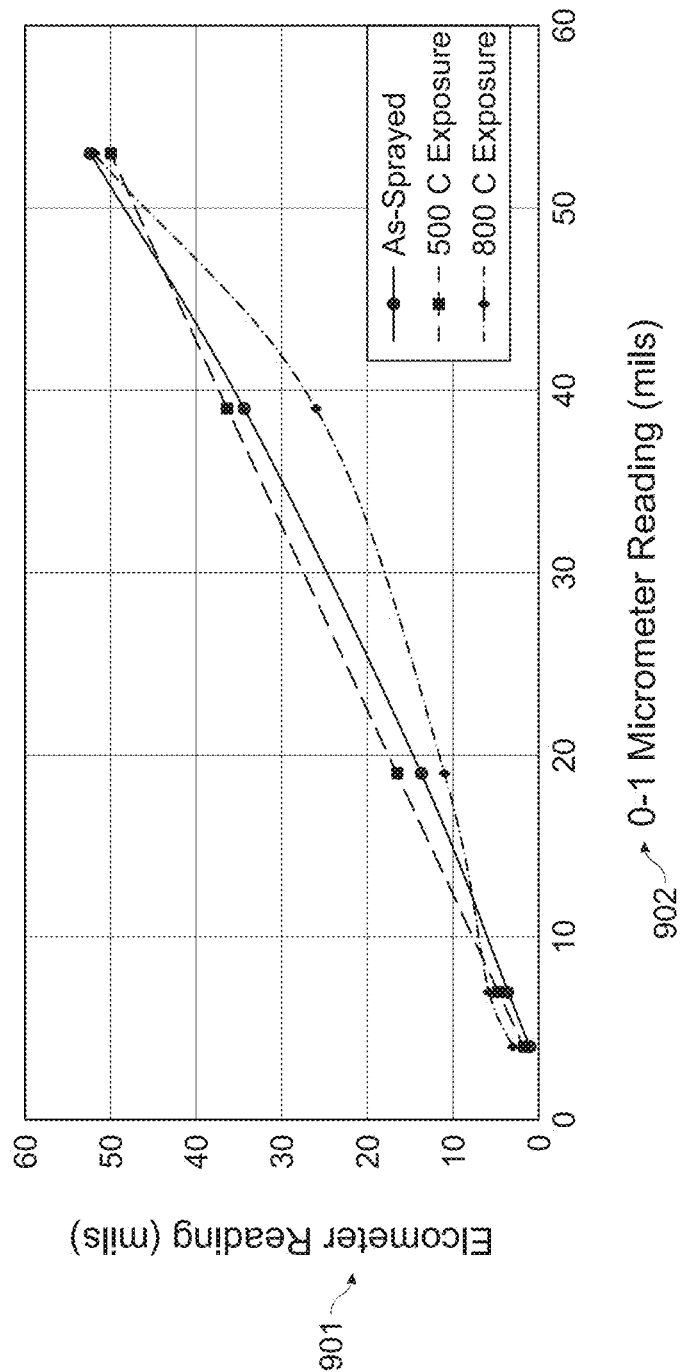
FIG. 9 shows Elcometer readings for Alloy X11.

A demonstration of "full readability" is shown in FIG. 9, which shows that the Elcometer readings y-axis match the micrometer readings on the x-axis. In this particular experiment, the Elcometer was calibrated to an as-sprayed 50 mil coupon. The calibrated Elcometer was then used to accurately measure the coating thickness of all the as-sprayed coupons and all the heat treatment coupons, whether subjected to 500° C. or 800° C.

Example 8

The X11 was subjected to an additional test to evaluate the erosion resistance of the coating. A 2"×2" section of the coating was blasted with sand at an elevated temperature, 600° C. according to the ASTM G76 test specification, hereby incorporated by reference in its entirety. The specific of the test are as follows: 30° impingement angle, 600° C. test temperature, Ottawa 50/70 silica sand, 1500 g of sand used, and an air flow pressure of 35 psi. The X11 alloys showed a volume loss of 80 mg, which demonstrates a high resistance to high temperature erosion.

Example 9

Thorough experimentation was conducted in order to develop the thermodynamic parameter for evaluating the room temperature microstructure after elevated exposure to high temperatures. It should be appreciated that all alloys in this disclosure possess a predominantly ferrite microstructure at room temperature under existing thermodynamic models. However, extensive experimentation has revealed that an austenite phase can be retained at room temperature. The X3 alloy was exposed to a variety of heat treatments, and the readability evaluated, in order to understand this phenomenon. It was determined that after 400° C. exposure the alloy retained readability, and at about 500° C. the alloy began to transition to being non-readable. It was through this study that 500° C. was determined to be a temperature sufficiently high to provide the thermal energy required for atoms to re-arrange themselves into thermodynamically favorable phase. Thus, the non-obvious use of the looked at the sum of thermodynamically stable phases at 500° C. to determine the phase structure at room temperature was developed.

Example 10

Alloy X11 was subject to a series of additional tests. One of the intended applications of Alloy X11 is use as an abrasion resistant coating for boilers. Accordingly, it can be advantageous for the coating to function at high temperature for a prolonged period of time, such as on the order of months or years. Thus, Alloy X11 was heat treated at 800° C. for various times: 24 hrs., 48 hrs., 72 hrs., and 96 hrs. Each coating samples was analyzed to determine if any trend could be observed microstructurally or from a performance perspective as exposure time increased. Microstructural evaluation between coatings exposed for 24 hrs. and coating exposed for longer periods of time showed no difference. Furthermore, coating adhesion was tested for each coating showing the coating maintained at least 6,000 psi adhesion strength independent of exposure time.

Method for Designing Thermal Spray

In some embodiments, the alloy may be formed by blending various feedstock materials together, which may then be melted in a hearth or furnace and formed into ingots. The ingots can be re-melted and flipped one or more times, which may increase homogeneity of the ingots.

Each ingot produced was evaluated examining its microstructure, hardness and magnetic permeability. The ingots were designed to be non-magnetic and have a magnetic permeability of less than 1.01. Incremental changes in composition were made in each successive ingot, leading to the final alloys.

Figure 4:
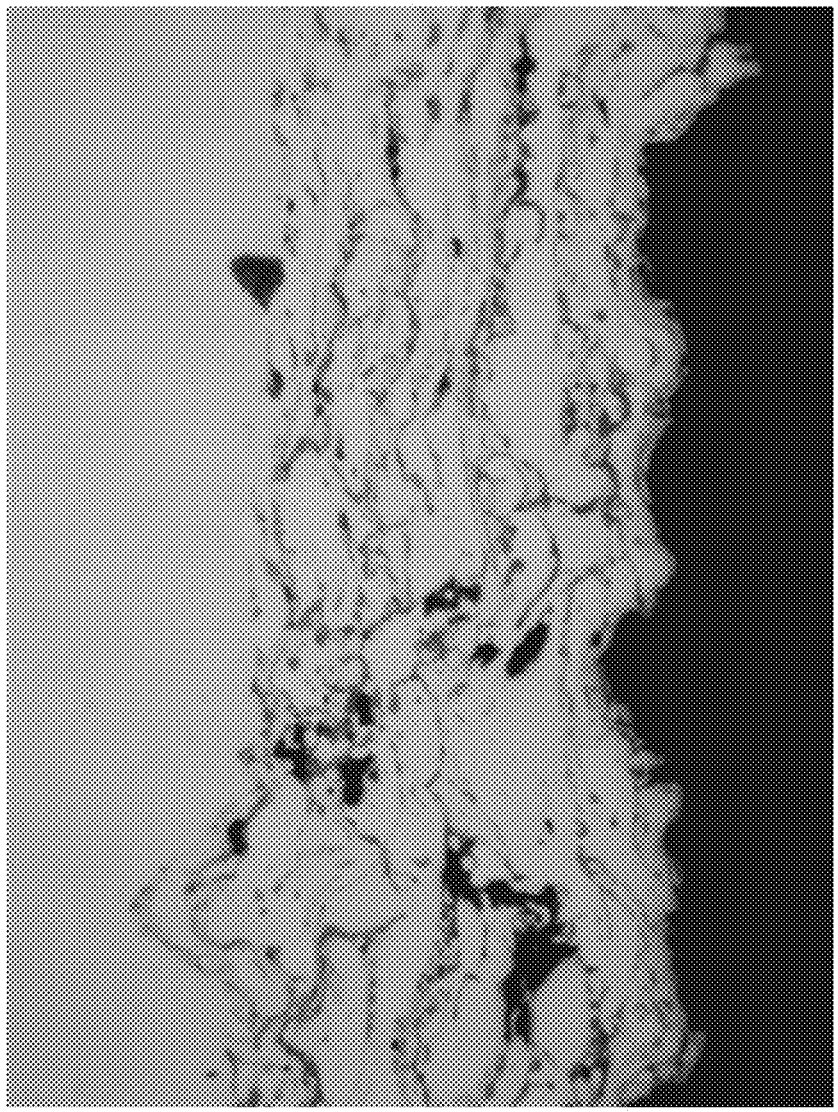
FIG. 4 is an optical micrograph for Alloy X3 at 200× magnification.

Each alloy was sectioned using a wet abrasive saw and its cross section was analyzed using optical microscopy. The ideal microstructure has few oxides or pores between the splats leaving only a dense coating of the sprayed material. Large amounts of porosity can weaken the coating adhesion and also can provide paths for corrosive media to penetrate through the coating and attack the substrate. The microstructure of one embodiment of the present disclosure is shown in FIG. 4.

The addition of Al and Ni in the alloys provides an increase to the "sprayability" of the material.

Measuring the magnetic permeability was accomplished using a Low-Mu Permeability Tester supplied from Severn Engineering. A reference standard with a known magnetic permeability is placed in the tester. The tester is comprised of the reference standard and a pivoting magnet. The magnet extends from the side of the tester opposite the reference standard. The magnet tip is brought into contact with the surface of the ingot. If the magnet is not attracted to the ingot, then the magnetic permeability is less than that of the reference standard being used.

The spraying process begins by grit blasting the steel substrate to clean off any oils or dirt while also providing a uniform surface to apply to coating onto. The coating is deposited by spraying a coating 20 mils and 60 mils thick at the following spray conditions: 32 volts, 200 amps, 5-7" spray distance, 2-3.5 mils/pass, 85 psi atomizing pressure.

The coating adhesion is tested by bonding a 10 mm test dolly to the substrate using epoxy. The dolly is pulled in tension using a Positest AT-A adhesion tester. A minimum of 3 tests are run on each coating and the results are compiled into an average. Also of interest is the mode of coating failure and whether it is adhesive (the coating pulls completely off the substrate), adhesive (the coating itself fails without pulling off the substrate) or mixed mode experiencing both adhesive and cohesive failure.

Properties

A plate coated with an alloy from the present disclosure having a thickness of 20 mils had an average coating adhesion value exceeding 10,000 psi. In one alloy embodiment, the thickness as measured by a magnetic thickness gage had a precision of ±0.001" and in a second embodiment, the thickness precision ±0.00075 demonstrating good readability with sufficiently low magnetic interference.

The magnetic permeability of one alloy embodiment in ingot form was measured to be <1.01.

A plate coated with the present disclosure at a thickness of 60 mils had abrasive wear loss according to ASTM G65 Procedure B in one embodiment of 1.19 g and in another embodiment 1.13 g.

Compositions

Tables 16 and 17 below illustrate particular compositions of cored wires and their properties which can meet the criteria disclosed herein. For Tables 16 and 17: 1) FCC-BCC Transition Temperature in K; 2) Sum of the Hard Phases in mole %; 3) Sum of the Magnetic Phases at 500° C. as a volume %; 4) Solute Element Content in wt. %.

TABLE 16

Example Compositions and Thermodynamic Criteria

| Al | C | Cr | Mn | Ni | Si | V | 1 | 2 | 3 | 4 |
|---|---|---|---|---|---|---|---|---|---|---|
| 1.9 | 3 | 10 | 1 | 18 | 0.31 | 4 | 850 | 30.9% | 32.5% | 36% |
| 1.9 | 3 | 10 | 1 | 21 | 0.31 | 2 | 800 | 33.0% | 27.0% | 37% |
| 1.9 | 3 | 11 | 1 | 16 | 0.31 | 6 | 900 | 30.9% | 35.9% | 37% |
| 1.9 | 3 | 11 | 1 | 19 | 0.31 | 2 | 850 | 33.8% | 30.7% | 36% |
| 1.9 | 3 | 11 | 1 | 22 | 0.31 | 0 | 800 | 31.9% | 25.2% | 37% |
| 1.9 | 3 | 12 | 1 | 14 | 0.31 | 6 | 900 | 31.7% | 40.5% | 36% |
| 1.9 | 3 | 12 | 1 | 17 | 0.31 | 4 | 850 | 33.0% | 32.1% | 37% |
| 1.9 | 3 | 12 | 1 | 20 | 0.31 | 0 | 850 | 34.9% | 28.9% | 36% |
| 1.9 | 3 | 13 | 1 | 12 | 0.31 | 8 | 950 | 31.5% | 45.6% | 37% |
| 1.9 | 3 | 13 | 1 | 15 | 0.31 | 4 | 900 | 33.6% | 36.3% | 36% |
| 1.9 | 3 | 13 | 1 | 18 | 0.31 | 2 | 850 | 35.5% | 30.2% | 37% |
| 1.9 | 3 | 14 | 1 | 11 | 0.31 | 8 | 950 | 32.1% | 47.7% | 37% |
| 1.9 | 3 | 14 | 1 | 14 | 0.31 | 4 | 900 | 34.4% | 38.4% | 36% |
| 1.9 | 3 | 14 | 1 | 17 | 0.31 | 2 | 850 | 36.2% | 31.3% | 37% |
| 1.9 | 3 | 15 | 1 | 10 | 0.31 | 8 | 950 | 32.6% | 49.7% | 37% |
| 1.9 | 3 | 15 | 1 | 13 | 0.31 | 4 | 900 | 35.1% | 40.5% | 36% |
| 1.9 | 3 | 15 | 1 | 16 | 0.31 | 2 | 850 | 36.8% | 32.4% | 37% |
| 1.9 | 3 | 16 | 1 | 10 | 0.31 | 6 | 950 | 34.3% | 48.6% | 36% |
| 1.9 | 3 | 16 | 1 | 13 | 0.31 | 4 | 900 | 35.8% | 40.1% | 37% |
| 1.9 | 3 | 16 | 1 | 16 | 0.31 | 0 | 850 | 36.2% | 36.2% | 36% |
| 1.9 | 3 | 17 | 1 | 11 | 0.31 | 4 | 950 | 36.2% | 44.7% | 36% |
| 1.9 | 3 | 17 | 1 | 14 | 0.31 | 2 | 900 | 37.3% | 35.4% | 37% |
| 1.9 | 3 | 18 | 1 | 10 | 0.31 | 4 | 950 | 36.8% | 46.8% | 36% |
| 1.9 | 3 | 18 | 1 | 13 | 0.31 | 2 | 900 | 37.5% | 37.7% | 37% |
| 1.9 | 3 | 19 | 1 | 9 | 0.31 | 4 | 950 | 37.2% | 48.8% | 36% |
| 1.9 | 3 | 19 | 1 | 12 | 0.31 | 2 | 900 | 37.7% | 39.9% | 37% |
| 1.9 | 3 | 20 | 1 | 9 | 0.31 | 4 | 950 | 37.8% | 48.5% | 37% |
| 1.9 | 3 | 20 | 1 | 12 | 0.31 | 0 | 900 | 37.0% | 42.4% | 36% |
| 1.9 | 3 | 21 | 1 | 10 | 0.31 | 2 | 950 | 37.9% | 44.4% | 37% |
| 1.9 | 3 | 22 | 1 | 9 | 0.31 | 2 | 950 | 38.0% | 46.6% | 37% |
| 1.9 | 3 | 23 | 1 | 9 | 0.31 | 0 | 950 | 37.4% | 44.9% | 36% |
| 1.9 | 3.2 | 9 | 1 | 17 | 0.31 | 6 | 850 | 30.4% | 34.0% | 36% |
| 1.9 | 3.2 | 9 | 1 | 20 | 0.31 | 4 | 850 | 31.8% | 28.5% | 37% |
| 1.9 | 3.2 | 10 | 1 | 14 | 0.31 | 8 | 900 | 30.8% | 40.6% | 36% |
| 1.9 | 3.2 | 10 | 1 | 17 | 0.31 | 6 | 850 | 31.6% | 32.5% | 37% |
| 1.9 | 3.2 | 10 | 1 | 20 | 0.31 | 2 | 850 | 33.1% | 29.2% | 36% |
| 1.9 | 3.2 | 11 | 1 | 12 | 0.31 | 10 | 950 | 31.1% | 45.4% | 37% |
| 1.9 | 3.2 | 11 | 1 | 15 | 0.31 | 6 | 900 | 32.5% | 36.9% | 36% |
| 1.9 | 3.2 | 11 | 1 | 18 | 0.31 | 4 | 850 | 33.9% | 30.6% | 37% |
| 1.9 | 3.2 | 11 | 1 | 21 | 0.31 | 0 | 800 | 32.1% | 27.5% | 36% |
| 1.9 | 3.2 | 12 | 1 | 11 | 0.31 | 10 | 950 | 31.8% | 47.3% | 37% |
| 1.9 | 3.2 | 12 | 1 | 14 | 0.31 | 6 | 900 | 33.4% | 38.8% | 36% |
| 1.9 | 3.2 | 12 | 1 | 17 | 0.31 | 4 | 850 | 34.8% | 31.7% | 37% |
| 1.9 | 3.2 | 12 | 1 | 20 | 0.31 | 0 | 850 | 35.6% | 28.6% | 36% |
| 1.9 | 3.2 | 13 | 1 | 11 | 0.31 | 8 | 950 | 33.2% | 46.4% | 37% |
| 1.9 | 3.2 | 13 | 1 | 14 | 0.31 | 6 | 900 | 34.4% | 38.3% | 37% |
| 1.9 | 3.2 | 13 | 1 | 17 | 0.31 | 2 | 850 | 37.4% | 32.4% | 36% |
| 1.9 | 3.2 | 13 | 1 | 20 | 0.31 | 0 | 800 | 37.9% | 27.1% | 36% |
| 1.9 | 3.2 | 14 | 1 | 12 | 0.31 | 6 | 900 | 35.0% | 42.8% | 36% |
| 1.9 | 3.2 | 14 | 1 | 15 | 0.31 | 4 | 900 | 36.4% | 34.0% | 37% |
| 1.9 | 3.2 | 14 | 1 | 18 | 0.31 | 0 | 850 | 37.9% | 30.7% | 36% |
| 1.9 | 3.2 | 15 | 1 | 11 | 0.31 | 6 | 950 | 35.7% | 44.8% | 36% |
| 1.9 | 3.2 | 15 | 1 | 14 | 0.31 | 4 | 900 | 37.1% | 36.1% | 37% |
| 1.9 | 3.2 | 15 | 1 | 17 | 0.31 | 0 | 850 | 38.2% | 33.4% | 36% |
| 1.9 | 3.2 | 16 | 1 | 11 | 0.31 | 6 | 950 | 36.4% | 44.4% | 36% |
| 1.9 | 3.2 | 16 | 1 | 14 | 0.31 | 2 | 900 | 39.0% | 35.5% | 36% |
| 1.9 | 3.2 | 16 | 1 | 17 | 0.31 | 0 | 850 | 38.7% | 32.9% | 36% |
| 1.9 | 3.2 | 17 | 1 | 12 | 0.31 | 4 | 900 | 38.4% | 40.3% | 37% |
| 1.9 | 3.2 | 17 | 1 | 15 | 0.31 | 0 | 850 | 38.7% | 38.0% | 36% |
| 1.9 | 3.2 | 18 | 1 | 10 | 0.31 | 4 | 950 | 38.8% | 44.9% | 36% |
| 1.9 | 3.2 | 18 | 1 | 13 | 0.31 | 2 | 900 | 39.7% | 35.6% | 37% |

TABLE 16-continued

Example Compositions and Thermodynamic Criteria

| Al | C | Cr | Mn | Ni | Si | V | 1 | 2 | 3 | 4 |
|---|---|---|---|---|---|---|---|---|---|---|
| 1.9 | 3.2 | 19 | 1 | 9 | 0.31 | 4 | 950 | 39.3% | 46.9% | 36% |
| 1.9 | 3.2 | 19 | 1 | 12 | 0.31 | 2 | 900 | 39.8% | 37.8% | 37% |
| 1.9 | 3.2 | 20 | 1 | 9 | 0.31 | 4 | 950 | 39.9% | 46.6% | 37% |
| 1.9 | 3.2 | 20 | 1 | 12 | 0.31 | 0 | 900 | 39.3% | 43.3% | 36% |
| 1.9 | 3.2 | 21 | 1 | 10 | 0.31 | 2 | 950 | 40.1% | 42.3% | 37% |
| 1.9 | 3.2 | 22 | 1 | 9 | 0.31 | 2 | 950 | 40.2% | 44.5% | 37% |
| 1.9 | 3.2 | 23 | 1 | 9 | 0.31 | 0 | 950 | 39.6% | 42.5% | 36% |
| 1.9 | 3.4 | 8 | 1 | 16 | 0.31 | 8 | 850 | 30.0% | 35.6% | 36% |
| 1.9 | 3.4 | 8 | 1 | 18 | 0.31 | 6 | 850 | 30.6% | 32.5% | 36% |
| 1.9 | 3.4 | 9 | 1 | 13 | 0.31 | 10 | 900 | 30.9% | 42.4% | 36% |
| 1.9 | 3.4 | 9 | 1 | 15 | 0.31 | 8 | 900 | 31.3% | 37.3% | 36% |
| 1.9 | 3.4 | 9 | 1 | 17 | 0.31 | 6 | 850 | 32.0% | 33.5% | 36% |
| 1.9 | 3.4 | 9 | 1 | 19 | 0.31 | 4 | 850 | 32.9% | 30.7% | 36% |
| 1.9 | 3.4 | 10 | 1 | 12 | 0.31 | 10 | 950 | 31.9% | 44.3% | 36% |
| 1.9 | 3.4 | 10 | 1 | 14 | 0.31 | 8 | 900 | 32.4% | 39.1% | 36% |
| 1.9 | 3.4 | 10 | 1 | 16 | 0.31 | 6 | 850 | 33.1% | 34.6% | 36% |
| 1.9 | 3.4 | 10 | 1 | 18 | 0.31 | 4 | 850 | 34.6% | 31.7% | 36% |
| 1.9 | 3.4 | 10 | 1 | 20 | 0.31 | 2 | 850 | 32.9% | 28.9% | 36% |
| 1.9 | 3.4 | 11 | 1 | 11 | 0.31 | 10 | 950 | 32.7% | 46.2% | 36% |
| 1.9 | 3.4 | 11 | 1 | 13 | 0.31 | 8 | 900 | 33.4% | 40.9% | 36% |
| 1.9 | 3.4 | 11 | 1 | 15 | 0.31 | 6 | 900 | 34.2% | 35.6% | 36% |
| 1.9 | 3.4 | 11 | 1 | 17 | 0.31 | 4 | 850 | 35.6% | 32.8% | 36% |
| 1.9 | 3.4 | 11 | 1 | 19 | 0.31 | 2 | 850 | 36.4% | 29.9% | 36% |
| 1.9 | 3.4 | 11 | 1 | 21 | 0.31 | 0 | 800 | 31.9% | 27.1% | 36% |
| 1.9 | 3.4 | 12 | 1 | 11 | 0.31 | 8 | 950 | 34.1% | 45.2% | 35% |
| 1.9 | 3.4 | 12 | 1 | 13 | 0.31 | 6 | 900 | 35.0% | 39.7% | 35% |
| 1.9 | 3.4 | 12 | 1 | 15 | 0.31 | 4 | 850 | 36.4% | 36.3% | 35% |
| 1.9 | 3.4 | 12 | 1 | 17 | 0.31 | 2 | 850 | 38.5% | 33.5% | 35% |
| 1.9 | 3.4 | 12 | 1 | 19 | 0.31 | 0 | 850 | 35.8% | 30.8% | 35% |
| 1.9 | 3.4 | 12 | 1 | 21 | 0.31 | 0 | 800 | 34.9% | 25.6% | 37% |
| 1.9 | 3.4 | 13 | 1 | 11 | 0.31 | 8 | 950 | 35.0% | 44.7% | 36% |
| 1.9 | 3.4 | 13 | 1 | 13 | 0.31 | 6 | 900 | 36.0% | 39.1% | 36% |
| 1.9 | 3.4 | 13 | 1 | 15 | 0.31 | 4 | 850 | 37.4% | 34.8% | 36% |
| 1.9 | 3.4 | 13 | 1 | 17 | 0.31 | 2 | 850 | 39.5% | 32.0% | 36% |
| 1.9 | 3.4 | 13 | 1 | 19 | 0.31 | 0 | 850 | 38.8% | 29.3% | 36% |
| 1.9 | 3.4 | 14 | 1 | 11 | 0.31 | 6 | 950 | 36.7% | 43.5% | 35% |
| 1.9 | 3.4 | 14 | 1 | 13 | 0.31 | 4 | 900 | 38.0% | 38.4% | 35% |
| 1.9 | 3.4 | 14 | 1 | 15 | 0.31 | 2 | 850 | 39.9% | 35.6% | 35% |
| 1.9 | 3.4 | 14 | 1 | 17 | 0.31 | 0 | 850 | 40.0% | 33.5% | 35% |
| 1.9 | 3.4 | 14 | 1 | 19 | 0.31 | 0 | 850 | 40.5% | 27.8% | 37% |
| 1.9 | 3.4 | 15 | 1 | 11 | 0.31 | 6 | 950 | 37.5% | 43.0% | 36% |
| 1.9 | 3.4 | 15 | 1 | 13 | 0.31 | 4 | 900 | 38.9% | 36.9% | 36% |
| 1.9 | 3.4 | 15 | 1 | 15 | 0.31 | 2 | 850 | 40.8% | 34.1% | 36% |
| 1.9 | 3.4 | 15 | 1 | 17 | 0.31 | 0 | 850 | 40.5% | 33.1% | 36% |
| 1.9 | 3.4 | 16 | 1 | 10 | 0.31 | 6 | 950 | 38.2% | 45.0% | 36% |
| 1.9 | 3.4 | 16 | 1 | 12 | 0.31 | 4 | 900 | 39.6% | 38.8% | 36% |
| 1.9 | 3.4 | 16 | 1 | 14 | 0.31 | 2 | 850 | 41.2% | 35.1% | 36% |
| 1.9 | 3.4 | 16 | 1 | 16 | 0.31 | 0 | 850 | 40.8% | 35.5% | 36% |
| 1.9 | 3.4 | 17 | 1 | 10 | 0.31 | 4 | 950 | 40.0% | 43.3% | 35% |
| 1.9 | 3.4 | 17 | 1 | 12 | 0.31 | 2 | 900 | 41.2% | 38.7% | 35% |
| 1.9 | 3.4 | 17 | 1 | 14 | 0.31 | 0 | 850 | 40.7% | 40.2% | 35% |
| 1.9 | 3.4 | 17 | 1 | 16 | 0.31 | 0 | 850 | 41.2% | 35.0% | 37% |
| 1.9 | 3.4 | 18 | 1 | 10 | 0.31 | 4 | 950 | 40.8% | 42.9% | 36% |
| 1.9 | 3.4 | 18 | 1 | 12 | 0.31 | 2 | 900 | 41.6% | 37.2% | 36% |
| 1.9 | 3.4 | 18 | 1 | 14 | 0.31 | 0 | 850 | 41.2% | 39.7% | 36% |
| 1.9 | 3.4 | 19 | 1 | 10 | 0.31 | 2 | 950 | 41.6% | 41.0% | 35% |
| 1.9 | 3.4 | 19 | 1 | 12 | 0.31 | 0 | 900 | 41.1% | 43.6% | 35% |
| 1.9 | 3.4 | 19 | 1 | 14 | 0.31 | 0 | 850 | 41.6% | 39.1% | 37% |
| 1.9 | 3.4 | 20 | 1 | 10 | 0.31 | 2 | 950 | 42.0% | 40.4% | 36% |
| 1.9 | 3.4 | 20 | 1 | 12 | 0.31 | 0 | 900 | 41.5% | 42.9% | 36% |
| 1.9 | 3.4 | 21 | 1 | 10 | 0.31 | 0 | 950 | 41.4% | 46.2% | 35% |
| 1.9 | 3.4 | 21 | 1 | 12 | 0.31 | 0 | 900 | 41.9% | 42.3% | 37% |
| 1.9 | 3.4 | 22 | 1 | 10 | 0.31 | 0 | 950 | 41.7% | 45.6% | 36% |
| 1.9 | 3.4 | 23 | 1 | 10 | 0.31 | 0 | 950 | 42.1% | 42.5% | 37% |
| 1.9 | 3.6 | 8 | 1 | 14 | 0.31 | 10 | 900 | 31.2% | 39.2% | 37% |
| 1.9 | 3.6 | 8 | 1 | 16 | 0.31 | 8 | 850 | 31.4% | 34.9% | 37% |
| 1.9 | 3.6 | 8 | 1 | 18 | 0.31 | 6 | 850 | 32.2% | 32.1% | 37% |
| 1.9 | 3.6 | 9 | 1 | 13 | 0.31 | 10 | 900 | 32.4% | 41.0% | 37% |
| 1.9 | 3.6 | 9 | 1 | 15 | 0.31 | 8 | 900 | 32.7% | 36.1% | 37% |
| 1.9 | 3.6 | 9 | 1 | 17 | 0.31 | 6 | 850 | 33.6% | 33.1% | 37% |
| 1.9 | 3.6 | 9 | 1 | 19 | 0.31 | 4 | 850 | 32.7% | 30.3% | 37% |
| 1.9 | 3.6 | 10 | 1 | 12 | 0.31 | 10 | 900 | 33.4% | 42.8% | 37% |
| 1.9 | 3.6 | 10 | 1 | 14 | 0.31 | 8 | 900 | 33.9% | 37.7% | 37% |
| 1.9 | 3.6 | 10 | 1 | 16 | 0.31 | 6 | 850 | 34.8% | 34.2% | 37% |
| 1.9 | 3.6 | 10 | 1 | 18 | 0.31 | 4 | 850 | 36.3% | 31.4% | 37% |
| 1.9 | 3.6 | 10 | 1 | 20 | 0.31 | 2 | 850 | 32.7% | 28.5% | 37% |

TABLE 16-continued

Example Compositions and Thermodynamic Criteria

| Al | C | Cr | Mn | Ni | Si | V | 1 | 2 | 3 | 4 |
|---|---|---|---|---|---|---|---|---|---|---|
| 1.9 | 3.6 | 11 | 1 | 11 | 0.31 | 10 | 950 | 34.3% | 44.7% | 37% |
| 1.9 | 3.6 | 11 | 1 | 13 | 0.31 | 8 | 900 | 35.0% | 39.5% | 37% |
| 1.9 | 3.6 | 11 | 1 | 15 | 0.31 | 6 | 850 | 35.9% | 35.2% | 37% |
| 1.9 | 3.6 | 11 | 1 | 17 | 0.31 | 4 | 850 | 37.5% | 32.4% | 37% |
| 1.9 | 3.6 | 11 | 1 | 19 | 0.31 | 2 | 850 | 36.2% | 29.5% | 37% |
| 1.9 | 3.6 | 11 | 1 | 21 | 0.31 | 0 | 800 | 31.7% | 26.8% | 37% |
| 1.9 | 3.6 | 12 | 1 | 11 | 0.31 | 8 | 950 | 35.8% | 43.7% | 36% |
| 1.9 | 3.6 | 12 | 1 | 13 | 0.31 | 6 | 900 | 36.7% | 38.7% | 36% |
| 1.9 | 3.6 | 12 | 1 | 15 | 0.31 | 4 | 850 | 38.2% | 35.9% | 36% |
| 1.9 | 3.6 | 12 | 1 | 17 | 0.31 | 2 | 850 | 40.1% | 33.1% | 36% |
| 1.9 | 3.6 | 12 | 1 | 19 | 0.31 | 0 | 850 | 35.5% | 30.4% | 36% |
| 1.9 | 3.6 | 12 | 1 | 21 | 0.31 | 0 | 800 | 34.7% | 25.3% | 38% |
| 1.9 | 3.6 | 13 | 1 | 11 | 0.31 | 8 | 950 | 36.7% | 43.1% | 37% |
| 1.9 | 3.6 | 13 | 1 | 13 | 0.31 | 6 | 900 | 37.8% | 37.6% | 37% |
| 1.9 | 3.6 | 13 | 1 | 15 | 0.31 | 4 | 850 | 39.3% | 34.4% | 37% |
| 1.9 | 3.6 | 13 | 1 | 17 | 0.31 | 2 | 850 | 41.6% | 31.6% | 37% |
| 1.9 | 3.6 | 13 | 1 | 19 | 0.31 | 0 | 850 | 38.6% | 28.9% | 37% |
| 1.9 | 3.6 | 14 | 1 | 10 | 0.31 | 8 | 950 | 37.5% | 45.0% | 37% |
| 1.9 | 3.6 | 14 | 1 | 12 | 0.31 | 6 | 900 | 38.6% | 39.4% | 37% |
| 1.9 | 3.6 | 14 | 1 | 14 | 0.31 | 4 | 900 | 40.0% | 35.5% | 37% |
| 1.9 | 3.6 | 14 | 1 | 16 | 0.31 | 2 | 850 | 42.2% | 32.7% | 37% |
| 1.9 | 3.6 | 14 | 1 | 18 | 0.31 | 0 | 850 | 42.0% | 30.1% | 37% |
| 1.9 | 3.6 | 15 | 1 | 10 | 0.31 | 6 | 950 | 39.2% | 43.7% | 36% |
| 1.9 | 3.6 | 15 | 1 | 12 | 0.31 | 4 | 900 | 40.6% | 38.9% | 36% |
| 1.9 | 3.6 | 15 | 1 | 14 | 0.31 | 2 | 850 | 42.7% | 36.2% | 36% |
| 1.9 | 3.6 | 15 | 1 | 16 | 0.31 | 0 | 850 | 42.5% | 35.7% | 36% |
| 1.9 | 3.6 | 15 | 1 | 18 | 0.31 | 0 | 850 | 43.1% | 29.6% | 38% |
| 1.9 | 3.6 | 16 | 1 | 10 | 0.31 | 6 | 950 | 40.0% | 43.2% | 37% |
| 1.9 | 3.6 | 16 | 1 | 12 | 0.31 | 4 | 900 | 41.5% | 37.5% | 37% |
| 1.9 | 3.6 | 16 | 1 | 14 | 0.31 | 2 | 850 | 43.4% | 34.7% | 37% |
| 1.9 | 3.6 | 16 | 1 | 16 | 0.31 | 0 | 850 | 43.0% | 35.2% | 37% |
| 1.9 | 3.6 | 17 | 1 | 10 | 0.31 | 4 | 950 | 41.9% | 41.5% | 36% |
| 1.9 | 3.6 | 17 | 1 | 12 | 0.31 | 2 | 900 | 43.3% | 38.2% | 36% |
| 1.9 | 3.6 | 17 | 1 | 14 | 0.31 | 0 | 850 | 43.0% | 39.9% | 36% |
| 1.9 | 3.6 | 17 | 1 | 16 | 0.31 | 0 | 850 | 43.5% | 34.7% | 38% |
| 1.9 | 3.6 | 18 | 1 | 10 | 0.31 | 4 | 950 | 42.7% | 41.1% | 37% |
| 1.9 | 3.6 | 18 | 1 | 12 | 0.31 | 2 | 900 | 43.8% | 36.8% | 37% |
| 1.9 | 3.6 | 18 | 1 | 14 | 0.31 | 0 | 850 | 43.4% | 39.3% | 37% |
| 1.9 | 3.6 | 19 | 1 | 10 | 0.31 | 2 | 950 | 43.7% | 40.8% | 36% |
| 1.9 | 3.6 | 19 | 1 | 12 | 0.31 | 0 | 900 | 43.3% | 43.2% | 36% |
| 1.9 | 3.6 | 19 | 1 | 14 | 0.31 | 0 | 850 | 43.8% | 38.7% | 38% |
| 1.9 | 3.6 | 20 | 1 | 10 | 0.31 | 2 | 850 | 44.1% | 40.3% | 37% |
| 1.9 | 3.6 | 20 | 1 | 12 | 0.31 | 0 | 900 | 43.7% | 42.5% | 37% |
| 1.9 | 3.6 | 21 | 1 | 9 | 0.31 | 2 | 950 | 44.2% | 40.5% | 37% |
| 1.9 | 3.6 | 21 | 1 | 11 | 0.31 | 0 | 900 | 43.8% | 43.9% | 37% |
| 1.9 | 3.6 | 22 | 1 | 9 | 0.31 | 2 | 850 | 44.6% | 40.3% | 38% |
| 1.9 | 3.6 | 23 | 1 | 8 | 0.31 | 0 | 950 | 43.8% | 48.0% | 36% |
| 1.9 | 3.6 | 24 | 1 | 8 | 0.31 | 0 | 950 | 44.1% | 46.4% | 37% |
| 1.9 | 3.8 | 7 | 1 | 15 | 0.31 | 10 | 900 | 31.1% | 36.5% | 37% |
| 1.9 | 3.8 | 8 | 1 | 13 | 0.31 | 10 | 900 | 32.4% | 40.5% | 36% |
| 1.9 | 3.8 | 8 | 1 | 16 | 0.31 | 8 | 850 | 32.8% | 34.5% | 37% |
| 1.9 | 3.8 | 9 | 1 | 12 | 0.31 | 10 | 900 | 33.7% | 42.1% | 36% |
| 1.9 | 3.8 | 9 | 1 | 15 | 0.31 | 8 | 900 | 34.2% | 35.5% | 37% |
| 1.9 | 3.8 | 9 | 1 | 18 | 0.31 | 4 | 850 | 32.8% | 32.5% | 36% |
| 1.9 | 3.8 | 10 | 1 | 12 | 0.31 | 10 | 900 | 34.9% | 41.4% | 37% |
| 1.9 | 3.8 | 10 | 1 | 15 | 0.31 | 6 | 850 | 36.3% | 36.2% | 36% |
| 1.9 | 3.8 | 10 | 1 | 18 | 0.31 | 4 | 850 | 36.0% | 31.0% | 37% |
| 1.9 | 3.8 | 11 | 1 | 10 | 0.31 | 10 | 950 | 35.8% | 45.5% | 36% |
| 1.9 | 3.8 | 11 | 1 | 13 | 0.31 | 8 | 900 | 36.5% | 38.1% | 37% |
| 1.9 | 3.8 | 11 | 1 | 16 | 0.31 | 4 | 850 | 39.2% | 34.5% | 36% |
| 1.9 | 3.8 | 11 | 1 | 19 | 0.31 | 2 | 850 | 35.9% | 29.2% | 37% |
| 1.9 | 3.8 | 12 | 1 | 9 | 0.31 | 10 | 950 | 36.7% | 47.2% | 36% |
| 1.9 | 3.8 | 12 | 1 | 12 | 0.31 | 8 | 900 | 37.5% | 39.8% | 37% |
| 1.9 | 3.8 | 12 | 1 | 15 | 0.31 | 4 | 850 | 40.1% | 35.5% | 36% |
| 1.9 | 3.8 | 12 | 1 | 18 | 0.31 | 2 | 850 | 39.4% | 30.2% | 37% |
| 1.9 | 3.8 | 13 | 1 | 9 | 0.31 | 10 | 950 | 37.6% | 46.7% | 37% |
| 1.9 | 3.8 | 13 | 1 | 12 | 0.31 | 6 | 900 | 39.3% | 39.2% | 36% |
| 1.9 | 3.8 | 13 | 1 | 15 | 0.31 | 4 | 850 | 41.1% | 34.0% | 37% |
| 1.9 | 3.8 | 13 | 1 | 18 | 0.31 | 0 | 850 | 38.7% | 31.1% | 36% |
| 1.9 | 3.8 | 14 | 1 | 10 | 0.31 | 8 | 950 | 39.2% | 43.4% | 37% |
| 1.9 | 3.8 | 14 | 1 | 13 | 0.31 | 4 | 900 | 41.7% | 37.5% | 36% |
| 1.9 | 3.8 | 14 | 1 | 16 | 0.31 | 2 | 850 | 44.3% | 32.3% | 37% |
| 1.9 | 3.8 | 15 | 1 | 9 | 0.31 | 8 | 950 | 40.0% | 45.2% | 37% |
| 1.9 | 3.8 | 15 | 1 | 12 | 0.31 | 4 | 900 | 42.5% | 38.5% | 36% |
| 1.9 | 3.8 | 15 | 1 | 15 | 0.31 | 2 | 850 | 45.0% | 33.3% | 37% |
| 1.9 | 3.8 | 16 | 1 | 9 | 0.31 | 6 | 950 | 41.7% | 43.9% | 36% |
| 1.9 | 3.8 | 16 | 1 | 12 | 0.31 | 4 | 900 | 43.4% | 37.1% | 37% |
| 1.9 | 3.8 | 16 | 1 | 15 | 0.31 | 0 | 850 | 45.1% | 37.6% | 36% |
| 1.9 | 3.8 | 17 | 1 | 10 | 0.31 | 4 | 950 | 43.8% | 40.5% | 36% |
| 1.9 | 3.8 | 17 | 1 | 13 | 0.31 | 2 | 900 | 45.8% | 35.3% | 37% |
| 1.9 | 3.8 | 18 | 1 | 9 | 0.31 | 4 | 950 | 44.4% | 41.7% | 36% |
| 1.9 | 3.8 | 18 | 1 | 12 | 0.31 | 2 | 900 | 45.9% | 36.4% | 37% |
| 1.9 | 3.8 | 19 | 1 | 8 | 0.31 | 4 | 950 | 45.0% | 43.6% | 36% |
| 1.9 | 3.8 | 19 | 1 | 11 | 0.31 | 2 | 900 | 46.1% | 37.8% | 37% |
| 1.9 | 3.8 | 20 | 1 | 9 | 0.31 | 2 | 950 | 46.0% | 42.4% | 36% |
| 1.9 | 3.8 | 20 | 1 | 12 | 0.31 | 0 | 900 | 45.9% | 42.2% | 37% |
| 1.9 | 3.8 | 21 | 1 | 10 | 0.31 | 0 | 900 | 45.8% | 45.4% | 36% |
| 1.9 | 3.8 | 22 | 1 | 9 | 0.31 | 0 | 950 | 45.9% | 46.5% | 36% |
| 1.9 | 3.8 | 23 | 1 | 9 | 0.31 | 0 | 950 | 46.2% | 45.8% | 37% |
| 1.9 | 4 | 6 | 1 | 16 | 0.31 | 10 | 850 | 30.4% | 34.9% | 37% |
| 1.9 | 4 | 7 | 1 | 16 | 0.31 | 8 | 850 | 32.3% | 35.6% | 36% |
| 1.9 | 4 | 8 | 1 | 14 | 0.31 | 10 | 900 | 33.8% | 37.0% | 37% |
| 1.9 | 4 | 8 | 1 | 17 | 0.31 | 6 | 850 | 32.5% | 33.8% | 36% |
| 1.9 | 4 | 9 | 1 | 13 | 0.31 | 10 | 900 | 35.1% | 38.5% | 37% |
| 1.9 | 4 | 9 | 1 | 16 | 0.31 | 6 | 850 | 36.1% | 34.8% | 36% |
| 1.9 | 4 | 9 | 1 | 19 | 0.31 | 4 | 850 | 32.3% | 29.6% | 37% |
| 1.9 | 4 | 10 | 1 | 13 | 0.31 | 8 | 900 | 36.8% | 38.5% | 36% |
| 1.9 | 4 | 10 | 1 | 16 | 0.31 | 6 | 850 | 38.1% | 33.4% | 37% |
| 1.9 | 4 | 10 | 1 | 19 | 0.31 | 2 | 850 | 32.6% | 30.3% | 36% |
| 1.9 | 4 | 11 | 1 | 11 | 0.31 | 10 | 950 | 37.4% | 41.7% | 37% |
| 1.9 | 4 | 11 | 1 | 14 | 0.31 | 6 | 900 | 39.1% | 36.8% | 36% |
| 1.9 | 4 | 11 | 1 | 17 | 0.31 | 4 | 850 | 39.3% | 31.6% | 37% |
| 1.9 | 4 | 11 | 1 | 20 | 0.31 | 0 | 850 | 31.6% | 28.6% | 36% |
| 1.9 | 4 | 12 | 1 | 10 | 0.31 | 10 | 950 | 38.3% | 43.5% | 37% |
| 1.9 | 4 | 12 | 1 | 13 | 0.31 | 6 | 900 | 40.1% | 37.8% | 36% |
| 1.9 | 4 | 12 | 1 | 16 | 0.31 | 4 | 850 | 42.2% | 32.6% | 37% |
| 1.9 | 4 | 12 | 1 | 19 | 0.31 | 0 | 850 | 35.1% | 29.6% | 36% |
| 1.9 | 4 | 13 | 1 | 10 | 0.31 | 8 | 950 | 39.9% | 42.5% | 36% |
| 1.9 | 4 | 13 | 1 | 13 | 0.31 | 6 | 900 | 41.2% | 36.6% | 37% |
| 1.9 | 4 | 13 | 1 | 16 | 0.31 | 2 | 850 | 42.9% | 33.4% | 36% |
| 1.9 | 4 | 13 | 1 | 19 | 0.31 | 0 | 850 | 38.0% | 28.2% | 37% |
| 1.9 | 4 | 14 | 1 | 11 | 0.31 | 6 | 900 | 41.9% | 39.7% | 36% |
| 1.9 | 4 | 14 | 1 | 14 | 0.31 | 4 | 850 | 43.8% | 34.6% | 37% |
| 1.9 | 4 | 14 | 1 | 17 | 0.31 | 0 | 850 | 41.9% | 32.6% | 36% |
| 1.9 | 4 | 15 | 1 | 10 | 0.31 | 6 | 950 | 42.7% | 40.7% | 36% |
| 1.9 | 4 | 15 | 1 | 13 | 0.31 | 4 | 900 | 44.6% | 35.7% | 37% |
| 1.9 | 4 | 15 | 1 | 16 | 0.31 | 0 | 850 | 45.2% | 35.1% | 36% |
| 1.9 | 4 | 16 | 1 | 10 | 0.31 | 6 | 950 | 43.6% | 39.9% | 37% |
| 1.9 | 4 | 16 | 1 | 13 | 0.31 | 2 | 900 | 47.4% | 36.4% | 36% |
| 1.9 | 4 | 16 | 1 | 16 | 0.31 | 0 | 850 | 47.7% | 34.6% | 37% |
| 1.9 | 4 | 17 | 1 | 11 | 0.31 | 4 | 900 | 45.9% | 37.6% | 37% |
| 1.9 | 4 | 17 | 1 | 14 | 0.31 | 0 | 850 | 47.5% | 39.2% | 36% |
| 1.9 | 4 | 18 | 1 | 10 | 0.31 | 4 | 950 | 46.5% | 39.3% | 37% |
| 1.9 | 4 | 18 | 1 | 13 | 0.31 | 0 | 900 | 47.7% | 40.9% | 36% |
| 1.9 | 4 | 19 | 1 | 9 | 0.31 | 4 | 950 | 47.1% | 41.2% | 37% |
| 1.9 | 4 | 19 | 1 | 12 | 0.31 | 0 | 900 | 47.8% | 42.4% | 36% |
| 1.9 | 4 | 20 | 1 | 9 | 0.31 | 2 | 950 | 48.1% | 42.1% | 36% |
| 1.9 | 4 | 20 | 1 | 12 | 0.31 | 0 | 900 | 48.2% | 41.8% | 37% |
| 1.9 | 4 | 21 | 1 | 10 | 0.31 | 0 | 900 | 48.0% | 45.0% | 36% |
| 1.9 | 4 | 22 | 1 | 9 | 0.31 | 0 | 950 | 48.1% | 46.1% | 36% |
| 1.9 | 4 | 23 | 1 | 9 | 0.31 | 0 | 950 | 48.4% | 45.4% | 37% |
| 1.9 | 4.2 | 6 | 1 | 16 | 0.31 | 10 | 850 | 31.5% | 34.5% | 37% |
| 1.9 | 4.2 | 7 | 1 | 16 | 0.31 | 8 | 850 | 32.1% | 35.2% | 36% |
| 1.9 | 4.2 | 8 | 1 | 14 | 0.31 | 10 | 900 | 35.0% | 36.4% | 37% |
| 1.9 | 4.2 | 8 | 1 | 17 | 0.31 | 6 | 850 | 32.3% | 33.4% | 36% |
| 1.9 | 4.2 | 9 | 1 | 13 | 0.31 | 10 | 900 | 36.4% | 37.4% | 37% |
| 1.9 | 4.2 | 9 | 1 | 16 | 0.31 | 6 | 850 | 35.9% | 34.4% | 36% |
| 1.9 | 4.2 | 9 | 1 | 19 | 0.31 | 4 | 850 | 32.1% | 29.2% | 37% |
| 1.9 | 4.2 | 10 | 1 | 13 | 0.31 | 8 | 850 | 38.3% | 38.1% | 36% |
| 1.9 | 4.2 | 10 | 1 | 16 | 0.31 | 6 | 850 | 39.1% | 33.0% | 37% |
| 1.9 | 4.2 | 10 | 1 | 19 | 0.31 | 2 | 850 | 32.4% | 29.9% | 36% |
| 1.9 | 4.2 | 11 | 1 | 11 | 0.31 | 10 | 950 | 38.8% | 40.4% | 37% |
| 1.9 | 4.2 | 11 | 1 | 14 | 0.31 | 6 | 900 | 40.8% | 36.4% | 36% |
| 1.9 | 4.2 | 11 | 1 | 17 | 0.31 | 4 | 850 | 39.0% | 31.2% | 37% |
| 1.9 | 4.2 | 11 | 1 | 20 | 0.31 | 0 | 850 | 31.4% | 28.2% | 36% |
| 1.9 | 4.2 | 12 | 1 | 10 | 0.31 | 10 | 950 | 39.9% | 42.1% | 37% |
| 1.9 | 4.2 | 12 | 1 | 13 | 0.31 | 6 | 900 | 41.8% | 37.4% | 36% |
| 1.9 | 4.2 | 12 | 1 | 16 | 0.31 | 4 | 850 | 42.5% | 32.2% | 37% |
| 1.9 | 4.2 | 12 | 1 | 19 | 0.31 | 0 | 850 | 34.8% | 29.3% | 36% |
| 1.9 | 4.2 | 13 | 1 | 10 | 0.31 | 8 | 950 | 41.5% | 41.1% | 36% |
| 1.9 | 4.2 | 13 | 1 | 13 | 0.31 | 6 | 900 | 42.9% | 36.0% | 37% |
| 1.9 | 4.2 | 13 | 1 | 16 | 0.31 | 2 | 850 | 42.6% | 33.0% | 36% |

TABLE 16-continued

Example Compositions and Thermodynamic Criteria

| Al | C | Cr | Mn | Ni | Si | V | 1 | 2 | 3 | 4 |
|---|---|---|---|---|---|---|---|---|---|---|
| 1.9 | 4.2 | 13 | 1 | 19 | 0.31 | 0 | 850 | 37.8% | 27.8% | 37% |
| 1.9 | 4.2 | 14 | 1 | 11 | 0.31 | 6 | 900 | 43.6% | 39.3% | 36% |
| 1.9 | 4.2 | 14 | 1 | 14 | 0.31 | 4 | 850 | 45.8% | 34.3% | 37% |
| 1.9 | 4.2 | 14 | 1 | 17 | 0.31 | 0 | 850 | 41.6% | 32.4% | 36% |
| 1.9 | 4.2 | 15 | 1 | 10 | 0.31 | 6 | 950 | 44.4% | 40.3% | 36% |
| 1.9 | 4.2 | 15 | 1 | 13 | 0.31 | 4 | 900 | 46.5% | 35.2% | 37% |
| 1.9 | 4.2 | 15 | 1 | 16 | 0.31 | 0 | 850 | 44.9% | 34.7% | 36% |
| 1.9 | 4.2 | 16 | 1 | 10 | 0.31 | 6 | 950 | 45.3% | 38.9% | 37% |
| 1.9 | 4.2 | 16 | 1 | 13 | 0.31 | 2 | 900 | 49.5% | 36.0% | 36% |
| 1.9 | 4.2 | 16 | 1 | 16 | 0.31 | 0 | 850 | 47.6% | 34.2% | 37% |
| 1.9 | 4.2 | 17 | 1 | 10 | 0.31 | 4 | 900 | 47.6% | 39.6% | 36% |
| 1.9 | 4.2 | 17 | 1 | 13 | 0.31 | 2 | 900 | 50.2% | 34.5% | 37% |
| 1.9 | 4.2 | 18 | 1 | 8 | 0.31 | 6 | 950 | 46.7% | 41.9% | 37% |
| 1.9 | 4.2 | 18 | 1 | 11 | 0.31 | 2 | 900 | 50.0% | 38.0% | 36% |
| 1.9 | 4.2 | 18 | 1 | 14 | 0.31 | 0 | 850 | 50.3% | 38.2% | 37% |
| 1.9 | 4.2 | 19 | 1 | 10 | 0.31 | 2 | 900 | 50.1% | 39.8% | 36% |
| 1.9 | 4.2 | 19 | 1 | 13 | 0.31 | 0 | 900 | 50.3% | 39.9% | 37% |
| 1.9 | 4.2 | 20 | 1 | 10 | 0.31 | 2 | 900 | 50.5% | 39.3% | 37% |
| 1.9 | 4.2 | 21 | 1 | 8 | 0.31 | 2 | 950 | 50.3% | 43.4% | 36% |
| 1.9 | 4.2 | 21 | 1 | 11 | 0.31 | 0 | 900 | 50.5% | 42.7% | 37% |
| 1.9 | 4.2 | 22 | 1 | 10 | 0.31 | 0 | 900 | 50.5% | 43.9% | 37% |
| 1.9 | 4.2 | 24 | 1 | 8 | 0.31 | 0 | 950 | 50.6% | 46.0% | 37% |
| 1.9 | 4.4 | 6 | 1 | 16 | 0.31 | 10 | 850 | 31.4% | 34.1% | 37% |
| 1.9 | 4.4 | 7 | 1 | 15 | 0.31 | 8 | 900 | 32.1% | 37.2% | 35% |
| 1.9 | 4.4 | 7 | 1 | 17 | 0.31 | 8 | 850 | 31.7% | 32.3% | 37% |
| 1.9 | 4.4 | 8 | 1 | 14 | 0.31 | 8 | 900 | 35.8% | 38.2% | 35% |
| 1.9 | 4.4 | 8 | 1 | 16 | 0.31 | 6 | 850 | 32.4% | 35.5% | 35% |
| 1.9 | 4.4 | 8 | 1 | 18 | 0.31 | 6 | 850 | 31.8% | 30.6% | 37% |
| 1.9 | 4.4 | 9 | 1 | 13 | 0.31 | 8 | 900 | 38.4% | 39.1% | 35% |
| 1.9 | 4.4 | 9 | 1 | 15 | 0.31 | 6 | 850 | 35.9% | 36.5% | 35% |
| 1.9 | 4.4 | 9 | 1 | 17 | 0.31 | 4 | 850 | 32.5% | 33.8% | 35% |
| 1.9 | 4.4 | 9 | 1 | 19 | 0.31 | 4 | 850 | 31.9% | 28.8% | 37% |
| 1.9 | 4.4 | 10 | 1 | 12 | 0.31 | 8 | 900 | 39.6% | 40.1% | 35% |
| 1.9 | 4.4 | 10 | 1 | 14 | 0.31 | 6 | 900 | 39.5% | 37.5% | 35% |
| 1.9 | 4.4 | 10 | 1 | 16 | 0.31 | 4 | 850 | 36.0% | 34.8% | 35% |
| 1.9 | 4.4 | 10 | 1 | 18 | 0.31 | 2 | 850 | 32.5% | 32.0% | 35% |
| 1.9 | 4.4 | 10 | 1 | 20 | 0.31 | 2 | 850 | 31.8% | 27.0% | 37% |
| 1.9 | 4.4 | 11 | 1 | 11 | 0.31 | 8 | 900 | 40.8% | 41.0% | 35% |
| 1.9 | 4.4 | 11 | 1 | 13 | 0.31 | 6 | 900 | 42.4% | 38.4% | 35% |
| 1.9 | 4.4 | 11 | 1 | 15 | 0.31 | 4 | 850 | 39.5% | 35.8% | 35% |
| 1.9 | 4.4 | 11 | 1 | 17 | 0.31 | 2 | 850 | 35.9% | 33.0% | 35% |
| 1.9 | 4.4 | 11 | 1 | 19 | 0.31 | 0 | 850 | 31.6% | 30.4% | 35% |
| 1.9 | 4.4 | 11 | 1 | 21 | 0.31 | 0 | 800 | 30.8% | 25.4% | 37% |
| 1.9 | 4.4 | 12 | 1 | 10 | 0.31 | 8 | 950 | 41.9% | 41.9% | 35% |
| 1.9 | 4.4 | 12 | 1 | 12 | 0.31 | 6 | 900 | 43.4% | 39.4% | 35% |
| 1.9 | 4.4 | 12 | 1 | 14 | 0.31 | 4 | 900 | 43.0% | 36.7% | 35% |
| 1.9 | 4.4 | 12 | 1 | 16 | 0.31 | 2 | 850 | 39.4% | 34.0% | 35% |
| 1.9 | 4.4 | 12 | 1 | 18 | 0.31 | 0 | 850 | 35.0% | 31.4% | 35% |
| 1.9 | 4.4 | 12 | 1 | 20 | 0.31 | 0 | 850 | 34.2% | 26.4% | 37% |
| 1.9 | 4.4 | 13 | 1 | 10 | 0.31 | 8 | 950 | 43.0% | 40.5% | 36% |
| 1.9 | 4.4 | 13 | 1 | 12 | 0.31 | 6 | 900 | 44.5% | 37.9% | 36% |
| 1.9 | 4.4 | 13 | 1 | 14 | 0.31 | 4 | 900 | 46.0% | 35.3% | 36% |
| 1.9 | 4.4 | 13 | 1 | 16 | 0.31 | 2 | 850 | 42.3% | 32.6% | 36% |
| 1.9 | 4.4 | 13 | 1 | 18 | 0.31 | 0 | 850 | 38.0% | 29.9% | 35% |
| 1.9 | 4.4 | 14 | 1 | 9 | 0.31 | 8 | 950 | 43.9% | 41.4% | 36% |
| 1.9 | 4.4 | 14 | 1 | 11 | 0.31 | 6 | 900 | 45.3% | 38.9% | 36% |
| 1.9 | 4.4 | 14 | 1 | 13 | 0.31 | 4 | 900 | 47.5% | 36.3% | 36% |
| 1.9 | 4.4 | 14 | 1 | 15 | 0.31 | 2 | 850 | 45.7% | 33.6% | 36% |
| 1.9 | 4.4 | 14 | 1 | 17 | 0.31 | 0 | 850 | 41.3% | 32.1% | 36% |
| 1.9 | 4.4 | 15 | 1 | 9 | 0.31 | 6 | 950 | 46.0% | 42.2% | 35% |
| 1.9 | 4.4 | 15 | 1 | 11 | 0.31 | 4 | 900 | 48.0% | 39.6% | 35% |
| 1.9 | 4.4 | 15 | 1 | 13 | 0.31 | 2 | 900 | 49.4% | 37.0% | 35% |
| 1.9 | 4.4 | 15 | 1 | 15 | 0.31 | 0 | 850 | 45.1% | 37.1% | 35% |
| 1.9 | 4.4 | 15 | 1 | 17 | 0.31 | 0 | 850 | 44.1% | 31.6% | 37% |
| 1.9 | 4.4 | 16 | 1 | 9 | 0.31 | 6 | 950 | 46.9% | 40.8% | 36% |
| 1.9 | 4.4 | 16 | 1 | 11 | 0.31 | 4 | 900 | 48.9% | 38.2% | 36% |
| 1.9 | 4.4 | 16 | 1 | 13 | 0.31 | 2 | 900 | 51.6% | 35.6% | 36% |
| 1.9 | 4.4 | 16 | 1 | 15 | 0.31 | 0 | 850 | 47.8% | 36.6% | 36% |
| 1.9 | 4.4 | 17 | 1 | 9 | 0.31 | 4 | 950 | 49.2% | 41.6% | 35% |
| 1.9 | 4.4 | 17 | 1 | 11 | 0.31 | 2 | 900 | 51.8% | 39.0% | 35% |
| 1.9 | 4.4 | 17 | 1 | 13 | 0.31 | 0 | 900 | 51.5% | 40.7% | 35% |
| 1.9 | 4.4 | 17 | 1 | 15 | 0.31 | 0 | 850 | 50.5% | 36.0% | 37% |
| 1.9 | 4.4 | 18 | 1 | 9 | 0.31 | 4 | 950 | 50.1% | 41.0% | 36% |
| 1.9 | 4.4 | 18 | 1 | 11 | 0.31 | 2 | 900 | 52.2% | 37.5% | 36% |
| 1.9 | 4.4 | 18 | 1 | 13 | 0.31 | 0 | 900 | 52.3% | 40.1% | 36% |
| 1.9 | 4.4 | 19 | 1 | 9 | 0.31 | 2 | 900 | 52.0% | 41.9% | 35% |
| 1.9 | 4.4 | 19 | 1 | 11 | 0.31 | 0 | 900 | 52.0% | 43.6% | 35% |
| 1.9 | 4.4 | 19 | 1 | 13 | 0.31 | 0 | 850 | 52.6% | 39.6% | 37% |
| 1.9 | 4.4 | 20 | 1 | 9 | 0.31 | 2 | 900 | 52.4% | 41.3% | 36% |
| 1.9 | 4.4 | 20 | 1 | 11 | 0.31 | 0 | 900 | 52.4% | 43.0% | 36% |
| 1.9 | 4.4 | 21 | 1 | 9 | 0.31 | 0 | 900 | 52.1% | 46.0% | 35% |
| 1.9 | 4.4 | 21 | 1 | 11 | 0.31 | 0 | 900 | 52.7% | 42.3% | 37% |
| 1.9 | 4.4 | 22 | 1 | 9 | 0.31 | 0 | 900 | 52.4% | 45.3% | 36% |
| 1.9 | 4.4 | 23 | 1 | 9 | 0.31 | 0 | 900 | 52.8% | 44.6% | 37% |
| 1.9 | 4.6 | 6 | 1 | 15 | 0.31 | 10 | 900 | 31.4% | 36.1% | 37% |
| 1.9 | 4.6 | 7 | 1 | 14 | 0.31 | 10 | 900 | 35.0% | 37.0% | 37% |
| 1.9 | 4.6 | 7 | 1 | 16 | 0.31 | 8 | 850 | 31.7% | 34.4% | 37% |
| 1.9 | 4.6 | 8 | 1 | 13 | 0.31 | 10 | 900 | 37.5% | 38.0% | 37% |
| 1.9 | 4.6 | 8 | 1 | 15 | 0.31 | 8 | 850 | 35.3% | 35.4% | 37% |
| 1.9 | 4.6 | 8 | 1 | 17 | 0.31 | 6 | 850 | 31.9% | 32.7% | 37% |
| 1.9 | 4.6 | 9 | 1 | 13 | 0.31 | 8 | 900 | 39.2% | 38.7% | 36% |
| 1.9 | 4.6 | 9 | 1 | 15 | 0.31 | 6 | 850 | 35.7% | 36.1% | 36% |
| 1.9 | 4.6 | 9 | 1 | 17 | 0.31 | 4 | 850 | 32.3% | 33.4% | 36% |
| 1.9 | 4.6 | 10 | 1 | 10 | 0.31 | 10 | 950 | 40.1% | 42.1% | 36% |
| 1.9 | 4.6 | 10 | 1 | 12 | 0.31 | 10 | 900 | 40.4% | 37.5% | 38% |
| 1.9 | 4.6 | 10 | 1 | 14 | 0.31 | 8 | 900 | 41.5% | 34.9% | 38% |
| 1.9 | 4.6 | 10 | 1 | 16 | 0.31 | 6 | 850 | 38.6% | 32.2% | 38% |
| 1.9 | 4.6 | 10 | 1 | 18 | 0.31 | 4 | 850 | 35.1% | 29.5% | 38% |
| 1.9 | 4.6 | 11 | 1 | 9 | 0.31 | 10 | 950 | 41.4% | 43.0% | 36% |
| 1.9 | 4.6 | 11 | 1 | 11 | 0.31 | 10 | 900 | 41.7% | 38.4% | 38% |
| 1.9 | 4.6 | 11 | 1 | 13 | 0.31 | 8 | 900 | 42.7% | 35.9% | 38% |
| 1.9 | 4.6 | 11 | 1 | 15 | 0.31 | 6 | 850 | 42.1% | 33.2% | 38% |
| 1.9 | 4.6 | 11 | 1 | 17 | 0.31 | 4 | 850 | 38.5% | 30.5% | 38% |
| 1.9 | 4.6 | 11 | 1 | 19 | 0.31 | 2 | 850 | 35.0% | 27.7% | 38% |
| 1.9 | 4.6 | 12 | 1 | 8 | 0.31 | 10 | 950 | 42.5% | 44.1% | 36% |
| 1.9 | 4.6 | 12 | 1 | 10 | 0.31 | 10 | 950 | 42.8% | 39.6% | 38% |
| 1.9 | 4.6 | 12 | 1 | 12 | 0.31 | 8 | 900 | 43.8% | 36.8% | 38% |
| 1.9 | 4.6 | 12 | 1 | 14 | 0.31 | 6 | 850 | 45.5% | 34.2% | 38% |
| 1.9 | 4.6 | 12 | 1 | 16 | 0.31 | 4 | 850 | 41.9% | 31.5% | 38% |
| 1.9 | 4.6 | 12 | 1 | 18 | 0.31 | 2 | 850 | 38.3% | 28.7% | 38% |
| 1.9 | 4.6 | 13 | 1 | 8 | 0.31 | 10 | 950 | 43.6% | 43.3% | 37% |
| 1.9 | 4.6 | 13 | 1 | 10 | 0.31 | 8 | 900 | 44.6% | 40.1% | 37% |
| 1.9 | 4.6 | 13 | 1 | 12 | 0.31 | 6 | 900 | 46.3% | 37.5% | 37% |
| 1.9 | 4.6 | 13 | 1 | 14 | 0.31 | 4 | 900 | 45.7% | 34.9% | 37% |
| 1.9 | 4.6 | 13 | 1 | 16 | 0.31 | 2 | 850 | 42.1% | 32.2% | 37% |
| 1.9 | 4.6 | 13 | 1 | 18 | 0.31 | 0 | 850 | 37.7% | 29.6% | 37% |
| 1.9 | 4.6 | 14 | 1 | 8 | 0.31 | 10 | 950 | 44.7% | 42.6% | 38% |
| 1.9 | 4.6 | 14 | 1 | 10 | 0.31 | 8 | 900 | 45.7% | 38.7% | 38% |
| 1.9 | 4.6 | 14 | 1 | 12 | 0.31 | 6 | 900 | 47.3% | 36.1% | 38% |
| 1.9 | 4.6 | 14 | 1 | 14 | 0.31 | 4 | 850 | 48.5% | 33.5% | 38% |
| 1.9 | 4.6 | 14 | 1 | 16 | 0.31 | 2 | 850 | 44.9% | 30.8% | 38% |
| 1.9 | 4.6 | 15 | 1 | 8 | 0.31 | 8 | 950 | 46.4% | 41.9% | 37% |
| 1.9 | 4.6 | 15 | 1 | 10 | 0.31 | 6 | 900 | 47.9% | 39.4% | 37% |
| 1.9 | 4.6 | 15 | 1 | 12 | 0.31 | 4 | 900 | 50.1% | 36.8% | 37% |
| 1.9 | 4.6 | 15 | 1 | 14 | 0.31 | 2 | 850 | 48.6% | 34.2% | 37% |
| 1.9 | 4.6 | 15 | 1 | 16 | 0.31 | 0 | 850 | 44.3% | 34.1% | 37% |
| 1.9 | 4.6 | 16 | 1 | 8 | 0.31 | 8 | 950 | 47.4% | 40.9% | 38% |
| 1.9 | 4.6 | 16 | 1 | 10 | 0.31 | 6 | 900 | 48.8% | 38.0% | 38% |
| 1.9 | 4.6 | 16 | 1 | 12 | 0.31 | 4 | 900 | 51.0% | 35.4% | 38% |
| 1.9 | 4.6 | 16 | 1 | 14 | 0.31 | 2 | 850 | 51.3% | 32.8% | 38% |
| 1.9 | 4.6 | 17 | 1 | 8 | 0.31 | 6 | 950 | 49.4% | 41.9% | 37% |
| 1.9 | 4.6 | 17 | 1 | 10 | 0.31 | 4 | 900 | 51.4% | 38.8% | 37% |
| 1.9 | 4.6 | 17 | 1 | 12 | 0.31 | 2 | 900 | 54.2% | 36.2% | 37% |
| 1.9 | 4.6 | 17 | 1 | 14 | 0.31 | 0 | 850 | 50.7% | 38.1% | 37% |
| 1.9 | 4.6 | 18 | 1 | 8 | 0.31 | 6 | 950 | 50.2% | 41.4% | 38% |
| 1.9 | 4.6 | 18 | 1 | 10 | 0.31 | 4 | 900 | 52.2% | 38.3% | 38% |
| 1.9 | 4.6 | 18 | 1 | 12 | 0.31 | 2 | 900 | 54.8% | 34.8% | 38% |
| 1.9 | 4.6 | 19 | 1 | 8 | 0.31 | 4 | 950 | 52.5% | 42.3% | 37% |
| 1.9 | 4.6 | 19 | 1 | 10 | 0.31 | 2 | 900 | 54.5% | 39.1% | 37% |
| 1.9 | 4.6 | 19 | 1 | 12 | 0.31 | 0 | 900 | 54.6% | 41.3% | 37% |
| 1.9 | 4.6 | 20 | 1 | 8 | 0.31 | 4 | 950 | 53.2% | 41.7% | 38% |
| 1.9 | 4.6 | 20 | 1 | 10 | 0.31 | 2 | 900 | 54.9% | 38.6% | 38% |
| 1.9 | 4.6 | 21 | 1 | 8 | 0.31 | 2 | 950 | 54.6% | 42.7% | 37% |
| 1.9 | 4.6 | 21 | 1 | 10 | 0.31 | 0 | 900 | 54.6% | 43.8% | 37% |
| 1.9 | 4.6 | 22 | 1 | 8 | 0.31 | 2 | 950 | 54.9% | 42.1% | 38% |
| 1.9 | 4.6 | 23 | 1 | 8 | 0.31 | 0 | 950 | 54.6% | 45.9% | 37% |
| 1.9 | 4.8 | 6 | 1 | 14 | 0.31 | 10 | 900 | 31.3% | 38.1% | 36% |
| 1.9 | 4.8 | 7 | 1 | 14 | 0.31 | 10 | 900 | 34.8% | 36.6% | 37% |
| 1.9 | 4.8 | 8 | 1 | 12 | 0.31 | 10 | 900 | 38.7% | 39.9% | 36% |
| 1.9 | 4.8 | 8 | 1 | 15 | 0.31 | 8 | 850 | 35.1% | 35.0% | 37% |
| 1.9 | 4.8 | 9 | 1 | 12 | 0.31 | 10 | 900 | 40.3% | 38.5% | 37% |
| 1.9 | 4.8 | 9 | 1 | 15 | 0.31 | 6 | 850 | 35.5% | 35.7% | 36% |

TABLE 16-continued

Example Compositions and Thermodynamic Criteria

| Al | C | Cr | Mn | Ni | Si | V | 1 | 2 | 3 | 4 |
|---|---|---|---|---|---|---|---|---|---|---|
| 1.9 | 4.8 | 10 | 1 | 11 | 0.31 | 10 | 900 | 41.7% | 39.4% | 37% |
| 1.9 | 4.8 | 10 | 1 | 14 | 0.31 | 6 | 900 | 39.0% | 36.6% | 36% |
| 1.9 | 4.8 | 10 | 1 | 17 | 0.31 | 4 | 850 | 35.2% | 31.6% | 37% |
| 1.9 | 4.8 | 11 | 1 | 9 | 0.31 | 10 | 950 | 42.8% | 42.6% | 36% |
| 1.9 | 4.8 | 11 | 1 | 12 | 0.31 | 8 | 900 | 44.1% | 37.8% | 37% |
| 1.9 | 4.8 | 11 | 1 | 15 | 0.31 | 4 | 850 | 39.0% | 35.0% | 36% |
| 1.9 | 4.8 | 11 | 1 | 18 | 0.31 | 2 | 850 | 35.1% | 29.8% | 37% |
| 1.9 | 4.8 | 12 | 1 | 8 | 0.31 | 10 | 950 | 43.9% | 43.4% | 36% |
| 1.9 | 4.8 | 12 | 1 | 11 | 0.31 | 8 | 900 | 45.2% | 38.7% | 36% |
| 1.9 | 4.8 | 12 | 1 | 14 | 0.31 | 4 | 900 | 42.4% | 35.9% | 36% |
| 1.9 | 4.8 | 12 | 1 | 17 | 0.31 | 2 | 850 | 38.5% | 30.8% | 37% |
| 1.9 | 4.8 | 13 | 1 | 8 | 0.31 | 10 | 950 | 45.1% | 42.1% | 37% |
| 1.9 | 4.8 | 13 | 1 | 11 | 0.31 | 6 | 900 | 47.9% | 39.5% | 36% |
| 1.9 | 4.8 | 13 | 1 | 14 | 0.31 | 4 | 850 | 45.4% | 34.5% | 37% |
| 1.9 | 4.8 | 13 | 1 | 17 | 0.31 | 0 | 850 | 37.9% | 32.0% | 36% |
| 1.9 | 4.8 | 14 | 1 | 9 | 0.31 | 8 | 950 | 47.1% | 40.6% | 37% |
| 1.9 | 4.8 | 14 | 1 | 12 | 0.31 | 4 | 900 | 49.1% | 37.8% | 37% |
| 1.9 | 4.8 | 14 | 1 | 15 | 0.31 | 2 | 850 | 45.1% | 32.8% | 37% |
| 1.9 | 4.8 | 15 | 1 | 8 | 0.31 | 8 | 950 | 48.0% | 41.4% | 37% |
| 1.9 | 4.8 | 15 | 1 | 11 | 0.31 | 4 | 900 | 51.9% | 38.8% | 36% |
| 1.9 | 4.8 | 15 | 1 | 14 | 0.31 | 2 | 850 | 48.3% | 33.8% | 37% |
| 1.9 | 4.8 | 16 | 1 | 8 | 0.31 | 6 | 950 | 50.2% | 42.2% | 36% |
| 1.9 | 4.8 | 16 | 1 | 11 | 0.31 | 4 | 900 | 52.7% | 37.4% | 37% |
| 1.9 | 4.8 | 16 | 1 | 14 | 0.31 | 0 | 850 | 47.7% | 38.3% | 36% |
| 1.9 | 4.8 | 17 | 1 | 9 | 0.31 | 4 | 900 | 53.0% | 40.8% | 36% |
| 1.9 | 4.8 | 17 | 1 | 12 | 0.31 | 2 | 900 | 54.5% | 35.8% | 37% |
| 1.9 | 4.8 | 18 | 1 | 8 | 0.31 | 4 | 950 | 53.6% | 42.5% | 36% |
| 1.9 | 4.8 | 18 | 1 | 11 | 0.31 | 2 | 900 | 56.7% | 36.7% | 37% |
| 1.9 | 4.8 | 19 | 1 | 8 | 0.31 | 4 | 950 | 54.4% | 41.9% | 36% |
| 1.9 | 4.8 | 19 | 1 | 11 | 0.31 | 0 | 900 | 56.5% | 42.9% | 36% |
| 1.9 | 4.8 | 20 | 1 | 9 | 0.31 | 2 | 900 | 56.7% | 40.6% | 37% |
| 1.9 | 4.8 | 21 | 1 | 8 | 0.31 | 2 | 950 | 56.7% | 42.3% | 37% |
| 1.9 | 4.8 | 22 | 1 | 8 | 0.31 | 0 | 950 | 56.5% | 46.2% | 36% |
| 1.9 | 5 | 6 | 1 | 14 | 0.31 | 10 | 900 | 31.2% | 37.6% | 36% |
| 1.9 | 5 | 7 | 1 | 14 | 0.31 | 10 | 900 | 34.6% | 36.2% | 37% |
| 1.9 | 5 | 8 | 1 | 12 | 0.31 | 10 | 900 | 38.5% | 39.5% | 36% |
| 1.9 | 5 | 8 | 1 | 15 | 0.31 | 8 | 850 | 34.8% | 34.6% | 37% |
| 1.9 | 5 | 9 | 1 | 12 | 0.31 | 10 | 900 | 41.8% | 38.1% | 37% |
| 1.9 | 5 | 9 | 1 | 15 | 0.31 | 6 | 850 | 35.3% | 35.3% | 36% |
| 1.9 | 5 | 10 | 1 | 11 | 0.31 | 10 | 900 | 43.1% | 39.0% | 37% |
| 1.9 | 5 | 10 | 1 | 14 | 0.31 | 6 | 900 | 38.8% | 36.2% | 36% |
| 1.9 | 5 | 10 | 1 | 17 | 0.31 | 4 | 850 | 35.0% | 31.2% | 37% |
| 1.9 | 5 | 11 | 1 | 9 | 0.31 | 10 | 950 | 44.2% | 42.1% | 36% |
| 1.9 | 5 | 11 | 1 | 12 | 0.31 | 8 | 900 | 45.3% | 37.4% | 37% |
| 1.9 | 5 | 11 | 1 | 15 | 0.31 | 4 | 850 | 38.7% | 34.6% | 36% |
| 1.9 | 5 | 11 | 1 | 18 | 0.31 | 2 | 850 | 34.9% | 29.5% | 37% |
| 1.9 | 5 | 12 | 1 | 8 | 0.31 | 10 | 950 | 45.3% | 43.0% | 36% |
| 1.9 | 5 | 12 | 1 | 11 | 0.31 | 8 | 900 | 46.9% | 38.3% | 37% |
| 1.9 | 5 | 12 | 1 | 14 | 0.31 | 4 | 900 | 42.1% | 35.5% | 36% |
| 1.9 | 5 | 12 | 1 | 17 | 0.31 | 2 | 850 | 38.2% | 30.5% | 37% |
| 1.9 | 5 | 13 | 1 | 8 | 0.31 | 10 | 950 | 46.5% | 41.6% | 37% |
| 1.9 | 5 | 13 | 1 | 11 | 0.31 | 6 | 900 | 49.0% | 39.1% | 36% |
| 1.9 | 5 | 13 | 1 | 14 | 0.31 | 4 | 850 | 45.1% | 34.1% | 37% |
| 1.9 | 5 | 13 | 1 | 17 | 0.31 | 0 | 850 | 37.6% | 31.7% | 36% |
| 1.9 | 5 | 14 | 1 | 9 | 0.31 | 8 | 950 | 48.7% | 40.1% | 37% |
| 1.9 | 5 | 14 | 1 | 12 | 0.31 | 4 | 900 | 48.7% | 37.4% | 36% |
| 1.9 | 5 | 14 | 1 | 15 | 0.31 | 2 | 850 | 44.8% | 32.4% | 37% |
| 1.9 | 5 | 15 | 1 | 8 | 0.31 | 8 | 950 | 49.6% | 41.0% | 37% |
| 1.9 | 5 | 15 | 1 | 11 | 0.31 | 4 | 900 | 52.0% | 38.4% | 37% |
| 1.9 | 5 | 15 | 1 | 14 | 0.31 | 2 | 850 | 48.0% | 33.4% | 37% |
| 1.9 | 5 | 16 | 1 | 8 | 0.31 | 6 | 950 | 51.9% | 41.8% | 36% |
| 1.9 | 5 | 16 | 1 | 11 | 0.31 | 4 | 900 | 54.6% | 37.0% | 37% |
| 1.9 | 5 | 16 | 1 | 14 | 0.31 | 0 | 850 | 47.3% | 38.0% | 37% |
| 1.9 | 5 | 17 | 1 | 9 | 0.31 | 4 | 900 | 54.9% | 40.5% | 36% |
| 1.9 | 5 | 17 | 1 | 12 | 0.31 | 2 | 900 | 54.2% | 35.4% | 37% |
| 1.9 | 5 | 18 | 1 | 8 | 0.31 | 4 | 950 | 55.5% | 42.2% | 36% |
| 1.9 | 5 | 18 | 1 | 11 | 0.31 | 2 | 900 | 57.1% | 36.3% | 37% |
| 1.9 | 5 | 19 | 1 | 8 | 0.31 | 4 | 950 | 56.2% | 41.6% | 37% |
| 1.9 | 5 | 19 | 1 | 11 | 0.31 | 0 | 900 | 56.5% | 42.5% | 36% |
| 1.9 | 5 | 20 | 1 | 9 | 0.31 | 2 | 900 | 58.9% | 40.3% | 37% |
| 1.9 | 5 | 21 | 1 | 8 | 0.31 | 2 | 900 | 58.9% | 41.9% | 37% |
| 1.9 | 5 | 22 | 1 | 8 | 0.31 | 0 | 950 | 58.7% | 45.8% | 36% |
| 1.9 | 5.2 | 6 | 1 | 14 | 0.31 | 10 | 900 | 31.0% | 37.2% | 36% |
| 1.9 | 5.2 | 7 | 1 | 14 | 0.31 | 10 | 900 | 34.4% | 35.8% | 37% |
| 1.9 | 5.2 | 8 | 1 | 13 | 0.31 | 10 | 900 | 38.0% | 36.8% | 37% |
| 1.9 | 5.2 | 8 | 1 | 16 | 0.31 | 6 | 850 | 31.5% | 33.9% | 36% |
| 1.9 | 5.2 | 9 | 1 | 12 | 0.31 | 10 | 900 | 41.5% | 37.7% | 37% |
| 1.9 | 5.2 | 9 | 1 | 15 | 0.31 | 6 | 850 | 35.0% | 34.9% | 36% |
| 1.9 | 5.2 | 10 | 1 | 12 | 0.31 | 8 | 900 | 41.9% | 38.4% | 36% |
| 1.9 | 5.2 | 10 | 1 | 15 | 0.31 | 6 | 850 | 38.2% | 33.5% | 37% |
| 1.9 | 5.2 | 10 | 1 | 18 | 0.31 | 2 | 850 | 31.6% | 30.5% | 36% |
| 1.9 | 5.2 | 11 | 1 | 10 | 0.31 | 10 | 900 | 45.8% | 39.5% | 37% |
| 1.9 | 5.2 | 11 | 1 | 13 | 0.31 | 6 | 900 | 41.9% | 36.8% | 36% |
| 1.9 | 5.2 | 11 | 1 | 16 | 0.31 | 4 | 850 | 38.1% | 31.8% | 37% |
| 1.9 | 5.2 | 11 | 1 | 19 | 0.31 | 0 | 850 | 30.7% | 28.9% | 36% |
| 1.9 | 5.2 | 12 | 1 | 9 | 0.31 | 10 | 950 | 46.9% | 40.3% | 37% |
| 1.9 | 5.2 | 12 | 1 | 12 | 0.31 | 6 | 900 | 45.3% | 37.7% | 36% |
| 1.9 | 5.2 | 12 | 1 | 15 | 0.31 | 4 | 850 | 41.5% | 32.8% | 37% |
| 1.9 | 5.2 | 12 | 1 | 18 | 0.31 | 0 | 850 | 34.1% | 29.9% | 36% |
| 1.9 | 5.2 | 13 | 1 | 9 | 0.31 | 8 | 950 | 49.3% | 41.1% | 36% |
| 1.9 | 5.2 | 13 | 1 | 12 | 0.31 | 6 | 900 | 48.3% | 36.3% | 37% |
| 1.9 | 5.2 | 13 | 1 | 15 | 0.31 | 2 | 850 | 41.6% | 33.5% | 36% |
| 1.9 | 5.2 | 13 | 1 | 18 | 0.31 | 0 | 850 | 36.9% | 28.5% | 37% |
| 1.9 | 5.2 | 14 | 1 | 10 | 0.31 | 6 | 900 | 51.9% | 39.6% | 36% |
| 1.9 | 5.2 | 14 | 1 | 13 | 0.31 | 4 | 900 | 48.0% | 34.7% | 37% |
| 1.9 | 5.2 | 14 | 1 | 16 | 0.31 | 0 | 850 | 40.6% | 33.7% | 36% |
| 1.9 | 5.2 | 15 | 1 | 9 | 0.31 | 6 | 950 | 53.0% | 40.5% | 36% |
| 1.9 | 5.2 | 15 | 1 | 12 | 0.31 | 4 | 900 | 51.2% | 35.7% | 37% |
| 1.9 | 5.2 | 15 | 1 | 15 | 0.31 | 0 | 850 | 43.9% | 35.8% | 36% |
| 1.9 | 5.2 | 16 | 1 | 9 | 0.31 | 6 | 900 | 53.9% | 39.3% | 37% |
| 1.9 | 5.2 | 16 | 1 | 12 | 0.31 | 2 | 900 | 51.2% | 36.4% | 36% |
| 1.9 | 5.2 | 16 | 1 | 15 | 0.31 | 0 | 850 | 46.5% | 35.3% | 37% |
| 1.9 | 5.2 | 17 | 1 | 10 | 0.31 | 4 | 900 | 57.2% | 37.8% | 37% |
| 1.9 | 5.2 | 17 | 1 | 13 | 0.31 | 0 | 900 | 50.1% | 39.3% | 36% |
| 1.9 | 5.2 | 18 | 1 | 9 | 0.31 | 4 | 900 | 57.6% | 39.6% | 37% |
| 1.9 | 5.2 | 18 | 1 | 12 | 0.31 | 0 | 900 | 53.1% | 40.8% | 36% |
| 1.9 | 5.2 | 19 | 1 | 9 | 0.31 | 2 | 900 | 60.0% | 40.5% | 36% |
| 1.9 | 5.2 | 19 | 1 | 12 | 0.31 | 0 | 900 | 55.6% | 40.2% | 37% |
| 1.9 | 5.2 | 20 | 1 | 10 | 0.31 | 0 | 900 | 58.9% | 43.3% | 36% |
| 1.9 | 5.2 | 21 | 1 | 9 | 0.31 | 0 | 900 | 61.0% | 44.4% | 36% |
| 1.9 | 5.2 | 22 | 1 | 9 | 0.31 | 0 | 900 | 61.3% | 43.7% | 37% |
| 1.9 | 5.4 | 6 | 1 | 14 | 0.31 | 10 | 900 | 30.8% | 36.8% | 36% |
| 1.9 | 5.4 | 7 | 1 | 13 | 0.31 | 10 | 900 | 34.4% | 37.8% | 36% |
| 1.9 | 5.4 | 7 | 1 | 15 | 0.31 | 8 | 900 | 31.1% | 35.2% | 36% |
| 1.9 | 5.4 | 8 | 1 | 13 | 0.31 | 8 | 900 | 34.9% | 38.5% | 35% |
| 1.9 | 5.4 | 8 | 1 | 15 | 0.31 | 6 | 900 | 31.6% | 35.9% | 35% |
| 1.9 | 5.4 | 9 | 1 | 11 | 0.31 | 10 | 900 | 41.5% | 39.6% | 36% |
| 1.9 | 5.4 | 9 | 1 | 13 | 0.31 | 8 | 900 | 38.2% | 37.1% | 36% |
| 1.9 | 5.4 | 9 | 1 | 15 | 0.31 | 6 | 850 | 34.8% | 34.5% | 36% |
| 1.9 | 5.4 | 10 | 1 | 11 | 0.31 | 8 | 900 | 42.0% | 40.3% | 35% |
| 1.9 | 5.4 | 10 | 1 | 13 | 0.31 | 6 | 900 | 38.6% | 37.8% | 35% |
| 1.9 | 5.4 | 10 | 1 | 15 | 0.31 | 4 | 850 | 35.2% | 35.2% | 35% |
| 1.9 | 5.4 | 10 | 1 | 17 | 0.31 | 2 | 850 | 31.8% | 32.6% | 35% |
| 1.9 | 5.4 | 10 | 1 | 19 | 0.31 | 2 | 850 | 31.1% | 27.8% | 37% |
| 1.9 | 5.4 | 11 | 1 | 10 | 0.31 | 8 | 900 | 45.5% | 41.1% | 35% |
| 1.9 | 5.4 | 11 | 1 | 12 | 0.31 | 6 | 900 | 42.0% | 38.7% | 35% |
| 1.9 | 5.4 | 11 | 1 | 14 | 0.31 | 4 | 900 | 38.6% | 36.2% | 35% |
| 1.9 | 5.4 | 11 | 1 | 16 | 0.31 | 2 | 850 | 35.1% | 33.5% | 35% |
| 1.9 | 5.4 | 11 | 1 | 18 | 0.31 | 0 | 850 | 30.9% | 31.0% | 35% |
| 1.9 | 5.4 | 11 | 1 | 20 | 0.31 | 0 | 850 | 30.2% | 26.1% | 37% |
| 1.9 | 5.4 | 12 | 1 | 9 | 0.31 | 10 | 950 | 48.4% | 39.9% | 37% |
| 1.9 | 5.4 | 12 | 1 | 11 | 0.31 | 8 | 900 | 48.1% | 37.5% | 37% |
| 1.9 | 5.4 | 12 | 1 | 13 | 0.31 | 6 | 900 | 44.7% | 35.0% | 37% |
| 1.9 | 5.4 | 12 | 1 | 15 | 0.31 | 4 | 850 | 41.2% | 32.4% | 37% |
| 1.9 | 5.4 | 12 | 1 | 17 | 0.31 | 2 | 850 | 37.7% | 29.7% | 37% |
| 1.9 | 5.4 | 13 | 1 | 8 | 0.31 | 8 | 950 | 50.7% | 42.9% | 35% |
| 1.9 | 5.4 | 13 | 1 | 10 | 0.31 | 6 | 900 | 48.7% | 40.5% | 35% |
| 1.9 | 5.4 | 13 | 1 | 12 | 0.31 | 4 | 900 | 45.3% | 38.0% | 35% |
| 1.9 | 5.4 | 13 | 1 | 14 | 0.31 | 2 | 850 | 41.8% | 35.5% | 35% |
| 1.9 | 5.4 | 13 | 1 | 16 | 0.31 | 0 | 850 | 37.5% | 33.9% | 35% |
| 1.9 | 5.4 | 13 | 1 | 18 | 0.31 | 0 | 850 | 36.7% | 28.2% | 37% |
| 1.9 | 5.4 | 14 | 1 | 9 | 0.31 | 8 | 900 | 52.0% | 39.3% | 37% |
| 1.9 | 5.4 | 14 | 1 | 11 | 0.31 | 6 | 900 | 51.2% | 36.9% | 37% |
| 1.9 | 5.4 | 14 | 1 | 13 | 0.31 | 4 | 900 | 47.7% | 34.3% | 37% |
| 1.9 | 5.4 | 14 | 1 | 15 | 0.31 | 2 | 850 | 44.2% | 31.7% | 37% |
| 1.9 | 5.4 | 15 | 1 | 8 | 0.31 | 6 | 950 | 54.6% | 42.3% | 35% |
| 1.9 | 5.4 | 15 | 1 | 10 | 0.31 | 4 | 900 | 51.7% | 39.9% | 35% |
| 1.9 | 5.4 | 15 | 1 | 12 | 0.31 | 2 | 900 | 48.2% | 37.4% | 35% |
| 1.9 | 5.4 | 15 | 1 | 14 | 0.31 | 0 | 850 | 44.0% | 37.9% | 35% |
| 1.9 | 5.4 | 15 | 1 | 16 | 0.31 | 0 | 850 | 43.1% | 33.0% | 37% |
| 1.9 | 5.4 | 16 | 1 | 9 | 0.31 | 6 | 900 | 55.7% | 39.0% | 37% |
| 1.9 | 5.4 | 16 | 1 | 11 | 0.31 | 4 | 900 | 53.9% | 36.2% | 37% |

TABLE 16-continued

Example Compositions and Thermodynamic Criteria

| Al | C | Cr | Mn | Ni | Si | V | 1 | 2 | 3 | 4 |
|---|---|---|---|---|---|---|---|---|---|---|
| 1.9 | 5.4 | 16 | 1 | 13 | 0.31 | 2 | 900 | 50.4% | 33.6% | 37% |
| 1.9 | 5.4 | 17 | 1 | 8 | 0.31 | 4 | 950 | 57.8% | 42.0% | 35% |
| 1.9 | 5.4 | 17 | 1 | 10 | 0.31 | 2 | 900 | 54.3% | 39.2% | 35% |
| 1.9 | 5.4 | 17 | 1 | 12 | 0.31 | 0 | 900 | 50.3% | 41.0% | 35% |
| 1.9 | 5.4 | 17 | 1 | 14 | 0.31 | 0 | 850 | 49.3% | 36.8% | 37% |
| 1.9 | 5.4 | 18 | 1 | 9 | 0.31 | 4 | 900 | 59.6% | 39.3% | 37% |
| 1.9 | 5.4 | 18 | 1 | 11 | 0.31 | 2 | 900 | 56.3% | 35.7% | 37% |
| 1.9 | 5.4 | 19 | 1 | 8 | 0.31 | 2 | 950 | 60.0% | 42.3% | 35% |
| 1.9 | 5.4 | 19 | 1 | 10 | 0.31 | 0 | 900 | 56.2% | 43.6% | 35% |
| 1.9 | 5.4 | 19 | 1 | 12 | 0.31 | 0 | 900 | 55.2% | 39.8% | 37% |
| 1.9 | 5.4 | 20 | 1 | 9 | 0.31 | 2 | 900 | 61.8% | 39.6% | 37% |
| 1.9 | 5.4 | 21 | 1 | 8 | 0.31 | 0 | 950 | 61.6% | 45.6% | 35% |
| 1.9 | 5.4 | 21 | 1 | 10 | 0.31 | 0 | 900 | 60.7% | 42.3% | 37% |
| 1.9 | 5.4 | 23 | 1 | 8 | 0.31 | 0 | 950 | 63.5% | 44.3% | 37% |
| 1.9 | 5.6 | 6 | 1 | 15 | 0.31 | 10 | 850 | 30.4% | 34.1% | 38% |
| 1.9 | 5.6 | 7 | 1 | 14 | 0.31 | 8 | 900 | 31.2% | 37.2% | 36% |
| 1.9 | 5.6 | 8 | 1 | 11 | 0.31 | 10 | 900 | 38.0% | 40.5% | 36% |
| 1.9 | 5.6 | 8 | 1 | 13 | 0.31 | 10 | 900 | 37.5% | 36.0% | 38% |
| 1.9 | 5.6 | 9 | 1 | 11 | 0.31 | 10 | 900 | 41.3% | 39.1% | 37% |
| 1.9 | 5.6 | 9 | 1 | 13 | 0.31 | 8 | 900 | 38.0% | 36.7% | 37% |
| 1.9 | 5.6 | 9 | 1 | 15 | 0.31 | 6 | 850 | 34.6% | 34.1% | 37% |
| 1.9 | 5.6 | 10 | 1 | 10 | 0.31 | 10 | 900 | 44.8% | 40.0% | 37% |
| 1.9 | 5.6 | 10 | 1 | 12 | 0.31 | 8 | 900 | 41.4% | 37.6% | 37% |
| 1.9 | 5.6 | 10 | 1 | 14 | 0.31 | 6 | 900 | 38.0% | 35.1% | 37% |
| 1.9 | 5.6 | 10 | 1 | 16 | 0.31 | 4 | 850 | 34.6% | 32.5% | 37% |
| 1.9 | 5.6 | 10 | 1 | 18 | 0.31 | 2 | 850 | 31.2% | 29.8% | 37% |
| 1.9 | 5.6 | 11 | 1 | 9 | 0.31 | 10 | 950 | 48.2% | 40.9% | 37% |
| 1.9 | 5.6 | 11 | 1 | 11 | 0.31 | 8 | 900 | 44.8% | 38.5% | 37% |
| 1.9 | 5.6 | 11 | 1 | 13 | 0.31 | 6 | 900 | 41.4% | 36.0% | 37% |
| 1.9 | 5.6 | 11 | 1 | 15 | 0.31 | 4 | 850 | 38.0% | 33.4% | 37% |
| 1.9 | 5.6 | 11 | 1 | 17 | 0.31 | 2 | 850 | 34.5% | 30.8% | 37% |
| 1.9 | 5.6 | 11 | 1 | 19 | 0.31 | 0 | 850 | 30.4% | 28.2% | 37% |
| 1.9 | 5.6 | 12 | 1 | 9 | 0.31 | 10 | 950 | 49.9% | 39.5% | 38% |
| 1.9 | 5.6 | 12 | 1 | 11 | 0.31 | 8 | 900 | 47.8% | 37.1% | 38% |
| 1.9 | 5.6 | 12 | 1 | 13 | 0.31 | 6 | 900 | 44.4% | 34.6% | 38% |
| 1.9 | 5.6 | 12 | 1 | 15 | 0.31 | 4 | 850 | 40.9% | 32.0% | 38% |
| 1.9 | 5.6 | 12 | 1 | 17 | 0.31 | 2 | 850 | 37.5% | 29.4% | 38% |
| 1.9 | 5.6 | 13 | 1 | 8 | 0.31 | 8 | 950 | 51.9% | 42.4% | 35% |
| 1.9 | 5.6 | 13 | 1 | 10 | 0.31 | 6 | 900 | 48.4% | 40.1% | 36% |
| 1.9 | 5.6 | 13 | 1 | 12 | 0.31 | 4 | 900 | 45.0% | 37.6% | 36% |
| 1.9 | 5.6 | 13 | 1 | 14 | 0.31 | 2 | 900 | 41.5% | 35.1% | 36% |
| 1.9 | 5.6 | 13 | 1 | 16 | 0.31 | 0 | 850 | 37.3% | 33.6% | 36% |
| 1.9 | 5.6 | 13 | 1 | 18 | 0.31 | 0 | 850 | 36.5% | 27.9% | 38% |
| 1.9 | 5.6 | 14 | 1 | 9 | 0.31 | 8 | 900 | 53.7% | 38.9% | 38% |
| 1.9 | 5.6 | 14 | 1 | 11 | 0.31 | 6 | 900 | 50.8% | 36.5% | 38% |
| 1.9 | 5.6 | 14 | 1 | 13 | 0.31 | 4 | 900 | 47.4% | 33.9% | 38% |
| 1.9 | 5.6 | 14 | 1 | 15 | 0.31 | 2 | 850 | 43.9% | 31.3% | 38% |
| 1.9 | 5.6 | 15 | 1 | 8 | 0.31 | 6 | 950 | 54.8% | 41.8% | 36% |
| 1.9 | 5.6 | 15 | 1 | 10 | 0.31 | 4 | 900 | 51.4% | 39.5% | 36% |
| 1.9 | 5.6 | 15 | 1 | 12 | 0.31 | 2 | 900 | 47.9% | 37.0% | 36% |
| 1.9 | 5.6 | 15 | 1 | 14 | 0.31 | 0 | 850 | 43.7% | 37.6% | 36% |
| 1.9 | 5.6 | 15 | 1 | 16 | 0.31 | 0 | 850 | 42.8% | 32.7% | 38% |
| 1.9 | 5.6 | 16 | 1 | 9 | 0.31 | 6 | 900 | 57.0% | 38.6% | 38% |
| 1.9 | 5.6 | 16 | 1 | 11 | 0.31 | 4 | 900 | 53.6% | 35.8% | 38% |
| 1.9 | 5.6 | 16 | 1 | 13 | 0.31 | 2 | 900 | 50.1% | 33.3% | 38% |
| 1.9 | 5.6 | 17 | 1 | 8 | 0.31 | 4 | 950 | 57.4% | 41.6% | 36% |
| 1.9 | 5.6 | 17 | 1 | 10 | 0.31 | 2 | 900 | 54.0% | 38.8% | 36% |
| 1.9 | 5.6 | 17 | 1 | 12 | 0.31 | 0 | 900 | 49.9% | 40.7% | 36% |
| 1.9 | 5.6 | 17 | 1 | 14 | 0.31 | 0 | 850 | 49.0% | 36.5% | 38% |
| 1.9 | 5.6 | 18 | 1 | 9 | 0.31 | 4 | 900 | 59.4% | 39.0% | 38% |
| 1.9 | 5.6 | 18 | 1 | 11 | 0.31 | 2 | 900 | 56.0% | 35.4% | 38% |
| 1.9 | 5.6 | 19 | 1 | 8 | 0.31 | 2 | 950 | 59.6% | 42.0% | 36% |
| 1.9 | 5.6 | 19 | 1 | 10 | 0.31 | 0 | 900 | 55.8% | 43.2% | 36% |
| 1.9 | 5.6 | 19 | 1 | 12 | 0.31 | 0 | 900 | 54.8% | 39.5% | 38% |
| 1.9 | 5.6 | 20 | 1 | 9 | 0.31 | 2 | 900 | 61.3% | 39.3% | 38% |
| 1.9 | 5.6 | 21 | 1 | 8 | 0.31 | 0 | 950 | 61.2% | 45.2% | 36% |
| 1.9 | 5.6 | 21 | 1 | 10 | 0.31 | 0 | 900 | 60.3% | 41.9% | 38% |
| 1.9 | 5.6 | 23 | 1 | 8 | 0.31 | 0 | 950 | 65.3% | 43.9% | 38% |
| 1.9 | 5.8 | 7 | 1 | 12 | 0.31 | 10 | 900 | 34.2% | 39.2% | 36% |
| 1.9 | 5.8 | 7 | 1 | 15 | 0.31 | 8 | 850 | 30.8% | 34.4% | 37% |
| 1.9 | 5.8 | 8 | 1 | 13 | 0.31 | 8 | 900 | 34.5% | 37.7% | 36% |
| 1.9 | 5.8 | 9 | 1 | 11 | 0.31 | 10 | 900 | 41.0% | 38.7% | 37% |
| 1.9 | 5.8 | 10 | 1 | 9 | 0.31 | 10 | 950 | 44.8% | 41.8% | 36% |
| 1.9 | 5.8 | 10 | 1 | 12 | 0.31 | 8 | 900 | 41.2% | 37.2% | 37% |
| 1.9 | 5.8 | 10 | 1 | 15 | 0.31 | 4 | 850 | 34.7% | 34.4% | 36% |
| 1.9 | 5.8 | 10 | 1 | 18 | 0.31 | 2 | 850 | 31.0% | 29.5% | 37% |
| 1.9 | 5.8 | 11 | 1 | 10 | 0.31 | 8 | 900 | 44.9% | 40.3% | 36% |
| 1.9 | 5.8 | 11 | 1 | 13 | 0.31 | 6 | 900 | 41.2% | 35.6% | 37% |
| 1.9 | 5.8 | 11 | 1 | 16 | 0.31 | 2 | 850 | 34.7% | 32.8% | 36% |
| 1.9 | 5.8 | 11 | 1 | 19 | 0.31 | 0 | 850 | 30.2% | 27.9% | 37% |
| 1.9 | 5.8 | 12 | 1 | 10 | 0.31 | 8 | 900 | 47.9% | 39.0% | 37% |
| 1.9 | 5.8 | 12 | 1 | 13 | 0.31 | 4 | 900 | 41.4% | 36.3% | 36% |
| 1.9 | 5.8 | 12 | 1 | 16 | 0.31 | 2 | 850 | 37.6% | 31.4% | 37% |
| 1.9 | 5.8 | 13 | 1 | 8 | 0.31 | 8 | 950 | 51.5% | 42.0% | 36% |
| 1.9 | 5.8 | 13 | 1 | 11 | 0.31 | 6 | 900 | 47.7% | 37.4% | 37% |
| 1.9 | 5.8 | 13 | 1 | 14 | 0.31 | 2 | 900 | 41.2% | 34.7% | 36% |
| 1.9 | 5.8 | 13 | 1 | 17 | 0.31 | 0 | 850 | 36.6% | 30.6% | 37% |
| 1.9 | 5.8 | 14 | 1 | 10 | 0.31 | 6 | 900 | 50.9% | 38.3% | 37% |
| 1.9 | 5.8 | 14 | 1 | 13 | 0.31 | 2 | 900 | 44.4% | 35.6% | 36% |
| 1.9 | 5.8 | 14 | 1 | 16 | 0.31 | 0 | 850 | 39.8% | 32.9% | 37% |
| 1.9 | 5.8 | 15 | 1 | 10 | 0.31 | 4 | 900 | 51.0% | 39.1% | 36% |
| 1.9 | 5.8 | 15 | 1 | 13 | 0.31 | 2 | 900 | 47.1% | 34.3% | 37% |
| 1.9 | 5.8 | 16 | 1 | 8 | 0.31 | 6 | 950 | 57.0% | 40.4% | 37% |
| 1.9 | 5.8 | 16 | 1 | 11 | 0.31 | 2 | 900 | 50.6% | 37.5% | 36% |
| 1.9 | 5.8 | 16 | 1 | 14 | 0.31 | 0 | 850 | 46.1% | 36.7% | 37% |
| 1.9 | 5.8 | 17 | 1 | 10 | 0.31 | 2 | 900 | 53.6% | 38.4% | 36% |
| 1.9 | 5.8 | 17 | 1 | 13 | 0.31 | 0 | 900 | 49.1% | 38.3% | 37% |
| 1.9 | 5.8 | 18 | 1 | 10 | 0.31 | 2 | 900 | 56.0% | 37.7% | 37% |
| 1.9 | 5.8 | 19 | 1 | 8 | 0.31 | 2 | 950 | 59.2% | 41.6% | 36% |
| 1.9 | 5.8 | 19 | 1 | 11 | 0.31 | 0 | 900 | 54.9% | 41.0% | 37% |
| 1.9 | 5.8 | 20 | 1 | 10 | 0.31 | 0 | 900 | 57.7% | 42.2% | 37% |
| 1.9 | 5.8 | 22 | 1 | 8 | 0.31 | 0 | 950 | 62.8% | 44.2% | 37% |
| 1.9 | 6 | 7 | 1 | 12 | 0.31 | 10 | 900 | 34.0% | 38.8% | 36% |
| 1.9 | 6 | 7 | 1 | 15 | 0.31 | 8 | 850 | 30.6% | 34.1% | 37% |
| 1.9 | 6 | 8 | 1 | 13 | 0.31 | 8 | 900 | 34.3% | 37.3% | 36% |
| 1.9 | 6 | 9 | 1 | 11 | 0.31 | 10 | 900 | 40.8% | 38.3% | 37% |
| 1.9 | 6 | 9 | 1 | 14 | 0.31 | 6 | 900 | 34.5% | 35.7% | 36% |
| 1.9 | 6 | 10 | 1 | 10 | 0.31 | 10 | 900 | 44.2% | 39.2% | 37% |
| 1.9 | 6 | 10 | 1 | 13 | 0.31 | 6 | 900 | 37.9% | 36.6% | 36% |
| 1.9 | 6 | 10 | 1 | 16 | 0.31 | 4 | 850 | 34.2% | 31.7% | 37% |
| 1.9 | 6 | 11 | 1 | 8 | 0.31 | 10 | 950 | 48.0% | 42.2% | 36% |
| 1.9 | 6 | 11 | 1 | 11 | 0.31 | 8 | 900 | 44.3% | 37.7% | 37% |
| 1.9 | 6 | 11 | 1 | 14 | 0.31 | 4 | 900 | 37.9% | 35.0% | 36% |
| 1.9 | 6 | 11 | 1 | 17 | 0.31 | 2 | 850 | 34.1% | 30.1% | 37% |
| 1.9 | 6 | 12 | 1 | 9 | 0.31 | 8 | 950 | 47.9% | 40.8% | 36% |
| 1.9 | 6 | 12 | 1 | 12 | 0.31 | 6 | 900 | 44.2% | 36.1% | 37% |
| 1.9 | 6 | 12 | 1 | 15 | 0.31 | 2 | 850 | 37.7% | 33.4% | 36% |
| 1.9 | 6 | 12 | 1 | 18 | 0.31 | 0 | 850 | 33.2% | 28.5% | 37% |
| 1.9 | 6 | 13 | 1 | 10 | 0.31 | 6 | 900 | 47.8% | 39.3% | 36% |
| 1.9 | 6 | 13 | 1 | 13 | 0.31 | 4 | 900 | 44.0% | 34.6% | 37% |
| 1.9 | 6 | 13 | 1 | 16 | 0.31 | 0 | 850 | 36.8% | 33.0% | 36% |
| 1.9 | 6 | 14 | 1 | 9 | 0.31 | 6 | 950 | 51.0% | 40.2% | 36% |
| 1.9 | 6 | 14 | 1 | 12 | 0.31 | 4 | 900 | 47.2% | 35.5% | 37% |
| 1.9 | 6 | 14 | 1 | 15 | 0.31 | 0 | 850 | 40.0% | 35.1% | 36% |
| 1.9 | 6 | 15 | 1 | 9 | 0.31 | 6 | 900 | 53.7% | 38.8% | 37% |
| 1.9 | 6 | 15 | 1 | 12 | 0.31 | 2 | 900 | 47.3% | 36.2% | 36% |
| 1.9 | 6 | 15 | 1 | 15 | 0.31 | 0 | 850 | 42.7% | 34.6% | 37% |
| 1.9 | 6 | 16 | 1 | 10 | 0.31 | 4 | 900 | 53.3% | 37.3% | 37% |
| 1.9 | 6 | 16 | 1 | 13 | 0.31 | 0 | 900 | 46.2% | 38.5% | 36% |
| 1.9 | 6 | 17 | 1 | 9 | 0.31 | 4 | 900 | 56.2% | 38.8% | 37% |
| 1.9 | 6 | 17 | 1 | 12 | 0.31 | 0 | 900 | 49.3% | 40.0% | 36% |
| 1.9 | 6 | 18 | 1 | 9 | 0.31 | 2 | 900 | 56.1% | 39.7% | 36% |
| 1.9 | 6 | 18 | 1 | 12 | 0.31 | 0 | 900 | 51.7% | 39.4% | 37% |
| 1.9 | 6 | 19 | 1 | 10 | 0.31 | 0 | 900 | 55.0% | 42.4% | 36% |
| 1.9 | 6 | 20 | 1 | 9 | 0.31 | 0 | 900 | 57.8% | 43.5% | 36% |
| 1.9 | 6 | 21 | 1 | 9 | 0.31 | 0 | 900 | 59.9% | 42.8% | 37% |

Thus, as shown in the above Table 16, the thermal wire composition can have the following compositional range, in wt. % with Fe:

Al—1.9 (or about 1.9)
C—3 to 6 (or about 3 to about 6)
Cr—6 to 24 (or about 6 to about 24)
Mn—1 (or about 1)
Si—0.31 (or about 0.31)
V—0 to 10 (or about 0 to about 10)

Further, the thermal wire composition can have the following thermodynamic criteria ranges:
FCC-BCC Transition Temperature in K—800 to 950 (or about 800 to about 950)

Sum of Hard Phase in mole %—30.0 to 65.3 (or about 30.0 to about 65.3)

Sum of Magnetic Phases at 500° C. in volume %—25.2 to 49.7 (or about 25.2 to about 49.7)

Solute Element Content in wt. %—35 to 38 (or about 35 to about 38)

TABLE 17

Example Compositions and Thermodynamic Criteria

| B | C | Cr | Mn | Mo | Nb | Ni | Si | 1 | 2 | 3 | 4 |
|---|---|---|---|---|---|---|---|---|---|---|---|
| 0.2 | 2.8 | 4 | 6 | 0 | 1 | 12 | 0 | 860 | 33% | 45% | 26.0% |
| 0.2 | 3 | 2 | 10 | 0 | 4 | 10 | 0 | 840 | 30% | 41% | 29.2% |
| 0.2 | 3 | 5 | 6 | 0 | 4 | 10 | 0 | 860 | 34% | 46% | 28.2% |
| 0.4 | 2.6 | 3 | 6 | 0 | 1 | 12 | 0 | 860 | 34% | 46% | 25.0% |
| 0.4 | 2.6 | 4 | 8 | 0 | 3 | 12 | 0 | 840 | 31% | 40% | 30.0% |
| 0.4 | 2.6 | 5 | 8 | 0 | 3 | 10 | 0 | 840 | 31% | 43% | 29.0% |
| 0.4 | 2.8 | 1 | 12 | 0 | 3 | 10 | 0 | 840 | 31% | 41% | 29.2% |
| 0.4 | 2.8 | 3 | 10 | 0 | 2 | 8 | 0 | 860 | 34% | 46% | 26.2% |
| 0.4 | 2.8 | 4 | 10 | 0 | 2 | 8 | 0 | 860 | 35% | 45% | 27.2% |
| 0.4 | 2.8 | 5 | 10 | 0 | 1 | 6 | 0 | 860 | 36% | 50% | 25.2% |
| 0.4 | 2.8 | 6 | 8 | 0 | 4 | 8 | 0 | 860 | 31% | 45% | 29.2% |
| 0.4 | 3 | 3 | 6 | 0 | 2 | 12 | 0 | 860 | 36% | 45% | 26.4% |
| 0.4 | 3 | 4 | 6 | 0 | 2 | 10 | 0 | 860 | 40% | 48% | 25.4% |
| 0.4 | 3 | 5 | 4 | 0 | 3 | 12 | 0 | 860 | 40% | 45% | 27.4% |
| 0.4 | 3 | 6 | 4 | 0 | 0 | 12 | 0 | 860 | 45% | 44% | 25.4% |
| 0.5 | 2.5 | 0 | 0 | 0 | 5 | 16 | 0 | 850 | 32% | 42% | 24.0% |
| 0.6 | 2.4 | 2 | 12 | 0 | 0 | 8 | 0 | 860 | 31% | 46% | 25.0% |
| 0.6 | 2.4 | 6 | 12 | 0 | 0 | 6 | 0 | 860 | 31% | 45% | 27.0% |
| 0.6 | 2.6 | 5 | 8 | 0 | 0 | 8 | 0 | 860 | 38% | 49% | 24.2% |
| 0.6 | 2.8 | 4 | 4 | 0 | 4 | 10 | 0 | 880 | 37% | 48% | 25.4% |
| 0.6 | 2.8 | 6 | 12 | 0 | 0 | 4 | 0 | 880 | 41% | 50% | 25.4% |
| 0.6 | 3 | 5 | 4 | 0 | 4 | 12 | 0 | 860 | 41% | 41% | 28.6% |
| 1 | 2 | 0 | 0 | 0 | 10 | 16 | 0 | 800 | 38% | 32% | 29.0% |
| 1 | 2 | 0 | 0 | 10 | 0 | 16 | 0 | 750 | 32% | 44% | 29.0% |
| 1 | 3 | 0 | 0 | 11 | 0 | 14 | 0 | 750 | 53% | 50% | 29.0% |
| 1 | 5 | 0 | 0 | 0 | 5 | 16 | 0 | 800 | 47% | 30% | 27.0% |
| 2 | 0.5 | 0 | 0 | 0 | 0 | 12 | 0 | 850 | 44% | 44% | 14.5% |
| 2 | 2 | 0 | 0 | 0 | 10 | 14 | 0 | 800 | 58% | 25% | 28.0% |
| 2.4 | 0.4 | 2 | 6 | 0 | 4 | 10 | 0 | 860 | 38% | 35% | 24.8% |
| 2.4 | 0.6 | 1 | 10 | 0 | 4 | 12 | 0 | 840 | 38% | 24% | 30.0% |
| 2.4 | 0.8 | 1 | 2 | 0 | 4 | 10 | 0 | 860 | 38% | 35% | 20.2% |
| 2.4 | 1 | 0 | 8 | 0 | 4 | 12 | 0 | 840 | 38% | 23% | 27.4% |
| 2.4 | 1.2 | 0 | 4 | 0 | 4 | 12 | 0 | 840 | 37% | 26% | 23.6% |
| 2.4 | 1.2 | 6 | 2 | 0 | 4 | 12 | 0 | 840 | 38% | 27% | 27.6% |
| 2.4 | 1.4 | 1 | 12 | 0 | 1 | 12 | 0 | 860 | 34% | 32% | 29.8% |
| 2.4 | 1.4 | 6 | 2 | 0 | 1 | 12 | 0 | 880 | 46% | 37% | 24.8% |
| 2.4 | 1.6 | 1 | 10 | 0 | 4 | 10 | 0 | 840 | 33% | 29% | 29.0% |
| 2.4 | 1.6 | 4 | 4 | 0 | 4 | 12 | 0 | 840 | 35% | 25% | 28.0% |
| 2.4 | 1.8 | 2 | 4 | 0 | 4 | 10 | 0 | 860 | 31% | 30% | 24.2% |
| 2.4 | 2 | 0 | 8 | 0 | 1 | 8 | 0 | 900 | 57% | 50% | 21.4% |
| 2.4 | 2 | 3 | 10 | 0 | 1 | 8 | 0 | 880 | 52% | 42% | 26.4% |
| 2.4 | 2.2 | 2 | 8 | 0 | 1 | 12 | 0 | 860 | 43% | 33% | 27.6% |
| 2.4 | 2.4 | 1 | 10 | 0 | 1 | 8 | 0 | 900 | 57% | 44% | 24.8% |
| 2.4 | 2.4 | 5 | 6 | 0 | 1 | 8 | 0 | 900 | 34% | 44% | 24.8% |
| 2.4 | 2.6 | 4 | 2 | 0 | 1 | 10 | 0 | 880 | 51% | 41% | 22.0% |
| 2.4 | 2.8 | 1 | 10 | 0 | 1 | 10 | 0 | 880 | 43% | 37% | 27.2% |
| 2.4 | 2.8 | 5 | 12 | 0 | 1 | 4 | 0 | 900 | 36% | 46% | 27.2% |
| 2.4 | 3 | 4 | 4 | 0 | 1 | 10 | 0 | 900 | 48% | 40% | 24.4% |
| 2.5 | 0.5 | 0 | 0 | 0 | 5 | 10 | 0 | 900 | 40% | 43% | 18.0% |
| 2.6 | 0 | 1 | 6 | 0 | 4 | 12 | 0 | 860 | 37% | 43% | 25.6% |
| 2.6 | 0.2 | 0 | 12 | 0 | 1 | 10 | 0 | 900 | 37% | 40% | 25.8% |
| 2.6 | 0.2 | 3 | 6 | 0 | 4 | 10 | 0 | 860 | 39% | 41% | 25.8% |
| 2.6 | 0.4 | 0 | 12 | 0 | 1 | 10 | 0 | 880 | 37% | 40% | 26.0% |
| 2.6 | 0.4 | 2 | 12 | 0 | 1 | 8 | 0 | 880 | 37% | 44% | 26.0% |
| 2.6 | 0.6 | 0 | 6 | 0 | 4 | 12 | 0 | 840 | 41% | 22% | 25.2% |
| 2.6 | 0.6 | 2 | 8 | 0 | 1 | 10 | 0 | 880 | 37% | 42% | 24.2% |
| 2.6 | 0.8 | 0 | 4 | 0 | 1 | 10 | 0 | 880 | 49% | 41% | 18.4% |
| 2.6 | 0.8 | 2 | 4 | 0 | 1 | 10 | 0 | 880 | 44% | 43% | 20.4% |
| 2.6 | 0.8 | 6 | 4 | 0 | 4 | 10 | 0 | 860 | 40% | 29% | 27.4% |
| 2.6 | 1 | 1 | 8 | 0 | 4 | 12 | 0 | 820 | 40% | 21% | 28.6% |
| 2.6 | 1 | 4 | 4 | 0 | 4 | 10 | 0 | 860 | 40% | 29% | 25.6% |
| 2.6 | 1.2 | 1 | 4 | 0 | 1 | 12 | 0 | 860 | 52% | 34% | 21.8% |
| 2.6 | 1.2 | 3 | 4 | 0 | 4 | 10 | 0 | 860 | 40% | 29% | 24.8% |
| 2.6 | 1.4 | 0 | 6 | 0 | 3 | 8 | 0 | 900 | 52% | 48% | 21.0% |
| 2.6 | 1.4 | 1 | 8 | 0 | 4 | 10 | 0 | 840 | 38% | 27% | 27.0% |
| 2.6 | 1.4 | 2 | 12 | 0 | 2 | 6 | 0 | 900 | 42% | 46% | 26.0% |
| 2.6 | 1.4 | 6 | 2 | 0 | 3 | 8 | 0 | 900 | 47% | 48% | 23.0% |
| 2.6 | 1.6 | 0 | 12 | 0 | 2 | 8 | 0 | 900 | 48% | 42% | 26.2% |
| 2.6 | 1.6 | 1 | 12 | 0 | 1 | 8 | 0 | 900 | 48% | 42% | 26.2% |
| 2.6 | 1.6 | 2 | 8 | 0 | 4 | 8 | 0 | 900 | 47% | 43% | 26.2% |
| 2.6 | 1.6 | 4 | 2 | 0 | 1 | 8 | 0 | 900 | 32% | 47% | 19.2% |
| 2.6 | 1.8 | 0 | 10 | 0 | 2 | 8 | 0 | 900 | 53% | 45% | 24.4% |
| 2.6 | 1.8 | 1 | 10 | 0 | 2 | 10 | 0 | 880 | 52% | 37% | 27.4% |
| 2.6 | 1.8 | 2 | 6 | 0 | 4 | 12 | 0 | 820 | 33% | 19% | 28.4% |
| 2.6 | 1.8 | 3 | 6 | 0 | 4 | 10 | 0 | 840 | 35% | 26% | 27.4% |
| 2.6 | 1.8 | 6 | 2 | 0 | 2 | 12 | 0 | 880 | 55% | 34% | 26.4% |
| 2.6 | 2 | 1 | 10 | 0 | 1 | 12 | 0 | 860 | 42% | 31% | 28.6% |
| 2.6 | 2 | 2 | 8 | 0 | 2 | 8 | 0 | 900 | 57% | 44% | 24.6% |
| 2.6 | 2 | 3 | 6 | 0 | 1 | 8 | 0 | 900 | 31% | 47% | 22.6% |
| 2.6 | 2 | 5 | 2 | 0 | 2 | 12 | 0 | 860 | 35% | 32% | 25.6% |
| 2.6 | 2.2 | 1 | 10 | 0 | 2 | 12 | 0 | 860 | 42% | 30% | 29.8% |
| 2.6 | 2.2 | 2 | 12 | 0 | 2 | 8 | 0 | 880 | 47% | 39% | 28.8% |
| 2.6 | 2.2 | 4 | 2 | 0 | 1 | 8 | 0 | 900 | 45% | 46% | 19.8% |
| 2.6 | 2.2 | 5 | 4 | 0 | 4 | 8 | 0 | 900 | 30% | 43% | 25.8% |
| 2.6 | 2.4 | 2 | 4 | 0 | 2 | 8 | 0 | 880 | 49% | 45% | 21.0% |
| 2.6 | 2.4 | 3 | 6 | 0 | 3 | 8 | 0 | 900 | 37% | 44% | 25.0% |
| 2.6 | 2.4 | 5 | 2 | 0 | 1 | 10 | 0 | 880 | 45% | 40% | 23.0% |
| 2.6 | 2.4 | 6 | 10 | 0 | 0 | 8 | 0 | 850 | 31% | 40% | 29.0% |
| 2.6 | 2.6 | 3 | 2 | 0 | 3 | 10 | 0 | 880 | 54% | 35% | 23.2% |
| 2.6 | 2.6 | 4 | 6 | 0 | 1 | 8 | 0 | 900 | 42% | 43% | 24.2% |
| 2.6 | 2.6 | 5 | 10 | 0 | 2 | 6 | 0 | 900 | 33% | 42% | 28.2% |
| 2.6 | 2.8 | 2 | 4 | 0 | 1 | 8 | 0 | 900 | 58% | 45% | 20.4% |
| 2.6 | 2.8 | 4 | 2 | 0 | 2 | 10 | 0 | 880 | 56% | 37% | 23.4% |
| 2.6 | 2.8 | 5 | 4 | 0 | 3 | 8 | 0 | 900 | 45% | 43% | 25.4% |
| 2.6 | 3 | 0 | 10 | 0 | 3 | 10 | 0 | 880 | 55% | 35% | 28.6% |
| 2.6 | 3 | 3 | 8 | 0 | 1 | 10 | 0 | 880 | 52% | 35% | 27.6% |
| 2.6 | 3 | 5 | 2 | 0 | 2 | 10 | 0 | 880 | 56% | 37% | 24.6% |
| 2.6 | 3 | 6 | 8 | 0 | 4 | 6 | 0 | 900 | 39% | 41% | 29.6% |
| 2.8 | 0 | 1 | 8 | 0 | 4 | 12 | 0 | 860 | 40% | 41% | 27.8% |
| 2.8 | 0 | 5 | 4 | 0 | 4 | 12 | 0 | 880 | 40% | 41% | 27.8% |
| 2.8 | 0.2 | 1 | 2 | 0 | 2 | 12 | 0 | 880 | 41% | 32% | 20.0% |
| 2.8 | 0.2 | 2 | 8 | 0 | 1 | 12 | 0 | 880 | 40% | 35% | 26.0% |
| 2.8 | 0.2 | 6 | 2 | 0 | 1 | 10 | 0 | 900 | 40% | 43% | 22.0% |
| 2.8 | 0.4 | 0 | 12 | 0 | 1 | 10 | 0 | 880 | 40% | 39% | 26.2% |
| 2.8 | 0.4 | 1 | 12 | 0 | 2 | 8 | 0 | 900 | 41% | 43% | 26.2% |
| 2.8 | 0.4 | 3 | 6 | 0 | 4 | 12 | 0 | 840 | 43% | 23% | 28.2% |
| 2.8 | 0.6 | 0 | 4 | 0 | 1 | 12 | 0 | 860 | 49% | 32% | 20.4% |
| 2.8 | 0.6 | 1 | 2 | 0 | 2 | 10 | 0 | 880 | 45% | 37% | 18.4% |
| 2.8 | 0.6 | 1 | 12 | 0 | 3 | 8 | 0 | 900 | 42% | 41% | 27.4% |
| 2.8 | 0.6 | 2 | 12 | 0 | 3 | 8 | 0 | 880 | 42% | 40% | 28.4% |
| 2.8 | 0.6 | 6 | 2 | 0 | 4 | 10 | 0 | 880 | 43% | 31% | 25.4% |
| 2.8 | 0.8 | 0 | 10 | 0 | 2 | 12 | 0 | 860 | 41% | 33% | 27.6% |
| 2.8 | 0.8 | 1 | 8 | 0 | 1 | 10 | 0 | 880 | 42% | 43% | 23.6% |
| 2.8 | 0.8 | 2 | 6 | 0 | 2 | 10 | 0 | 880 | 42% | 42% | 23.6% |
| 2.8 | 0.8 | 3 | 8 | 0 | 3 | 8 | 0 | 900 | 42% | 43% | 25.6% |
| 2.8 | 1 | 0 | 2 | 0 | 2 | 8 | 0 | 900 | 59% | 42% | 15.8% |
| 2.8 | 1 | 0 | 10 | 0 | 3 | 8 | 0 | 900 | 42% | 45% | 24.8% |
| 2.8 | 1 | 1 | 6 | 0 | 3 | 12 | 0 | 860 | 47% | 32% | 25.8% |
| 2.8 | 1 | 2 | 4 | 0 | 1 | 12 | 0 | 860 | 50% | 33% | 22.8% |
| 2.8 | 1 | 2 | 12 | 0 | 2 | 8 | 0 | 880 | 40% | 40% | 27.8% |
| 2.8 | 1 | 5 | 6 | 0 | 4 | 10 | 0 | 840 | 39% | 24% | 28.8% |
| 2.8 | 1.2 | 0 | 8 | 0 | 3 | 8 | 0 | 900 | 49% | 48% | 23.0% |
| 2.8 | 1.2 | 1 | 4 | 0 | 3 | 12 | 0 | 860 | 54% | 30% | 24.0% |
| 2.8 | 1.2 | 2 | 2 | 0 | 1 | 10 | 0 | 880 | 38% | 37% | 19.0% |
| 2.8 | 1.2 | 2 | 10 | 0 | 1 | 10 | 0 | 880 | 45% | 37% | 27.0% |
| 2.8 | 1.2 | 3 | 12 | 0 | 1 | 8 | 0 | 880 | 42% | 39% | 28.0% |
| 2.8 | 1.4 | 0 | 6 | 0 | 3 | 8 | 0 | 900 | 55% | 45% | 21.2% |
| 2.8 | 1.4 | 1 | 4 | 0 | 4 | 8 | 0 | 900 | 56% | 42% | 21.2% |
| 2.8 | 1.4 | 2 | 2 | 0 | 2 | 12 | 0 | 860 | 40% | 28% | 22.2% |
| 2.8 | 1.4 | 2 | 10 | 0 | 3 | 10 | 0 | 880 | 46% | 34% | 29.2% |
| 2.8 | 1.4 | 4 | 2 | 0 | 1 | 8 | 0 | 880 | 31% | 45% | 19.2% |
| 2.8 | 1.6 | 0 | 10 | 0 | 1 | 8 | 0 | 900 | 55% | 45% | 23.4% |
| 2.8 | 1.6 | 1 | 10 | 0 | 1 | 12 | 0 | 860 | 49% | 31% | 28.4% |
| 2.8 | 1.6 | 2 | 8 | 0 | 1 | 12 | 0 | 860 | 55% | 32% | 27.4% |
| 2.8 | 1.6 | 3 | 8 | 0 | 2 | 10 | 0 | 880 | 52% | 36% | 27.4% |
| 2.8 | 1.6 | 6 | 2 | 0 | 4 | 8 | 0 | 900 | 53% | 44% | 24.4% |
| 2.8 | 1.8 | 1 | 8 | 0 | 3 | 12 | 0 | 860 | 57% | 32% | 28.6% |
| 2.8 | 1.8 | 2 | 8 | 0 | 3 | 12 | 0 | 860 | 56% | 30% | 29.6% |
| 2.8 | 1.8 | 3 | 8 | 0 | 1 | 12 | 0 | 860 | 49% | 30% | 28.6% |
| 2.8 | 1.8 | 5 | 2 | 0 | 3 | 12 | 0 | 860 | 31% | 29% | 26.6% |
| 2.8 | 2 | 1 | 12 | 0 | 2 | 8 | 0 | 900 | 55% | 39% | 27.8% |
| 2.8 | 2 | 3 | 2 | 0 | 3 | 12 | 0 | 860 | 44% | 27% | 24.8% |
| 2.8 | 2 | 3 | 12 | 0 | 3 | 6 | 0 | 900 | 55% | 42% | 28.8% |

TABLE 17-continued

Example Compositions and Thermodynamic Criteria

| B | C | Cr | Mn | Mo | Nb | Ni | Si | 1 | 2 | 3 | 4 |
|---|---|---|---|---|---|---|---|---|---|---|---|
| 2.8 | 2 | 5 | 4 | 0 | 2 | 8 | 0 | 900 | 31% | 45% | 23.8% |
| 2.8 | 2.2 | 2 | 12 | 0 | 3 | 6 | 0 | 900 | 59% | 42% | 28.0% |
| 2.8 | 2.2 | 3 | 12 | 0 | 2 | 8 | 0 | 880 | 51% | 36% | 30.0% |
| 2.8 | 2.2 | 5 | 2 | 0 | 4 | 8 | 0 | 900 | 39% | 41% | 24.0% |
| 2.8 | 2.4 | 2 | 10 | 0 | 1 | 10 | 0 | 880 | 50% | 34% | 28.2% |
| 2.8 | 2.4 | 4 | 2 | 0 | 3 | 12 | 0 | 860 | 48% | 27% | 26.2% |
| 2.8 | 2.4 | 5 | 4 | 0 | 3 | 10 | 0 | 880 | 38% | 36% | 27.2% |
| 2.8 | 2.6 | 1 | 12 | 0 | 1 | 8 | 0 | 900 | 53% | 39% | 27.4% |
| 2.8 | 2.6 | 4 | 2 | 0 | 2 | 12 | 0 | 860 | 54% | 28% | 25.4% |
| 2.8 | 2.6 | 5 | 4 | 0 | 2 | 8 | 0 | 900 | 44% | 43% | 24.4% |
| 2.8 | 2.6 | 6 | 12 | 0 | 1 | 4 | 0 | 900 | 33% | 44% | 28.4% |
| 2.8 | 2.8 | 3 | 6 | 0 | 4 | 8 | 0 | 900 | 46% | 42% | 26.6% |
| 2.8 | 2.8 | 5 | 2 | 0 | 2 | 8 | 0 | 900 | 54% | 42% | 22.6% |
| 2.8 | 2.8 | 6 | 6 | 0 | 3 | 8 | 0 | 900 | 41% | 37% | 28.6% |
| 2.8 | 3 | 3 | 6 | 0 | 1 | 10 | 0 | 880 | 42% | 37% | 25.8% |
| 2.8 | 3 | 4 | 12 | 0 | 2 | 6 | 0 | 900 | 39% | 39% | 29.8% |
| 2.8 | 3 | 6 | 6 | 0 | 3 | 8 | 0 | 900 | 43% | 37% | 28.8% |
| 3 | 0 | 0 | 0 | 6 | 0 | 15 | 0 | 800 | 41% | 23% | 24.0% |
| 3 | 0 | 0 | 0 | 7 | 0 | 17 | 1 | 800 | 41% | 18% | 27.0% |
| 3 | 0 | 0 | 0 | 9 | 0 | 12 | 1 | 850 | 40% | 33% | 24.0% |
| 3 | 0 | 0 | 0 | 11 | 0 | 11 | 0 | 850 | 40% | 36% | 25.0% |
| 3 | 0 | 0 | 6 | 0 | 1 | 12 | 0 | 900 | 41% | 39% | 22.0% |
| 3 | 0 | 2 | 4 | 0 | 4 | 10 | 0 | 880 | 42% | 45% | 23.0% |
| 3 | 0.2 | 0 | 2 | 0 | 2 | 12 | 0 | 880 | 43% | 29% | 19.2% |
| 3 | 0.2 | 1 | 4 | 0 | 3 | 10 | 0 | 900 | 43% | 43% | 21.2% |
| 3 | 0.2 | 2 | 10 | 0 | 2 | 12 | 0 | 880 | 43% | 32% | 29.2% |
| 3 | 0.4 | 0 | 2 | 0 | 3 | 10 | 0 | 900 | 45% | 33% | 18.4% |
| 3 | 0.4 | 1 | 2 | 0 | 2 | 10 | 0 | 880 | 43% | 34% | 18.4% |
| 3 | 0.4 | 2 | 4 | 0 | 2 | 12 | 0 | 860 | 43% | 30% | 23.4% |
| 3 | 0.4 | 3 | 10 | 0 | 1 | 10 | 0 | 880 | 42% | 36% | 27.4% |
| 3 | 0.6 | 0 | 2 | 0 | 1 | 8 | 0 | 900 | 58% | 42% | 14.6% |
| 3 | 0.6 | 0 | 12 | 0 | 1 | 12 | 0 | 860 | 42% | 31% | 28.6% |
| 3 | 0.6 | 1 | 10 | 0 | 2 | 12 | 0 | 860 | 43% | 31% | 28.6% |
| 3 | 0.6 | 2 | 10 | 0 | 2 | 10 | 0 | 880 | 43% | 36% | 27.6% |
| 3 | 0.6 | 4 | 8 | 0 | 4 | 10 | 0 | 840 | 33% | 24% | 29.6% |
| 3 | 0.8 | 0 | 6 | 0 | 4 | 12 | 0 | 820 | 45% | 17% | 25.8% |
| 3 | 0.8 | 1 | 4 | 0 | 2 | 8 | 0 | 900 | 53% | 43% | 18.8% |
| 3 | 0.8 | 2 | 2 | 0 | 1 | 8 | 0 | 900 | 35% | 42% | 16.8% |
| 3 | 0.8 | 2 | 10 | 0 | 1 | 12 | 0 | 860 | 42% | 30% | 28.8% |
| 3 | 0.8 | 3 | 12 | 0 | 4 | 6 | 0 | 900 | 45% | 42% | 28.8% |
| 3 | 1 | 0 | 0 | 9 | 0 | 16 | 0 | 750 | 46% | 28% | 29.0% |
| 3 | 1 | 0 | 10 | 0 | 3 | 10 | 0 | 880 | 45% | 38% | 27.0% |
| 3 | 1 | 1 | 8 | 0 | 1 | 10 | 0 | 880 | 49% | 41% | 24.0% |
| 3 | 1 | 2 | 4 | 0 | 3 | 8 | 0 | 900 | 53% | 42% | 21.0% |
| 3 | 1 | 3 | 2 | 0 | 1 | 8 | 0 | 900 | 32% | 43% | 18.0% |
| 3 | 1 | 6 | 2 | 0 | 1 | 8 | 0 | 900 | 49% | 46% | 21.0% |
| 3 | 1.2 | 0 | 10 | 0 | 1 | 12 | 0 | 860 | 51% | 33% | 27.2% |
| 3 | 1.2 | 1 | 8 | 0 | 2 | 10 | 0 | 880 | 51% | 40% | 25.2% |
| 3 | 1.2 | 2 | 6 | 0 | 1 | 8 | 0 | 900 | 54% | 46% | 21.2% |
| 3 | 1.2 | 3 | 4 | 0 | 4 | 10 | 0 | 840 | 45% | 24% | 25.2% |
| 3 | 1.2 | 6 | 4 | 0 | 4 | 10 | 0 | 840 | 45% | 24% | 28.2% |
| 3 | 1.4 | 1 | 4 | 0 | 4 | 12 | 0 | 840 | 40% | 19% | 25.4% |
| 3 | 1.4 | 2 | 2 | 0 | 3 | 10 | 0 | 880 | 42% | 32% | 21.4% |
| 3 | 1.4 | 2 | 12 | 0 | 3 | 6 | 0 | 900 | 47% | 43% | 27.4% |
| 3 | 1.4 | 4 | 2 | 0 | 4 | 10 | 0 | 860 | 43% | 26% | 24.4% |
| 3 | 1.6 | 0 | 10 | 0 | 3 | 10 | 0 | 880 | 56% | 36% | 27.6% |
| 3 | 1.6 | 2 | 2 | 0 | 2 | 8 | 0 | 880 | 48% | 39% | 18.6% |
| 3 | 1.6 | 3 | 2 | 0 | 2 | 12 | 0 | 860 | 40% | 26% | 23.6% |
| 3 | 1.6 | 4 | 2 | 0 | 3 | 8 | 0 | 880 | 35% | 40% | 21.6% |
| 3 | 1.8 | 0 | 12 | 0 | 2 | 10 | 0 | 880 | 55% | 34% | 28.8% |
| 3 | 1.8 | 2 | 10 | 0 | 4 | 8 | 0 | 900 | 56% | 38% | 28.8% |
| 3 | 1.8 | 3 | 8 | 0 | 4 | 8 | 0 | 900 | 57% | 39% | 27.8% |
| 3 | 1.8 | 5 | 2 | 0 | 2 | 10 | 0 | 880 | 35% | 35% | 23.8% |
| 3 | 2 | 1 | 10 | 0 | 4 | 10 | 0 | 840 | 33% | 22% | 30.0% |
| 3 | 2 | 3 | 4 | 0 | 4 | 10 | 0 | 840 | 36% | 23% | 26.0% |
| 3 | 2 | 4 | 4 | 0 | 3 | 6 | 0 | 900 | 36% | 49% | 22.0% |
| 3 | 2 | 6 | 4 | 0 | 1 | 10 | 0 | 880 | 32% | 36% | 26.0% |
| 3 | 2.2 | 3 | 6 | 0 | 1 | 10 | 0 | 880 | 40% | 38% | 25.2% |
| 3 | 2.2 | 4 | 6 | 0 | 4 | 8 | 0 | 900 | 32% | 40% | 27.2% |
| 3 | 2.2 | 6 | 4 | 0 | 4 | 8 | 0 | 900 | 31% | 40% | 27.2% |
| 3 | 2.4 | 3 | 6 | 0 | 4 | 10 | 0 | 840 | 32% | 20% | 28.4% |
| 3 | 2.4 | 5 | 2 | 0 | 2 | 6 | 0 | 900 | 49% | 47% | 20.4% |
| 3 | 2.4 | 6 | 4 | 0 | 4 | 10 | 0 | 840 | 38% | 22% | 29.4% |
| 3 | 2.6 | 3 | 12 | 0 | 1 | 8 | 0 | 880 | 52% | 35% | 29.6% |
| 3 | 2.6 | 5 | 4 | 0 | 1 | 8 | 0 | 900 | 48% | 43% | 23.6% |
| 3 | 2.6 | 6 | 10 | 0 | 0 | 6 | 0 | 900 | 37% | 41% | 27.6% |
| 3 | 2.8 | 3 | 12 | 0 | 0 | 8 | 0 | 880 | 52% | 36% | 28.8% |
| 3 | 2.8 | 5 | 4 | 0 | 1 | 8 | 0 | 900 | 52% | 43% | 23.8% |
| 3 | 2.8 | 6 | 6 | 0 | 2 | 8 | 0 | 900 | 44% | 37% | 27.8% |
| 3 | 3 | 3 | 4 | 0 | 4 | 8 | 0 | 880 | 58% | 38% | 25.0% |
| 3 | 3 | 4 | 8 | 0 | 0 | 8 | 0 | 900 | 39% | 39% | 26.0% |
| 3 | 3 | 6 | 2 | 0 | 1 | 8 | 0 | 900 | 59% | 41% | 23.0% |
| 3.5 | 0 | 0 | 0 | 0 | 10 | 10 | 0 | 900 | 42% | 43% | 23.5% |
| 4 | 0 | 0 | 0 | 0 | 15 | 10 | 0 | 900 | 45% | 39% | 29.0% |
| 4 | 0 | 0 | 0 | 7 | 0 | 13 | 1 | 800 | 53% | 18% | 24.0% |
| 4 | 0 | 0 | 0 | 8 | 0 | 18 | 0 | 750 | 53% | 2% | 30.0% |
| 4 | 0 | 0 | 0 | 11 | 0 | 11 | 0 | 850 | 53% | 23% | 26.0% |
| 4 | 1 | 0 | 0 | 7 | 0 | 10 | 3 | 800 | 42% | 24% | 22.0% |
| 4.5 | 0 | 0 | 0 | 0 | 10 | 14 | 0 | 900 | 54% | 25% | 28.5% |
| 5 | 1 | 0 | 0 | 10 | 0 | 10 | 2 | 700 | 48% | 16% | 26.0% |
| 5 | 2 | 0 | 0 | 11 | 0 | 11 | 1 | 550 | 50% | 4% | 29.0% |
| 3 | 0 | 0 | 0 | 8 | 0 | 16 | 0 | 900 | 40% | 31% | 27.0% |
| 4 | 0 | 0 | 0 | 6 | 0 | 15 | 0 | 850 | 52% | 22% | 25.0% |
| 4 | 1 | 0 | 0 | 8 | 0 | 11 | 1 | 850 | 59% | 26% | 24.0% |
| 5 | 1 | 0 | 0 | 7 | 0 | 13 | 1 | 700 | 48% | 8% | 26.0% |
| 0 | 4 | 0 | 0 | 8 | 0 | 10 | 3 | 800 | 47% | 29% | 22.0% |
| 2 | 1 | 0 | 0 | 8 | 0 | 11 | 0 | 900 | 33% | 43% | 22.0% |
| 3 | 1 | 0 | 0 | 7 | 0 | 13 | 0 | 850 | 43% | 25% | 24.0% |
| 4 | 2 | 0 | 0 | 7 | 0 | 10 | 1 | 650 | 38% | 0% | 23.0% |
| 2.4 | 2.8 | 2 | 12 | 0 | 0 | 12 | 0 | 860 | 31% | 29% | 31.2% |
| 1.8 | 1.2 | 5 | 6 | 0 | 4 | 12 | 0 | 840 | 30% | 28% | 30.0% |
| 1.8 | 2.4 | 6 | 4 | 0 | 4 | 12 | 0 | 840 | 48% | 29% | 30.2% |
| 2.6 | 2.6 | 2 | 10 | 0 | 0 | 12 | 0 | 860 | 34% | 30% | 29.2% |
| 2.6 | 2.8 | 3 | 10 | 0 | 0 | 12 | 0 | 860 | 33% | 29% | 30.4% |
| 2.2 | 2.2 | 2 | 12 | 0 | 3 | 12 | 0 | 840 | 33% | 29% | 33.4% |
| 2 | 0.6 | 2 | 6 | 0 | 4 | 12 | 0 | 840 | 33% | 29% | 26.6% |
| 2 | 0.8 | 1 | 6 | 0 | 4 | 12 | 0 | 840 | 33% | 28% | 25.8% |
| 2.2 | 2.8 | 0 | 12 | 0 | 3 | 12 | 0 | 860 | 32% | 30% | 32.0% |
| 2 | 1 | 2 | 12 | 0 | 4 | 12 | 0 | 840 | 33% | 28% | 33.0% |
| 2 | 1.2 | 1 | 6 | 0 | 4 | 12 | 0 | 840 | 33% | 27% | 26.2% |
| 2 | 1.2 | 5 | 6 | 0 | 4 | 12 | 0 | 840 | 33% | 26% | 30.2% |
| 2.8 | 1.2 | 0 | 2 | 0 | 0 | 12 | 0 | 860 | 63% | 30% | 18.0% |
| 2 | 1.6 | 5 | 6 | 0 | 4 | 12 | 0 | 840 | 32% | 26% | 30.6% |
| 2.8 | 1.6 | 2 | 2 | 0 | 0 | 12 | 0 | 860 | 37% | 29% | 30.4% |
| 2.8 | 2 | 0 | 2 | 0 | 0 | 12 | 0 | 860 | 68% | 28% | 18.8% |
| 2.8 | 2 | 3 | 12 | 0 | 0 | 12 | 0 | 840 | 37% | 27% | 31.8% |
| 2.4 | 1.2 | 3 | 12 | 0 | 2 | 12 | 0 | 840 | 35% | 30% | 32.6% |
| 2.4 | 1.2 | 3 | 12 | 0 | 3 | 12 | 0 | 840 | 36% | 29% | 33.6% |
| 2.8 | 2.6 | 1 | 2 | 0 | 0 | 12 | 0 | 860 | 82% | 27% | 20.4% |
| 2.4 | 1.6 | 2 | 12 | 0 | 2 | 12 | 0 | 860 | 35% | 30% | 32.0% |
| 2.4 | 1.6 | 1 | 12 | 0 | 3 | 12 | 0 | 860 | 36% | 30% | 32.0% |
| 2.8 | 3 | 1 | 2 | 0 | 0 | 12 | 0 | 860 | 92% | 27% | 20.8% |
| 2.4 | 1.8 | 3 | 12 | 0 | 3 | 12 | 0 | 840 | 36% | 28% | 34.2% |
| 2.2 | 0.4 | 6 | 6 | 0 | 4 | 12 | 0 | 860 | 33% | 30% | 30.6% |
| 2.2 | 0.6 | 1 | 12 | 0 | 4 | 12 | 0 | 840 | 35% | 26% | 31.8% |
| 3 | 0.4 | 1 | 2 | 0 | 0 | 12 | 0 | 860 | 48% | 29% | 18.4% |
| 2.2 | 0.8 | 1 | 10 | 0 | 4 | 12 | 0 | 840 | 35% | 26% | 30.0% |
| 2.2 | 0.8 | 3 | 12 | 0 | 4 | 12 | 0 | 840 | 35% | 25% | 34.0% |
| 2.2 | 1 | 0 | 6 | 0 | 4 | 12 | 0 | 840 | 35% | 26% | 25.2% |
| 2.4 | 2.6 | 2 | 10 | 0 | 2 | 12 | 0 | 860 | 34% | 30% | 31.0% |
| 2.2 | 1 | 4 | 4 | 0 | 4 | 12 | 0 | 840 | 35% | 28% | 27.2% |
| 2.2 | 1.2 | 0 | 8 | 0 | 4 | 12 | 0 | 840 | 35% | 25% | 27.4% |
| 2.2 | 1.2 | 1 | 12 | 0 | 4 | 12 | 0 | 840 | 35% | 25% | 32.4% |
| 3 | 0.8 | 3 | 10 | 0 | 0 | 12 | 0 | 860 | 41% | 29% | 28.8% |
| 2.2 | 1.4 | 0 | 4 | 0 | 4 | 12 | 0 | 840 | 31% | 28% | 23.6% |
| 2.4 | 2.8 | 1 | 12 | 0 | 3 | 12 | 0 | 860 | 35% | 28% | 33.2% |
| 2.2 | 1.4 | 3 | 2 | 0 | 4 | 12 | 0 | 860 | 34% | 30% | 24.6% |
| 3 | 1 | 3 | 12 | 0 | 0 | 12 | 0 | 860 | 40% | 27% | 31.0% |
| 3 | 1.2 | 1 | 2 | 0 | 0 | 12 | 0 | 860 | 64% | 28% | 19.2% |
| 2.4 | 3 | 2 | 2 | 0 | 3 | 12 | 0 | 860 | 64% | 29% | 24.4% |
| 2.2 | 1.6 | 4 | 4 | 0 | 4 | 12 | 0 | 840 | 33% | 27% | 27.8% |
| 3 | 1.4 | 0 | 12 | 0 | 0 | 12 | 0 | 860 | 48% | 30% | 28.4% |
| 3 | 1.4 | 3 | 10 | 0 | 0 | 12 | 0 | 860 | 40% | 28% | 29.4% |
| 2.2 | 1.8 | 6 | 6 | 0 | 4 | 10 | 0 | 840 | 34% | 29% | 30.0% |
| 2.2 | 2 | 6 | 2 | 0 | 4 | 12 | 0 | 840 | 41% | 28% | 28.2% |
| 3 | 1.8 | 2 | 4 | 0 | 0 | 12 | 0 | 860 | 68% | 29% | 22.8% |
| 2.2 | 2.4 | 0 | 2 | 0 | 4 | 12 | 0 | 860 | 88% | 23% | 22.6% |
| 2.6 | 0.6 | 2 | 12 | 0 | 3 | 12 | 0 | 860 | 39% | 29% | 32.2% |
| 3 | 2.2 | 0 | 2 | 0 | 0 | 12 | 0 | 860 | 73% | 25% | 19.2% |
| 3 | 2.2 | 3 | 2 | 0 | 0 | 12 | 0 | 860 | 56% | 27% | 22.2% |
| 2.2 | 2.8 | 1 | 2 | 0 | 4 | 12 | 0 | 860 | 96% | 27% | 24.0% |
| 3 | 2.4 | 2 | 4 | 0 | 0 | 12 | 0 | 860 | 78% | 28% | 23.4% |

TABLE 17-continued

Example Compositions and Thermodynamic Criteria

| B | C | Cr | Mn | Mo | Nb | Ni | Si | 1 | 2 | 3 | 4 |
|---|---|---|---|---|---|---|---|---|---|---|---|
| 3 | 2.4 | 5 | 2 | 0 | 0 | 12 | 0 | 860 | 51% | 29% | 24.4% |
| 3 | 2.6 | 0 | 12 | 0 | 0 | 12 | 0 | 860 | 45% | 28% | 29.6% |
| 3 | 2.6 | 3 | 12 | 0 | 0 | 12 | 0 | 840 | 38% | 25% | 32.6% |
| 2.6 | 1.2 | 3 | 12 | 0 | 3 | 12 | 0 | 840 | 39% | 27% | 33.8% |
| 3 | 2.8 | 2 | 8 | 0 | 0 | 12 | 0 | 860 | 58% | 30% | 27.8% |
| 2.6 | 1.6 | 1 | 2 | 0 | 2 | 12 | 0 | 860 | 61% | 30% | 21.2% |
| 3 | 3 | 1 | 4 | 0 | 0 | 12 | 0 | 860 | 83% | 27% | 23.0% |
| 0 | 3 | 0 | 0 | 7 | 0 | 17 | 3 | 750 | 47% | 43% | 27.0% |
| 0 | 3 | 4 | 6 | 0 | 3 | 12 | 0 | 860 | 32% | 44% | 28.0% |
| 0 | 3 | 13 | 0 | 0 | 0 | 12 | 0 | 850 | 35% | 36% | 28.0% |
| 0 | 3.6 | 10 | 0 | 0 | 0 | 14 | 0 | 800 | 38% | 43% | 27.6% |
| 0.2 | 2.6 | 5 | 2 | 0 | 3 | 12 | 0 | 880 | 30% | 50% | 24.8% |
| 0.2 | 2.8 | 5 | 6 | 0 | 0 | 10 | 0 | 860 | 34% | 49% | 24.0% |
| 0.2 | 3 | 4 | 4 | 0 | 0 | 12 | 0 | 860 | 40% | 48% | 23.2% |
| 0.2 | 3 | 6 | 6 | 0 | 0 | 12 | 0 | 860 | 38% | 41% | 27.2% |
| 0.4 | 2.6 | 3 | 10 | 0 | 2 | 10 | 0 | 840 | 31% | 42% | 28.0% |
| 0.4 | 2.6 | 4 | 12 | 0 | 1 | 8 | 0 | 840 | 32% | 42% | 28.0% |
| 0.4 | 2.6 | 6 | 2 | 0 | 0 | 12 | 0 | 880 | 38% | 47% | 23.0% |
| 0.4 | 2.8 | 2 | 12 | 0 | 0 | 8 | 0 | 840 | 36% | 47% | 25.2% |
| 0.4 | 2.8 | 4 | 4 | 0 | 0 | 12 | 0 | 860 | 40% | 48% | 23.2% |
| 0.4 | 2.8 | 5 | 2 | 0 | 0 | 12 | 0 | 880 | 41% | 48% | 22.2% |
| 0.4 | 2.8 | 5 | 12 | 0 | 4 | 4 | 0 | 880 | 31% | 49% | 28.2% |
| 0.4 | 2.8 | 6 | 12 | 0 | 3 | 4 | 0 | 880 | 30% | 48% | 28.2% |
| 0.4 | 3 | 3 | 10 | 0 | 0 | 8 | 0 | 860 | 41% | 47% | 24.4% |
| 0.4 | 3 | 4 | 8 | 0 | 3 | 8 | 0 | 860 | 38% | 48% | 26.4% |
| 0.4 | 3 | 5 | 8 | 0 | 1 | 8 | 0 | 860 | 41% | 48% | 25.4% |
| 0.4 | 3 | 6 | 6 | 0 | 3 | 8 | 0 | 860 | 39% | 50% | 26.4% |
| 0.5 | 4 | 0 | 0 | 0 | 5 | 14 | 0 | 850 | 32% | 44% | 23.5% |
| 0.6 | 2.4 | 4 | 6 | 0 | 0 | 12 | 0 | 860 | 35% | 45% | 25.0% |
| 0.6 | 2.6 | 3 | 8 | 0 | 4 | 10 | 0 | 860 | 32% | 45% | 28.2% |
| 0.6 | 2.6 | 6 | 6 | 0 | 0 | 12 | 0 | 860 | 40% | 41% | 27.2% |
| 0.6 | 2.8 | 4 | 12 | 0 | 0 | 10 | 0 | 840 | 41% | 37% | 29.4% |
| 0.6 | 3 | 3 | 8 | 0 | 0 | 10 | 0 | 860 | 45% | 46% | 24.6% |
| 0.6 | 3 | 6 | 4 | 0 | 0 | 10 | 0 | 880 | 47% | 49% | 23.6% |
| 1 | 2 | 0 | 0 | 7 | 0 | 16 | 0 | 750 | 35% | 49% | 26.0% |
| 1 | 2.5 | 0 | 0 | 0 | 5 | 12 | 0 | 850 | 47% | 48% | 20.5% |
| 1 | 3.5 | 0 | 0 | 0 | 10 | 14 | 0 | 850 | 58% | 35% | 28.5% |
| 1.5 | 1 | 0 | 0 | 0 | 10 | 12 | 0 | 900 | 31% | 48% | 24.5% |
| 2 | 1 | 0 | 0 | 0 | 5 | 16 | 0 | 800 | 48% | 26% | 24.0% |
| 2 | 2 | 0 | 0 | 12 | 0 | 14 | 0 | 750 | 53% | 49% | 30.0% |
| 2.4 | 0.4 | 4 | 6 | 0 | 4 | 10 | 0 | 860 | 33% | 35% | 26.8% |
| 2.4 | 0.6 | 3 | 6 | 0 | 4 | 10 | 0 | 860 | 38% | 31% | 26.0% |
| 2.4 | 0.8 | 2 | 8 | 0 | 4 | 10 | 0 | 840 | 38% | 30% | 27.2% |
| 2.4 | 1 | 2 | 4 | 0 | 4 | 10 | 0 | 860 | 38% | 32% | 23.4% |
| 2.4 | 1.2 | 1 | 8 | 0 | 4 | 12 | 0 | 820 | 38% | 23% | 28.6% |
| 2.4 | 1.4 | 0 | 8 | 0 | 4 | 12 | 0 | 840 | 34% | 23% | 27.8% |
| 2.4 | 1.4 | 2 | 8 | 0 | 4 | 10 | 0 | 840 | 37% | 29% | 27.8% |
| 2.4 | 1.6 | 0 | 8 | 0 | 1 | 10 | 0 | 880 | 50% | 44% | 23.0% |
| 2.4 | 1.6 | 2 | 6 | 0 | 1 | 12 | 0 | 880 | 50% | 37% | 25.0% |
| 2.4 | 1.8 | 0 | 6 | 0 | 1 | 10 | 0 | 880 | 57% | 44% | 21.2% |
| 2.4 | 1.8 | 3 | 2 | 0 | 1 | 8 | 0 | 900 | 39% | 49% | 18.2% |
| 2.4 | 2 | 1 | 10 | 0 | 1 | 10 | 0 | 880 | 45% | 39% | 26.4% |
| 2.4 | 2 | 5 | 2 | 0 | 4 | 10 | 0 | 860 | 36% | 32% | 25.4% |
| 2.4 | 2.2 | 3 | 10 | 0 | 1 | 8 | 0 | 880 | 56% | 42% | 26.6% |
| 2.4 | 2.4 | 2 | 10 | 0 | 1 | 12 | 0 | 860 | 33% | 31% | 29.8% |
| 2.4 | 2.6 | 0 | 12 | 0 | 1 | 10 | 0 | 880 | 33% | 36% | 28.0% |
| 2.4 | 2.6 | 5 | 2 | 0 | 4 | 10 | 0 | 860 | 31% | 31% | 26.0% |
| 2.4 | 2.8 | 3 | 4 | 0 | 1 | 8 | 0 | 900 | 52% | 49% | 21.2% |
| 2.4 | 3 | 0 | 10 | 0 | 1 | 10 | 0 | 880 | 47% | 38% | 26.4% |
| 2.4 | 3 | 5 | 8 | 0 | 1 | 6 | 0 | 900 | 44% | 46% | 25.4% |
| 2.5 | 1 | 0 | 0 | 0 | 5 | 16 | 0 | 800 | 57% | 20% | 24.5% |
| 2.6 | 0 | 2 | 12 | 0 | 1 | 12 | 0 | 880 | 37% | 37% | 29.6% |
| 2.6 | 0.2 | 1 | 8 | 0 | 1 | 12 | 0 | 880 | 37% | 38% | 24.8% |
| 2.6 | 0.2 | 5 | 2 | 0 | 4 | 12 | 0 | 900 | 39% | 38% | 25.8% |
| 2.6 | 0.4 | 1 | 8 | 0 | 1 | 10 | 0 | 900 | 37% | 44% | 23.0% |
| 2.6 | 0.4 | 3 | 12 | 0 | 1 | 8 | 0 | 880 | 37% | 43% | 27.0% |
| 2.6 | 0.6 | 1 | 2 | 0 | 1 | 12 | 0 | 860 | 46% | 33% | 19.2% |
| 2.6 | 0.6 | 3 | 6 | 0 | 4 | 10 | 0 | 860 | 41% | 29% | 26.2% |
| 2.6 | 0.8 | 0 | 10 | 0 | 4 | 10 | 0 | 840 | 40% | 29% | 27.4% |
| 2.6 | 0.8 | 2 | 10 | 0 | 1 | 12 | 0 | 860 | 37% | 33% | 28.4% |
| 2.6 | 1 | 0 | 6 | 0 | 4 | 10 | 0 | 840 | 40% | 28% | 23.6% |
| 2.6 | 1 | 2 | 4 | 0 | 4 | 10 | 0 | 860 | 40% | 29% | 23.6% |
| 2.6 | 1 | 6 | 6 | 0 | 4 | 10 | 0 | 840 | 37% | 26% | 29.6% |
| 2.6 | 1.2 | 1 | 10 | 0 | 4 | 10 | 0 | 840 | 40% | 28% | 28.8% |
| 2.6 | 1.2 | 4 | 2 | 0 | 4 | 10 | 0 | 860 | 40% | 31% | 23.8% |
| 2.6 | 1.4 | 0 | 10 | 0 | 4 | 10 | 0 | 840 | 37% | 27% | 28.0% |
| 2.6 | 1.4 | 2 | 2 | 0 | 1 | 8 | 0 | 880 | 39% | 46% | 17.0% |
| 2.6 | 1.4 | 3 | 10 | 0 | 1 | 8 | 0 | 900 | 44% | 43% | 26.0% |
| 2.6 | 1.6 | 0 | 4 | 0 | 4 | 10 | 0 | 860 | 33% | 29% | 22.2% |
| 2.6 | 1.6 | 1 | 4 | 0 | 4 | 10 | 0 | 860 | 34% | 28% | 23.2% |
| 2.6 | 1.6 | 2 | 2 | 0 | 3 | 10 | 0 | 880 | 40% | 37% | 21.2% |
| 2.6 | 1.6 | 2 | 12 | 0 | 3 | 6 | 0 | 900 | 44% | 45% | 27.2% |
| 2.6 | 1.6 | 6 | 2 | 0 | 1 | 8 | 0 | 900 | 53% | 49% | 21.2% |
| 2.6 | 1.8 | 1 | 4 | 0 | 3 | 8 | 0 | 880 | 60% | 45% | 20.4% |
| 2.6 | 1.8 | 2 | 2 | 0 | 1 | 8 | 0 | 880 | 47% | 45% | 17.4% |
| 2.6 | 1.8 | 2 | 10 | 0 | 2 | 8 | 0 | 900 | 51% | 42% | 26.4% |
| 2.6 | 1.8 | 3 | 12 | 0 | 3 | 6 | 0 | 900 | 48% | 43% | 28.4% |
| 2.6 | 2 | 0 | 10 | 0 | 1 | 8 | 0 | 900 | 58% | 45% | 23.6% |
| 2.6 | 2 | 1 | 12 | 0 | 4 | 8 | 0 | 880 | 49% | 39% | 29.6% |
| 2.6 | 2 | 2 | 10 | 0 | 4 | 8 | 0 | 900 | 53% | 40% | 28.6% |
| 2.6 | 2 | 3 | 12 | 0 | 2 | 6 | 0 | 900 | 53% | 44% | 27.6% |
| 2.6 | 2 | 6 | 2 | 0 | 2 | 10 | 0 | 900 | 59% | 41% | 24.6% |
| 2.6 | 2.2 | 2 | 2 | 0 | 3 | 12 | 0 | 860 | 51% | 28% | 23.8% |
| 2.6 | 2.2 | 3 | 4 | 0 | 1 | 10 | 0 | 880 | 42% | 40% | 22.8% |
| 2.6 | 2.2 | 4 | 4 | 0 | 2 | 12 | 0 | 880 | 37% | 34% | 26.8% |
| 2.6 | 2.4 | 0 | 10 | 0 | 2 | 10 | 0 | 880 | 56% | 37% | 27.0% |
| 2.6 | 2.4 | 2 | 10 | 0 | 3 | 8 | 0 | 900 | 58% | 40% | 28.0% |
| 2.6 | 2.4 | 4 | 2 | 0 | 1 | 8 | 0 | 900 | 49% | 45% | 20.0% |
| 2.6 | 2.4 | 5 | 4 | 0 | 3 | 8 | 0 | 900 | 36% | 44% | 25.0% |
| 2.6 | 2.6 | 1 | 8 | 0 | 1 | 12 | 0 | 860 | 55% | 33% | 27.2% |
| 2.6 | 2.6 | 3 | 6 | 0 | 2 | 10 | 0 | 880 | 40% | 38% | 26.2% |
| 2.6 | 2.6 | 4 | 12 | 0 | 1 | 6 | 0 | 900 | 33% | 42% | 28.2% |
| 2.6 | 2.6 | 6 | 6 | 0 | 2 | 8 | 0 | 900 | 36% | 40% | 27.2% |
| 2.6 | 2.8 | 3 | 2 | 0 | 2 | 10 | 0 | 880 | 60% | 36% | 22.4% |
| 2.6 | 2.8 | 4 | 4 | 0 | 3 | 12 | 0 | 860 | 38% | 31% | 28.4% |
| 2.6 | 2.8 | 5 | 12 | 0 | 1 | 4 | 0 | 900 | 37% | 45% | 27.4% |
| 2.6 | 3 | 1 | 12 | 0 | 1 | 10 | 0 | 880 | 34% | 33% | 29.6% |
| 2.6 | 3 | 4 | 2 | 0 | 3 | 12 | 0 | 860 | 56% | 28% | 26.6% |
| 2.6 | 3 | 5 | 6 | 0 | 3 | 8 | 0 | 900 | 45% | 40% | 27.6% |
| 2.8 | 0 | 0 | 4 | 0 | 4 | 10 | 0 | 880 | 40% | 48% | 20.8% |
| 2.8 | 0 | 2 | 6 | 0 | 2 | 12 | 0 | 900 | 38% | 47% | 24.8% |
| 2.8 | 0.2 | 0 | 2 | 0 | 4 | 12 | 0 | 900 | 41% | 35% | 21.0% |
| 2.8 | 0.2 | 1 | 6 | 0 | 4 | 10 | 0 | 860 | 41% | 39% | 24.0% |
| 2.8 | 0.2 | 2 | 12 | 0 | 3 | 10 | 0 | 900 | 41% | 40% | 30.0% |
| 2.8 | 0.4 | 0 | 2 | 0 | 4 | 12 | 0 | 860 | 43% | 28% | 21.2% |
| 2.8 | 0.4 | 1 | 4 | 0 | 1 | 10 | 0 | 900 | 42% | 40% | 19.2% |
| 2.8 | 0.4 | 2 | 6 | 0 | 2 | 10 | 0 | 900 | 41% | 43% | 23.2% |
| 2.8 | 0.4 | 4 | 2 | 0 | 4 | 12 | 0 | 860 | 43% | 28% | 25.2% |
| 2.8 | 0.6 | 0 | 8 | 0 | 1 | 10 | 0 | 880 | 41% | 44% | 22.4% |
| 2.8 | 0.6 | 1 | 6 | 0 | 1 | 10 | 0 | 900 | 43% | 42% | 21.4% |
| 2.8 | 0.6 | 2 | 6 | 0 | 2 | 10 | 0 | 880 | 41% | 42% | 23.4% |
| 2.8 | 0.6 | 3 | 10 | 0 | 1 | 10 | 0 | 880 | 39% | 37% | 27.4% |
| 2.8 | 0.8 | 0 | 2 | 0 | 4 | 10 | 0 | 860 | 43% | 30% | 19.6% |
| 2.8 | 0.8 | 0 | 12 | 0 | 4 | 8 | 0 | 900 | 43% | 41% | 27.6% |
| 2.8 | 0.8 | 1 | 10 | 0 | 2 | 10 | 0 | 880 | 40% | 38% | 26.6% |
| 2.8 | 0.8 | 2 | 8 | 0 | 4 | 8 | 0 | 900 | 43% | 44% | 25.6% |
| 2.8 | 0.8 | 3 | 12 | 0 | 2 | 6 | 0 | 900 | 40% | 45% | 26.6% |
| 2.8 | 1 | 0 | 4 | 0 | 3 | 8 | 0 | 900 | 54% | 44% | 18.8% |
| 2.8 | 1 | 0 | 12 | 0 | 4 | 10 | 0 | 840 | 43% | 26% | 29.8% |
| 2.8 | 1 | 1 | 10 | 0 | 1 | 8 | 0 | 900 | 42% | 45% | 23.8% |
| 2.8 | 1 | 2 | 6 | 0 | 2 | 12 | 0 | 860 | 46% | 34% | 25.8% |
| 2.8 | 1 | 3 | 8 | 0 | 2 | 10 | 0 | 880 | 41% | 37% | 26.8% |
| 2.8 | 1 | 6 | 6 | 0 | 4 | 10 | 0 | 840 | 39% | 24% | 29.8% |
| 2.8 | 1.2 | 0 | 10 | 0 | 4 | 8 | 0 | 900 | 44% | 44% | 26.0% |
| 2.8 | 1.2 | 1 | 6 | 0 | 4 | 12 | 0 | 820 | 42% | 18% | 27.0% |
| 2.8 | 1.2 | 2 | 4 | 0 | 2 | 10 | 0 | 860 | 53% | 38% | 22.0% |
| 2.8 | 1.2 | 2 | 12 | 0 | 3 | 6 | 0 | 900 | 41% | 45% | 27.0% |
| 2.8 | 1.2 | 5 | 2 | 0 | 4 | 12 | 0 | 840 | 43% | 22% | 27.0% |
| 2.8 | 1.4 | 0 | 8 | 0 | 4 | 8 | 0 | 900 | 51% | 46% | 24.2% |
| 2.8 | 1.4 | 1 | 8 | 0 | 1 | 8 | 0 | 900 | 52% | 48% | 22.2% |
| 2.8 | 1.4 | 2 | 4 | 0 | 3 | 12 | 0 | 860 | 55% | 30% | 25.2% |
| 2.8 | 1.4 | 3 | 2 | 0 | 2 | 12 | 0 | 860 | 33% | 29% | 23.2% |
| 2.8 | 1.4 | 6 | 2 | 0 | 2 | 8 | 0 | 900 | 52% | 46% | 22.2% |
| 2.8 | 1.6 | 0 | 12 | 0 | 2 | 10 | 0 | 880 | 50% | 35% | 28.4% |
| 2.8 | 1.6 | 2 | 2 | 0 | 1 | 10 | 0 | 880 | 46% | 36% | 19.4% |
| 2.8 | 1.6 | 2 | 10 | 0 | 3 | 10 | 0 | 880 | 50% | 34% | 29.4% |
| 2.8 | 1.6 | 3 | 12 | 0 | 2 | 8 | 0 | 880 | 49% | 38% | 29.4% |
| 2.8 | 1.8 | 0 | 10 | 0 | 1 | 10 | 0 | 880 | 58% | 39% | 25.6% |
| 2.8 | 1.8 | 1 | 12 | 0 | 1 | 10 | 0 | 880 | 42% | 34% | 28.6% |
| 2.8 | 1.8 | 2 | 12 | 0 | 2 | 8 | 0 | 880 | 52% | 38% | 28.6% |
| 2.8 | 1.8 | 3 | 12 | 0 | 1 | 8 | 0 | 880 | 53% | 38% | 28.6% |
| 2.8 | 1.8 | 6 | 2 | 0 | 4 | 8 | 0 | 900 | 56% | 43% | 24.6% |

TABLE 17-continued

Example Compositions and Thermodynamic Criteria

| B | C | Cr | Mn | Mo | Nb | Ni | Si | 1 | 2 | 3 | 4 |
|---|---|---|---|---|---|---|---|---|---|---|---|
| 2.8 | 2 | 2 | 8 | 0 | 2 | 12 | 0 | 860 | 56% | 30% | 28.8% |
| 2.8 | 2 | 3 | 4 | 0 | 4 | 8 | 0 | 880 | 35% | 43% | 23.8% |
| 2.8 | 2 | 4 | 2 | 0 | 4 | 10 | 0 | 860 | 33% | 28% | 24.8% |
| 2.8 | 2.2 | 0 | 12 | 0 | 1 | 8 | 0 | 900 | 59% | 41% | 26.0% |
| 2.8 | 2.2 | 3 | 4 | 0 | 2 | 8 | 0 | 900 | 43% | 44% | 22.0% |
| 2.8 | 2.2 | 4 | 2 | 0 | 4 | 8 | 0 | 880 | 43% | 40% | 23.0% |
| 2.8 | 2.2 | 5 | 6 | 0 | 1 | 8 | 0 | 900 | 33% | 42% | 25.0% |
| 2.8 | 2.4 | 3 | 4 | 0 | 3 | 6 | 0 | 900 | 46% | 50% | 21.2% |
| 2.8 | 2.4 | 4 | 6 | 0 | 1 | 10 | 0 | 880 | 37% | 37% | 26.2% |
| 2.8 | 2.4 | 6 | 2 | 0 | 3 | 8 | 0 | 900 | 41% | 43% | 24.2% |
| 2.8 | 2.6 | 3 | 4 | 0 | 1 | 10 | 0 | 880 | 52% | 37% | 23.4% |
| 2.8 | 2.6 | 4 | 4 | 0 | 4 | 8 | 0 | 900 | 44% | 42% | 25.4% |
| 2.8 | 2.6 | 5 | 8 | 0 | 2 | 8 | 0 | 900 | 35% | 38% | 28.4% |
| 2.8 | 2.8 | 1 | 10 | 0 | 2 | 10 | 0 | 880 | 55% | 34% | 28.6% |
| 2.8 | 2.8 | 4 | 2 | 0 | 3 | 10 | 0 | 880 | 57% | 33% | 24.6% |
| 2.8 | 2.8 | 5 | 4 | 0 | 3 | 10 | 0 | 880 | 46% | 36% | 27.6% |
| 2.8 | 3 | 0 | 12 | 0 | 1 | 8 | 0 | 900 | 56% | 39% | 26.8% |
| 2.8 | 3 | 3 | 10 | 0 | 2 | 8 | 0 | 900 | 58% | 37% | 28.8% |
| 2.8 | 3 | 5 | 4 | 0 | 2 | 12 | 0 | 860 | 32% | 30% | 28.8% |
| 3 | 0 | 0 | 0 | 0 | 0 | 14 | 0 | 850 | 42% | 27% | 17.0% |
| 3 | 0 | 0 | 0 | 6 | 0 | 18 | 3 | 800 | 40% | 17% | 27.0% |
| 3 | 0 | 0 | 0 | 8 | 0 | 12 | 0 | 850 | 41% | 33% | 23.0% |
| 3 | 0 | 0 | 0 | 9 | 0 | 16 | 0 | 800 | 41% | 20% | 28.0% |
| 3 | 0 | 0 | 0 | 11 | 0 | 15 | 0 | 800 | 40% | 23% | 29.0% |
| 3 | 0 | 1 | 2 | 0 | 1 | 10 | 0 | 900 | 41% | 42% | 17.0% |
| 3 | 0 | 3 | 4 | 0 | 4 | 10 | 0 | 880 | 42% | 45% | 24.0% |
| 3 | 0.2 | 0 | 6 | 0 | 2 | 12 | 0 | 880 | 43% | 34% | 23.2% |
| 3 | 0.2 | 1 | 8 | 0 | 4 | 12 | 0 | 860 | 44% | 29% | 28.2% |
| 3 | 0.2 | 3 | 8 | 0 | 3 | 12 | 0 | 900 | 43% | 37% | 29.2% |
| 3 | 0.4 | 0 | 6 | 0 | 2 | 12 | 0 | 860 | 44% | 31% | 23.4% |
| 3 | 0.4 | 1 | 6 | 0 | 1 | 12 | 0 | 860 | 43% | 33% | 23.4% |
| 3 | 0.4 | 2 | 8 | 0 | 2 | 10 | 0 | 880 | 43% | 40% | 25.4% |
| 3 | 0.4 | 4 | 6 | 0 | 4 | 12 | 0 | 840 | 40% | 20% | 29.4% |
| 3 | 0.6 | 0 | 4 | 0 | 3 | 10 | 0 | 880 | 49% | 35% | 20.6% |
| 3 | 0.6 | 1 | 2 | 0 | 3 | 12 | 0 | 860 | 46% | 26% | 21.6% |
| 3 | 0.6 | 2 | 2 | 0 | 4 | 10 | 0 | 860 | 45% | 28% | 21.6% |
| 3 | 0.6 | 3 | 6 | 0 | 4 | 10 | 0 | 840 | 45% | 24% | 26.6% |
| 3 | 0.6 | 6 | 2 | 0 | 4 | 10 | 0 | 860 | 45% | 29% | 25.6% |
| 3 | 0.8 | 0 | 10 | 0 | 2 | 10 | 0 | 880 | 43% | 39% | 25.8% |
| 3 | 0.8 | 1 | 6 | 0 | 3 | 12 | 0 | 860 | 47% | 30% | 25.8% |
| 3 | 0.8 | 2 | 4 | 0 | 2 | 8 | 0 | 900 | 51% | 44% | 19.8% |
| 3 | 0.8 | 2 | 12 | 0 | 4 | 8 | 0 | 880 | 45% | 37% | 29.8% |
| 3 | 0.8 | 6 | 2 | 0 | 1 | 12 | 0 | 860 | 46% | 32% | 24.8% |
| 3 | 1 | 0 | 4 | 0 | 4 | 8 | 0 | 900 | 57% | 40% | 20.0% |
| 3 | 1 | 1 | 2 | 0 | 2 | 8 | 0 | 900 | 59% | 40% | 17.0% |
| 3 | 1 | 1 | 10 | 0 | 2 | 10 | 0 | 880 | 45% | 37% | 27.0% |
| 3 | 1 | 2 | 6 | 0 | 4 | 8 | 0 | 900 | 48% | 44% | 24.0% |
| 3 | 1 | 3 | 8 | 0 | 3 | 8 | 0 | 900 | 44% | 42% | 26.0% |
| 3 | 1.2 | 0 | 2 | 0 | 4 | 10 | 0 | 860 | 50% | 27% | 20.2% |
| 3 | 1.2 | 0 | 12 | 0 | 3 | 10 | 0 | 880 | 46% | 34% | 29.2% |
| 3 | 1.2 | 1 | 10 | 0 | 3 | 10 | 0 | 880 | 47% | 35% | 28.2% |
| 3 | 1.2 | 2 | 8 | 0 | 2 | 8 | 0 | 900 | 50% | 44% | 24.2% |
| 3 | 1.2 | 3 | 10 | 0 | 1 | 10 | 0 | 880 | 48% | 34% | 28.2% |
| 3 | 1.4 | 0 | 8 | 0 | 1 | 12 | 0 | 860 | 58% | 32% | 25.4% |
| 3 | 1.4 | 1 | 8 | 0 | 1 | 12 | 0 | 860 | 56% | 33% | 26.4% |
| 3 | 1.4 | 2 | 6 | 0 | 1 | 10 | 0 | 880 | 57% | 39% | 23.4% |
| 3 | 1.4 | 3 | 4 | 0 | 4 | 10 | 0 | 840 | 43% | 24% | 25.4% |
| 3 | 1.4 | 6 | 2 | 0 | 2 | 12 | 0 | 860 | 55% | 30% | 26.4% |
| 3 | 1.6 | 1 | 6 | 0 | 4 | 10 | 0 | 840 | 39% | 22% | 25.6% |
| 3 | 1.6 | 2 | 6 | 0 | 4 | 8 | 0 | 880 | 57% | 43% | 24.6% |
| 3 | 1.6 | 3 | 4 | 0 | 4 | 10 | 0 | 840 | 40% | 24% | 25.6% |
| 3 | 1.6 | 5 | 2 | 0 | 4 | 10 | 0 | 860 | 41% | 26% | 25.6% |
| 3 | 1.8 | 1 | 10 | 0 | 3 | 8 | 0 | 900 | 58% | 40% | 26.8% |
| 3 | 1.8 | 3 | 2 | 0 | 2 | 12 | 0 | 860 | 45% | 26% | 23.8% |
| 3 | 1.8 | 4 | 2 | 0 | 1 | 8 | 0 | 880 | 42% | 42% | 19.8% |
| 3 | 1.8 | 5 | 6 | 0 | 4 | 10 | 0 | 840 | 38% | 21% | 29.8% |
| 3 | 2 | 2 | 10 | 0 | 4 | 8 | 0 | 900 | 59% | 37% | 29.0% |
| 3 | 2 | 3 | 8 | 0 | 2 | 12 | 0 | 860 | 54% | 28% | 30.0% |
| 3 | 2 | 5 | 2 | 0 | 1 | 10 | 0 | 880 | 41% | 35% | 23.0% |
| 3 | 2.2 | 2 | 4 | 0 | 4 | 10 | 0 | 840 | 32% | 23% | 25.2% |
| 3 | 2.2 | 4 | 2 | 0 | 2 | 6 | 0 | 900 | 49% | 47% | 19.2% |
| 3 | 2.2 | 5 | 2 | 0 | 3 | 12 | 0 | 860 | 42% | 26% | 27.2% |
| 3 | 2.4 | 2 | 8 | 0 | 2 | 12 | 0 | 860 | 60% | 29% | 29.4% |
| 3 | 2.4 | 4 | 4 | 0 | 1 | 8 | 0 | 900 | 47% | 43% | 22.4% |
| 3 | 2.4 | 5 | 4 | 0 | 2 | 8 | 0 | 900 | 42% | 43% | 24.4% |
| 3 | 2.6 | 1 | 12 | 0 | 1 | 10 | 0 | 880 | 46% | 32% | 29.6% |
| 3 | 2.6 | 4 | 4 | 0 | 3 | 8 | 0 | 900 | 48% | 41% | 24.6% |
| 3 | 2.6 | 5 | 6 | 0 | 3 | 8 | 0 | 900 | 40% | 38% | 27.6% |
| 3 | 2.8 | 1 | 12 | 0 | 1 | 10 | 0 | 880 | 46% | 31% | 29.8% |
| 3 | 2.8 | 4 | 4 | 0 | 3 | 8 | 0 | 900 | 52% | 40% | 24.8% |
| 3 | 2.8 | 5 | 6 | 0 | 2 | 10 | 0 | 880 | 32% | 32% | 28.8% |
| 3 | 3 | 0 | 10 | 0 | 1 | 12 | 0 | 860 | 57% | 29% | 29.0% |
| 3 | 3 | 3 | 8 | 0 | 1 | 12 | 0 | 860 | 51% | 27% | 30.0% |
| 3 | 3 | 5 | 2 | 0 | 4 | 8 | 0 | 880 | 58% | 37% | 25.0% |
| 3 | 3 | 6 | 4 | 0 | 4 | 10 | 0 | 840 | 31% | 21% | 30.0% |
| 3.5 | 0.5 | 0 | 0 | 0 | 10 | 12 | 0 | 900 | 49% | 35% | 26.0% |
| 4 | 0 | 0 | 0 | 6 | 0 | 14 | 0 | 800 | 54% | 14% | 24.0% |
| 4 | 0 | 0 | 0 | 7 | 0 | 17 | 0 | 750 | 54% | 5% | 28.0% |
| 4 | 0 | 0 | 0 | 9 | 0 | 14 | 0 | 800 | 53% | 14% | 27.0% |
| 4 | 0 | 0 | 0 | 12 | 0 | 10 | 2 | 900 | 52% | 28% | 26.0% |
| 4 | 1 | 0 | 0 | 9 | 0 | 13 | 3 | 700 | 38% | 15% | 27.0% |
| 5 | 1 | 0 | 0 | 6 | 0 | 12 | 2 | 650 | 47% | 16% | 24.0% |
| 5 | 2 | 0 | 0 | 6 | 0 | 13 | 2 | 550 | 34% | 0% | 26.0% |
| 2 | 2 | 0 | 0 | 6 | 0 | 10 | 2 | 900 | 39% | 49% | 20.0% |
| 3 | 1 | 0 | 0 | 7 | 0 | 12 | 3 | 850 | 35% | 25% | 23.0% |
| 4 | 0 | 0 | 0 | 8 | 0 | 14 | 0 | 900 | 52% | 24% | 26.0% |
| 4 | 2 | 0 | 0 | 6 | 0 | 12 | 3 | 550 | 30% | 0% | 24.0% |
| 5 | 2 | 0 | 0 | 7 | 0 | 10 | 0 | 500 | 32% | 21% | 24.0% |
| 1 | 3 | 0 | 0 | 7 | 0 | 13 | 0 | 850 | 35% | 47% | 24.0% |
| 2 | 2 | 0 | 0 | 7 | 0 | 11 | 0 | 900 | 43% | 40% | 22.0% |
| 3 | 1 | 0 | 0 | 11 | 0 | 10 | 0 | 900 | 39% | 28% | 25.0% |
| 5 | 2 | 0 | 0 | 7 | 0 | 10 | 0 | 550 | 59% | 0% | 24.0% |
| 2.4 | 3 | 3 | 10 | 0 | 0 | 12 | 0 | 860 | 31% | 30% | 30.4% |
| 2.6 | 1.4 | 3 | 12 | 0 | 0 | 12 | 0 | 860 | 35% | 30% | 31.0% |
| 2.6 | 2.4 | 2 | 12 | 0 | 0 | 12 | 0 | 860 | 34% | 29% | 31.0% |
| 2.2 | 1.8 | 2 | 0 | 0 | 3 | 12 | 0 | 840 | 33% | 30% | 33.0% |
| 2.6 | 3 | 0 | 12 | 0 | 0 | 12 | 0 | 860 | 33% | 29% | 29.6% |
| 2.2 | 2.4 | 2 | 12 | 0 | 3 | 12 | 0 | 840 | 33% | 29% | 33.6% |
| 2 | 0.6 | 3 | 6 | 0 | 4 | 12 | 0 | 840 | 31% | 29% | 27.6% |
| 2 | 0.8 | 2 | 6 | 0 | 4 | 12 | 0 | 840 | 33% | 28% | 26.8% |
| 2.8 | 0.6 | 3 | 12 | 0 | 0 | 12 | 0 | 860 | 38% | 30% | 30.4% |
| 2 | 1 | 4 | 6 | 0 | 4 | 12 | 0 | 840 | 32% | 27% | 29.0% |
| 2 | 1.2 | 2 | 6 | 0 | 4 | 12 | 0 | 840 | 33% | 27% | 27.2% |
| 2.8 | 1 | 3 | 12 | 0 | 0 | 12 | 0 | 860 | 38% | 29% | 30.8% |
| 2 | 1.4 | 6 | 6 | 0 | 4 | 12 | 0 | 840 | 33% | 26% | 31.4% |
| 2.8 | 1.4 | 2 | 12 | 0 | 0 | 12 | 0 | 860 | 37% | 29% | 30.2% |
| 2 | 2 | 5 | 4 | 0 | 4 | 12 | 0 | 840 | 37% | 28% | 29.0% |
| 2.8 | 2 | 1 | 2 | 0 | 0 | 12 | 0 | 860 | 73% | 28% | 19.8% |
| 2.8 | 2.2 | 2 | 12 | 0 | 0 | 12 | 0 | 860 | 40% | 30% | 29.0% |
| 2.8 | 2.4 | 0 | 2 | 0 | 0 | 12 | 0 | 860 | 74% | 27% | 19.2% |
| 2.8 | 2.4 | 3 | 2 | 0 | 0 | 12 | 0 | 860 | 57% | 29% | 22.2% |
| 2.8 | 2.6 | 1 | 12 | 0 | 0 | 12 | 0 | 860 | 36% | 28% | 30.4% |
| 2.8 | 2.8 | 0 | 2 | 0 | 0 | 12 | 0 | 860 | 82% | 27% | 19.6% |
| 2.4 | 1.6 | 2 | 12 | 0 | 3 | 12 | 0 | 840 | 36% | 29% | 33.0% |
| 2.8 | 3 | 2 | 4 | 0 | 0 | 12 | 0 | 860 | 76% | 30% | 23.8% |
| 2.2 | 0.4 | 3 | 6 | 0 | 4 | 12 | 0 | 860 | 32% | 30% | 27.6% |
| 2.2 | 0.6 | 0 | 8 | 0 | 4 | 12 | 0 | 840 | 36% | 27% | 26.8% |
| 2.2 | 0.6 | 2 | 10 | 0 | 4 | 12 | 0 | 840 | 35% | 26% | 30.8% |
| 2.4 | 2.4 | 1 | 12 | 0 | 2 | 12 | 0 | 860 | 34% | 29% | 31.8% |
| 2.2 | 0.8 | 2 | 8 | 0 | 4 | 12 | 0 | 840 | 35% | 25% | 29.0% |
| 2.2 | 0.8 | 5 | 6 | 0 | 4 | 12 | 0 | 840 | 34% | 25% | 30.0% |
| 2.4 | 2.4 | 2 | 12 | 0 | 3 | 12 | 0 | 840 | 35% | 27% | 33.8% |
| 2.2 | 1 | 2 | 10 | 0 | 4 | 12 | 0 | 840 | 35% | 25% | 31.2% |
| 2.2 | 2.6 | 3 | 12 | 0 | 1 | 12 | 0 | 840 | 30% | 29% | 32.8% |
| 2.2 | 1.2 | 0 | 12 | 0 | 4 | 12 | 0 | 840 | 35% | 26% | 31.4% |
| 2.2 | 1.2 | 2 | 8 | 0 | 4 | 12 | 0 | 840 | 35% | 25% | 29.4% |
| 2.4 | 2.8 | 3 | 10 | 0 | 2 | 12 | 0 | 860 | 33% | 28% | 32.2% |
| 2.2 | 1.4 | 0 | 8 | 0 | 4 | 12 | 0 | 840 | 32% | 25% | 27.6% |
| 3 | 1 | 1 | 12 | 0 | 0 | 12 | 0 | 860 | 41% | 29% | 29.0% |
| 2.2 | 1.4 | 3 | 6 | 0 | 4 | 12 | 0 | 840 | 35% | 24% | 28.6% |
| 2.4 | 3 | 3 | 12 | 0 | 2 | 12 | 0 | 840 | 33% | 26% | 34.4% |
| 2.4 | 3 | 1 | 2 | 0 | 3 | 12 | 0 | 860 | 79% | 29% | 23.4% |
| 2.2 | 1.6 | 3 | 6 | 0 | 4 | 12 | 0 | 840 | 33% | 24% | 28.8% |
| 2.4 | 3 | 3 | 12 | 0 | 3 | 12 | 0 | 840 | 34% | 25% | 35.4% |
| 3 | 1.4 | 1 | 12 | 0 | 0 | 12 | 0 | 860 | 40% | 29% | 29.4% |
| 2.2 | 1.8 | 5 | 6 | 0 | 4 | 12 | 0 | 840 | 34% | 23% | 31.0% |
| 3 | 1.6 | 2 | 2 | 0 | 0 | 12 | 0 | 860 | 50% | 27% | 20.6% |
| 2.2 | 2.2 | 1 | 2 | 0 | 4 | 12 | 0 | 860 | 75% | 29% | 23.4% |
| 2.6 | 0.4 | 3 | 12 | 0 | 3 | 12 | 0 | 860 | 40% | 29% | 33.0% |
| 2.2 | 2.4 | 2 | 2 | 0 | 4 | 12 | 0 | 860 | 79% | 28% | 24.6% |
| 3 | 2 | 4 | 2 | 0 | 0 | 12 | 0 | 860 | 47% | 28% | 23.0% |
| 3 | 2.2 | 0 | 12 | 0 | 0 | 12 | 0 | 860 | 46% | 28% | 29.2% |

TABLE 17-continued

Example Compositions and Thermodynamic Criteria

| B | C | Cr | Mn | Mo | Nb | Ni | Si | 1 | 2 | 3 | 4 |
|---|---|---|---|---|---|---|---|---|---|---|---|
| 2.6 | 0.8 | 2 | 12 | 0 | 3 | 12 | 0 | 860 | 39% | 29% | 32.4% |
| 2.2 | 2.6 | 6 | 6 | 0 | 4 | 10 | 0 | 840 | 33% | 28% | 30.8% |
| 3 | 2.4 | 3 | 4 | 0 | 0 | 12 | 0 | 860 | 52% | 29% | 24.4% |
| 3 | 2.4 | 6 | 2 | 0 | 0 | 12 | 0 | 860 | 74% | 30% | 25.4% |
| 3 | 2.6 | 1 | 12 | 0 | 0 | 12 | 0 | 860 | 38% | 26% | 30.6% |
| 2.2 | 3 | 6 | 4 | 0 | 4 | 12 | 0 | 840 | 44% | 24% | 31.2% |
| 3 | 2.8 | 0 | 12 | 0 | 0 | 12 | 0 | 860 | 45% | 27% | 29.8% |
| 2.6 | 1.4 | 0 | 2 | 0 | 3 | 12 | 0 | 860 | 60% | 29% | 21.0% |
| 2.6 | 1.4 | 2 | 12 | 0 | 3 | 12 | 0 | 840 | 39% | 28% | 33.0% |
| 3 | 3 | 1 | 12 | 0 | 0 | 12 | 0 | 860 | 38% | 26% | 31.0% |
| 0 | 3 | 0 | 0 | 8 | 0 | 19 | 0 | 750 | 30% | 39% | 30.0% |
| 0 | 3 | 5 | 6 | 0 | 1 | 12 | 0 | 860 | 35% | 43% | 27.0% |
| 0 | 3.2 | 10 | 0 | 0 | 0 | 16 | 0 | 750 | 34% | 47% | 29.2% |
| 0 | 3.8 | 11 | 0 | 0 | 0 | 12 | 0 | 800 | 41% | 47% | 26.8% |
| 0.2 | 2.8 | 2 | 10 | 0 | 2 | 8 | 0 | 860 | 30% | 48% | 25.0% |
| 0.2 | 2.8 | 6 | 6 | 0 | 1 | 12 | 0 | 860 | 31% | 41% | 28.0% |
| 0.2 | 3 | 5 | 2 | 0 | 1 | 12 | 0 | 880 | 41% | 49% | 23.2% |
| 0.4 | 2.4 | 6 | 2 | 0 | 1 | 12 | 0 | 880 | 32% | 48% | 23.8% |
| 0.4 | 2.6 | 4 | 4 | 0 | 4 | 12 | 0 | 860 | 30% | 45% | 27.0% |
| 0.4 | 2.6 | 5 | 6 | 0 | 0 | 10 | 0 | 860 | 36% | 48% | 24.0% |
| 0.4 | 2.6 | 6 | 8 | 0 | 0 | 8 | 0 | 860 | 34% | 48% | 25.0% |
| 0.4 | 2.8 | 3 | 6 | 0 | 4 | 12 | 0 | 860 | 31% | 42% | 28.2% |
| 0.4 | 2.8 | 4 | 6 | 0 | 4 | 12 | 0 | 840 | 34% | 41% | 29.2% |
| 0.4 | 2.8 | 5 | 6 | 0 | 2 | 10 | 0 | 860 | 37% | 47% | 26.2% |
| 0.4 | 2.8 | 6 | 4 | 0 | 4 | 12 | 0 | 860 | 32% | 42% | 29.2% |
| 0.4 | 3 | 2 | 10 | 0 | 2 | 10 | 0 | 840 | 38% | 42% | 27.4% |
| 0.4 | 3 | 3 | 12 | 0 | 1 | 10 | 0 | 840 | 40% | 38% | 29.4% |
| 0.4 | 3 | 4 | 10 | 0 | 4 | 8 | 0 | 860 | 36% | 43% | 29.4% |
| 0.4 | 3 | 5 | 10 | 0 | 2 | 8 | 0 | 840 | 39% | 43% | 28.4% |
| 0.4 | 3 | 6 | 10 | 0 | 0 | 8 | 0 | 840 | 42% | 43% | 27.4% |
| 0.6 | 2.2 | 4 | 4 | 0 | 0 | 12 | 0 | 860 | 32% | 48% | 22.8% |
| 0.6 | 2.4 | 5 | 8 | 0 | 0 | 10 | 0 | 860 | 34% | 44% | 26.0% |
| 0.6 | 2.6 | 4 | 6 | 0 | 4 | 12 | 0 | 840 | 33% | 39% | 29.2% |
| 0.6 | 2.8 | 2 | 12 | 0 | 0 | 8 | 0 | 860 | 39% | 45% | 25.4% |
| 0.6 | 2.8 | 5 | 12 | 0 | 0 | 6 | 0 | 860 | 40% | 46% | 26.4% |
| 0.6 | 3 | 4 | 6 | 0 | 0 | 12 | 0 | 860 | 42% | 43% | 25.6% |
| 0.6 | 3 | 6 | 12 | 0 | 0 | 8 | 0 | 840 | 45% | 39% | 29.6% |
| 1 | 2 | 0 | 0 | 8 | 0 | 16 | 3 | 800 | 42% | 50% | 27.0% |
| 1 | 3 | 0 | 0 | 0 | 5 | 14 | 0 | 850 | 54% | 40% | 23.0% |
| 1 | 4.5 | 0 | 0 | 0 | 0 | 14 | 0 | 850 | 47% | 41% | 19.5% |
| 1.5 | 2 | 0 | 0 | 0 | 5 | 14 | 0 | 850 | 51% | 36% | 22.5% |
| 2 | 1 | 0 | 0 | 12 | 0 | 13 | 2 | 850 | 38% | 49% | 28.0% |
| 2.4 | 0.4 | 0 | 10 | 0 | 4 | 10 | 0 | 880 | 38% | 35% | 26.8% |
| 2.4 | 0.6 | 0 | 4 | 0 | 4 | 10 | 0 | 860 | 38% | 33% | 21.0% |
| 2.4 | 0.6 | 5 | 6 | 0 | 4 | 10 | 0 | 860 | 34% | 31% | 28.0% |
| 2.4 | 0.8 | 4 | 6 | 0 | 4 | 12 | 0 | 840 | 36% | 23% | 29.2% |
| 2.4 | 1 | 4 | 2 | 0 | 4 | 12 | 0 | 840 | 38% | 28% | 25.4% |
| 2.4 | 1.2 | 3 | 4 | 0 | 4 | 12 | 0 | 840 | 38% | 26% | 26.6% |
| 2.4 | 1.4 | 1 | 4 | 0 | 4 | 10 | 0 | 860 | 36% | 31% | 22.8% |
| 2.4 | 1.4 | 3 | 6 | 0 | 4 | 12 | 0 | 840 | 37% | 22% | 28.8% |
| 2.4 | 1.6 | 1 | 2 | 0 | 4 | 12 | 0 | 840 | 56% | 27% | 23.0% |
| 2.4 | 1.6 | 3 | 2 | 0 | 1 | 8 | 0 | 900 | 34% | 49% | 18.0% |
| 2.4 | 1.8 | 1 | 6 | 0 | 4 | 10 | 0 | 840 | 30% | 29% | 25.2% |
| 2.4 | 1.8 | 4 | 2 | 0 | 1 | 8 | 0 | 900 | 34% | 50% | 19.2% |
| 2.4 | 2 | 2 | 8 | 0 | 1 | 10 | 0 | 880 | 54% | 40% | 25.4% |
| 2.4 | 2.2 | 0 | 12 | 0 | 1 | 10 | 0 | 880 | 34% | 37% | 27.6% |
| 2.4 | 2.2 | 5 | 2 | 0 | 4 | 10 | 0 | 860 | 35% | 32% | 25.6% |
| 2.4 | 2.4 | 3 | 12 | 0 | 1 | 6 | 0 | 900 | 59% | 44% | 26.8% |
| 2.4 | 2.6 | 2 | 8 | 0 | 1 | 12 | 0 | 860 | 42% | 32% | 28.0% |
| 2.4 | 2.6 | 6 | 4 | 0 | 1 | 10 | 0 | 880 | 39% | 38% | 26.0% |
| 2.4 | 2.8 | 4 | 6 | 0 | 1 | 8 | 0 | 900 | 44% | 44% | 24.2% |
| 2.4 | 3 | 2 | 8 | 0 | 1 | 10 | 0 | 880 | 52% | 38% | 26.4% |
| 2.4 | 3 | 6 | 10 | 0 | 1 | 6 | 0 | 880 | 41% | 42% | 28.4% |
| 2.5 | 2 | 0 | 0 | 0 | 15 | 8 | 0 | 900 | 51% | 33% | 27.5% |
| 2.6 | 0.2 | 0 | 2 | 0 | 1 | 10 | 0 | 900 | 37% | 41% | 15.8% |
| 2.6 | 0.2 | 2 | 4 | 0 | 4 | 12 | 0 | 880 | 39% | 34% | 24.8% |
| 2.6 | 0.4 | 0 | 4 | 0 | 1 | 10 | 0 | 900 | 43% | 42% | 18.0% |
| 2.6 | 0.4 | 2 | 4 | 0 | 1 | 10 | 0 | 900 | 37% | 44% | 20.0% |
| 2.6 | 0.4 | 6 | 2 | 0 | 1 | 10 | 0 | 900 | 37% | 45% | 22.0% |
| 2.6 | 0.6 | 1 | 10 | 0 | 1 | 8 | 0 | 900 | 37% | 47% | 23.2% |
| 2.6 | 0.6 | 5 | 2 | 0 | 1 | 12 | 0 | 880 | 37% | 36% | 23.2% |
| 2.6 | 0.8 | 1 | 6 | 0 | 1 | 10 | 0 | 880 | 42% | 44% | 21.4% |
| 2.6 | 0.8 | 3 | 12 | 0 | 1 | 6 | 0 | 900 | 37% | 47% | 25.4% |
| 2.6 | 1 | 1 | 2 | 0 | 1 | 8 | 0 | 900 | 54% | 46% | 15.6% |
| 2.6 | 1 | 2 | 12 | 0 | 1 | 6 | 0 | 900 | 36% | 48% | 24.6% |
| 2.6 | 1.2 | 0 | 8 | 0 | 4 | 10 | 0 | 840 | 40% | 28% | 25.8% |
| 2.6 | 1.2 | 2 | 6 | 0 | 4 | 12 | 0 | 820 | 40% | 20% | 27.8% |
| 2.6 | 1.2 | 6 | 2 | 0 | 4 | 10 | 0 | 860 | 40% | 31% | 25.8% |
| 2.6 | 1.4 | 1 | 4 | 0 | 1 | 8 | 0 | 880 | 55% | 48% | 18.0% |
| 2.6 | 1.4 | 2 | 6 | 0 | 4 | 10 | 0 | 840 | 39% | 27% | 26.0% |
| 2.6 | 1.4 | 3 | 12 | 0 | 3 | 8 | 0 | 880 | 40% | 39% | 30.0% |
| 2.6 | 1.6 | 0 | 8 | 0 | 3 | 8 | 0 | 900 | 52% | 48% | 23.2% |
| 2.6 | 1.6 | 1 | 8 | 0 | 1 | 12 | 0 | 880 | 53% | 35% | 26.2% |
| 2.6 | 1.6 | 2 | 6 | 0 | 1 | 10 | 0 | 880 | 53% | 43% | 23.2% |
| 2.6 | 1.6 | 3 | 4 | 0 | 4 | 12 | 0 | 840 | 36% | 23% | 27.2% |
| 2.6 | 1.8 | 0 | 6 | 0 | 2 | 12 | 0 | 860 | 59% | 33% | 24.4% |
| 2.6 | 1.8 | 1 | 6 | 0 | 4 | 10 | 0 | 840 | 32% | 26% | 25.4% |
| 2.6 | 1.8 | 2 | 4 | 0 | 2 | 12 | 0 | 860 | 36% | 33% | 24.4% |
| 2.6 | 1.8 | 3 | 2 | 0 | 1 | 12 | 0 | 860 | 41% | 32% | 22.4% |
| 2.6 | 1.8 | 4 | 4 | 0 | 4 | 12 | 0 | 840 | 34% | 22% | 28.4% |
| 2.6 | 2 | 0 | 12 | 0 | 3 | 8 | 0 | 900 | 53% | 41% | 27.6% |
| 2.6 | 2 | 2 | 4 | 0 | 2 | 12 | 0 | 860 | 40% | 32% | 24.6% |
| 2.6 | 2 | 3 | 2 | 0 | 3 | 8 | 0 | 880 | 43% | 44% | 20.6% |
| 2.6 | 2 | 4 | 2 | 0 | 4 | 12 | 0 | 840 | 30% | 24% | 26.6% |
| 2.6 | 2.2 | 0 | 10 | 0 | 3 | 12 | 0 | 860 | 49% | 31% | 29.8% |
| 2.6 | 2.2 | 2 | 8 | 0 | 2 | 10 | 0 | 880 | 59% | 37% | 26.8% |
| 2.6 | 2.2 | 3 | 6 | 0 | 4 | 8 | 0 | 900 | 31% | 44% | 25.8% |
| 2.6 | 2.2 | 5 | 2 | 0 | 1 | 12 | 0 | 880 | 41% | 33% | 24.8% |
| 2.6 | 2.4 | 1 | 10 | 0 | 1 | 10 | 0 | 880 | 50% | 37% | 27.0% |
| 2.6 | 2.4 | 3 | 2 | 0 | 3 | 10 | 0 | 880 | 50% | 36% | 23.0% |
| 2.6 | 2.4 | 4 | 4 | 0 | 2 | 10 | 0 | 880 | 41% | 40% | 25.0% |
| 2.6 | 2.4 | 6 | 1.5 | 0 | 0 | 16.5 | 0 | 800 | 43% | 24% | 29.0% |
| 2.6 | 2.6 | 2 | 4 | 0 | 2 | 10 | 0 | 880 | 52% | 38% | 23.2% |
| 2.6 | 2.6 | 4 | 2 | 0 | 2 | 10 | 0 | 880 | 52% | 37% | 23.2% |
| 2.6 | 2.6 | 5 | 4 | 0 | 2 | 8 | 0 | 900 | 42% | 44% | 24.2% |
| 2.6 | 2.8 | 0 | 10 | 0 | 3 | 10 | 0 | 880 | 55% | 36% | 28.4% |
| 2.6 | 2.8 | 3 | 6 | 0 | 1 | 10 | 0 | 880 | 40% | 38% | 25.4% |
| 2.6 | 2.8 | 4 | 10 | 0 | 3 | 6 | 0 | 900 | 36% | 42% | 28.4% |
| 2.6 | 2.8 | 6 | 6 | 0 | 2 | 8 | 0 | 900 | 41% | 40% | 27.4% |
| 2.6 | 3 | 2 | 12 | 0 | 2 | 8 | 0 | 880 | 45% | 37% | 29.6% |
| 2.6 | 3 | 4 | 6 | 0 | 2 | 10 | 0 | 880 | 33% | 35% | 27.6% |
| 2.6 | 3 | 6 | 2 | 0 | 4 | 10 | 0 | 860 | 35% | 28% | 27.6% |
| 2.8 | 0 | 0 | 12 | 0 | 4 | 10 | 0 | 880 | 40% | 48% | 28.8% |
| 2.8 | 0 | 3 | 6 | 0 | 4 | 12 | 0 | 860 | 40% | 41% | 27.8% |
| 2.8 | 0.2 | 0 | 8 | 0 | 3 | 12 | 0 | 900 | 40% | 43% | 26.0% |
| 2.8 | 0.2 | 1 | 12 | 0 | 1 | 12 | 0 | 860 | 40% | 31% | 29.0% |
| 2.8 | 0.2 | 3 | 12 | 0 | 1 | 10 | 0 | 880 | 40% | 36% | 29.0% |
| 2.8 | 0.4 | 0 | 6 | 0 | 4 | 12 | 0 | 840 | 43% | 23% | 25.2% |
| 2.8 | 0.4 | 1 | 8 | 0 | 1 | 10 | 0 | 880 | 40% | 43% | 23.2% |
| 2.8 | 0.4 | 2 | 10 | 0 | 1 | 10 | 0 | 880 | 40% | 38% | 26.2% |
| 2.8 | 0.4 | 6 | 2 | 0 | 3 | 10 | 0 | 900 | 42% | 41% | 24.2% |
| 2.8 | 0.6 | 0 | 10 | 0 | 3 | 10 | 0 | 880 | 42% | 39% | 26.4% |
| 2.8 | 0.6 | 1 | 8 | 0 | 3 | 12 | 0 | 860 | 42% | 34% | 27.4% |
| 2.8 | 0.6 | 2 | 8 | 0 | 4 | 10 | 0 | 840 | 43% | 26% | 27.4% |
| 2.8 | 0.6 | 4 | 2 | 0 | 4 | 12 | 0 | 840 | 43% | 24% | 25.4% |
| 2.8 | 0.8 | 0 | 6 | 0 | 3 | 10 | 0 | 880 | 46% | 39% | 22.6% |
| 2.8 | 0.8 | 1 | 4 | 0 | 1 | 10 | 0 | 880 | 50% | 39% | 19.6% |
| 2.8 | 0.8 | 2 | 2 | 0 | 1 | 8 | 0 | 900 | 32% | 45% | 16.6% |
| 2.8 | 0.8 | 2 | 12 | 0 | 1 | 10 | 0 | 880 | 39% | 35% | 28.6% |
| 2.8 | 0.8 | 5 | 4 | 0 | 4 | 12 | 0 | 840 | 43% | 21% | 28.6% |
| 2.8 | 1 | 0 | 6 | 0 | 4 | 12 | 0 | 820 | 43% | 19% | 25.8% |
| 2.8 | 1 | 1 | 4 | 0 | 1 | 12 | 0 | 860 | 53% | 32% | 21.8% |
| 2.8 | 1 | 1 | 12 | 0 | 2 | 10 | 0 | 880 | 40% | 35% | 28.8% |
| 2.8 | 1 | 2 | 8 | 0 | 3 | 12 | 0 | 860 | 41% | 32% | 28.8% |
| 2.8 | 1 | 3 | 12 | 0 | 1 | 8 | 0 | 880 | 39% | 40% | 27.8% |
| 2.8 | 1.2 | 0 | 6 | 0 | 1 | 8 | 0 | 900 | 54% | 47% | 19.0% |
| 2.8 | 1.2 | 1 | 2 | 0 | 1 | 12 | 0 | 860 | 60% | 29% | 20.0% |
| 2.8 | 1.2 | 1 | 10 | 0 | 1 | 12 | 0 | 860 | 47% | 32% | 28.0% |
| 2.8 | 1.2 | 2 | 6 | 0 | 3 | 10 | 0 | 880 | 48% | 40% | 25.0% |
| 2.8 | 1.2 | 3 | 8 | 0 | 1 | 10 | 0 | 880 | 46% | 38% | 26.0% |
| 2.8 | 1.2 | 6 | 2 | 0 | 4 | 12 | 0 | 840 | 43% | 22% | 28.0% |
| 2.8 | 1.4 | 0 | 12 | 0 | 1 | 10 | 0 | 880 | 49% | 36% | 27.2% |
| 2.8 | 1.4 | 1 | 10 | 0 | 2 | 8 | 0 | 900 | 48% | 43% | 25.2% |
| 2.8 | 1.4 | 2 | 6 | 0 | 4 | 12 | 0 | 820 | 40% | 18% | 28.2% |
| 2.8 | 1.4 | 3 | 8 | 0 | 2 | 10 | 0 | 880 | 48% | 37% | 27.2% |
| 2.8 | 1.6 | 0 | 6 | 0 | 3 | 8 | 0 | 880 | 59% | 45% | 21.4% |
| 2.8 | 1.6 | 1 | 6 | 0 | 1 | 12 | 0 | 860 | 57% | 31% | 26.4% |
| 2.8 | 1.6 | 2 | 4 | 0 | 3 | 12 | 0 | 860 | 58% | 29% | 25.4% |
| 2.8 | 1.6 | 3 | 2 | 0 | 2 | 12 | 0 | 860 | 38% | 29% | 23.4% |
| 2.8 | 1.6 | 4 | 4 | 0 | 4 | 12 | 0 | 840 | 39% | 20% | 28.4% |
| 2.8 | 1.8 | 0 | 12 | 0 | 3 | 8 | 0 | 900 | 54% | 40% | 27.6% |
| 2.8 | 1.8 | 2 | 4 | 0 | 4 | 12 | 0 | 840 | 34% | 20% | 26.6% |

TABLE 17-continued

Example Compositions and Thermodynamic Criteria

| B | C | Cr | Mn | Mo | Nb | Ni | Si | 1 | 2 | 3 | 4 |
|---|---|---|---|---|---|---|---|---|---|---|---|
| 2.8 | 1.8 | 3 | 2 | 0 | 4 | 10 | 0 | 860 | 35% | 28% | 23.6% |
| 2.8 | 1.8 | 4 | 2 | 0 | 4 | 8 | 0 | 880 | 34% | 41% | 22.6% |
| 2.8 | 2 | 0 | 12 | 0 | 3 | 8 | 0 | 900 | 57% | 40% | 27.8% |
| 2.8 | 2 | 2 | 12 | 0 | 1 | 8 | 0 | 880 | 52% | 39% | 27.8% |
| 2.8 | 2 | 3 | 8 | 0 | 1 | 12 | 0 | 860 | 48% | 30% | 28.8% |
| 2.8 | 2 | 4 | 6 | 0 | 1 | 10 | 0 | 880 | 31% | 37% | 25.8% |
| 2.8 | 2.2 | 1 | 12 | 0 | 2 | 8 | 0 | 900 | 54% | 39% | 28.0% |
| 2.8 | 2.2 | 3 | 6 | 0 | 2 | 12 | 0 | 860 | 33% | 32% | 28.0% |
| 2.8 | 2.2 | 4 | 6 | 0 | 1 | 10 | 0 | 880 | 35% | 37% | 26.0% |
| 2.8 | 2.4 | 0 | 10 | 0 | 1 | 12 | 0 | 860 | 54% | 31% | 28.2% |
| 2.8 | 2.4 | 3 | 6 | 0 | 4 | 8 | 0 | 900 | 37% | 42% | 26.2% |
| 2.8 | 2.4 | 5 | 2 | 0 | 1 | 12 | 0 | 860 | 47% | 30% | 25.2% |
| 2.8 | 2.4 | 6 | 8 | 0 | 1 | 6 | 0 | 900 | 32% | 44% | 26.2% |
| 2.8 | 2.6 | 3 | 6 | 0 | 2 | 10 | 0 | 880 | 43% | 37% | 26.4% |
| 2.8 | 2.6 | 4 | 10 | 0 | 4 | 6 | 0 | 900 | 32% | 41% | 29.4% |
| 2.8 | 2.6 | 6 | 4 | 0 | 2 | 8 | 0 | 900 | 42% | 42% | 25.4% |
| 2.8 | 2.8 | 3 | 4 | 0 | 1 | 12 | 0 | 860 | 49% | 30% | 25.6% |
| 2.8 | 2.8 | 4 | 6 | 0 | 2 | 8 | 0 | 900 | 46% | 41% | 25.6% |
| 2.8 | 2.8 | 5 | 12 | 0 | 1 | 6 | 0 | 900 | 38% | 39% | 29.6% |
| 2.8 | 3 | 1 | 12 | 0 | 2 | 8 | 0 | 900 | 52% | 37% | 28.8% |
| 2.8 | 3 | 4 | 4 | 0 | 3 | 12 | 0 | 860 | 40% | 29% | 28.8% |
| 2.8 | 3 | 5 | 12 | 0 | 1 | 4 | 0 | 900 | 41% | 44% | 27.8% |
| 3 | 0 | 0 | 0 | 6 | 0 | 10 | 0 | 900 | 41% | 39% | 19.0% |
| 3 | 0 | 0 | 0 | 7 | 0 | 12 | 3 | 900 | 40% | 37% | 22.0% |
| 3 | 0 | 0 | 0 | 8 | 0 | 15 | 3 | 850 | 40% | 27% | 26.0% |
| 3 | 0 | 0 | 0 | 10 | 0 | 12 | 3 | 900 | 39% | 37% | 25.0% |
| 3 | 0 | 0 | 0 | 12 | 0 | 13 | 1 | 850 | 40% | 30% | 28.0% |
| 3 | 0 | 1 | 6 | 0 | 3 | 12 | 0 | 900 | 40% | 47% | 25.0% |
| 3 | 0 | 4 | 4 | 0 | 4 | 12 | 0 | 880 | 42% | 38% | 27.0% |
| 3 | 0.2 | 0 | 10 | 0 | 4 | 12 | 0 | 880 | 44% | 30% | 29.2% |
| 3 | 0.2 | 2 | 4 | 0 | 3 | 12 | 0 | 900 | 43% | 37% | 24.2% |
| 3 | 0.2 | 5 | 2 | 0 | 4 | 12 | 0 | 900 | 44% | 33% | 26.2% |
| 3 | 0.4 | 0 | 10 | 0 | 2 | 10 | 0 | 880 | 43% | 40% | 25.4% |
| 3 | 0.4 | 1 | 10 | 0 | 1 | 10 | 0 | 880 | 42% | 39% | 25.4% |
| 3 | 0.4 | 2 | 12 | 0 | 1 | 10 | 0 | 880 | 42% | 35% | 28.4% |
| 3 | 0.4 | 6 | 4 | 0 | 4 | 10 | 0 | 860 | 45% | 28% | 27.4% |
| 3 | 0.6 | 0 | 8 | 0 | 2 | 12 | 0 | 860 | 43% | 33% | 25.6% |
| 3 | 0.6 | 1 | 6 | 0 | 3 | 10 | 0 | 900 | 45% | 38% | 23.6% |
| 3 | 0.6 | 2 | 6 | 0 | 3 | 12 | 0 | 860 | 44% | 31% | 26.6% |
| 3 | 0.6 | 3 | 10 | 0 | 2 | 8 | 0 | 900 | 43% | 41% | 26.6% |
| 3 | 0.8 | 0 | 4 | 0 | 1 | 10 | 0 | 880 | 56% | 36% | 18.8% |
| 3 | 0.8 | 0 | 12 | 0 | 3 | 10 | 0 | 880 | 44% | 35% | 28.8% |
| 3 | 0.8 | 1 | 10 | 0 | 1 | 10 | 0 | 880 | 42% | 38% | 25.8% |
| 3 | 0.8 | 2 | 6 | 0 | 3 | 10 | 0 | 880 | 45% | 38% | 24.8% |
| 3 | 0.8 | 3 | 8 | 0 | 3 | 12 | 0 | 860 | 44% | 29% | 29.8% |
| 3 | 1 | 0 | 0 | 0 | 10 | 8 | 0 | 900 | 50% | 40% | 22.0% |
| 3 | 1 | 0 | 8 | 0 | 1 | 10 | 0 | 880 | 51% | 40% | 23.0% |
| 3 | 1 | 1 | 4 | 0 | 3 | 8 | 0 | 900 | 55% | 42% | 20.0% |
| 3 | 1 | 2 | 2 | 0 | 1 | 8 | 0 | 900 | 38% | 42% | 17.0% |
| 3 | 1 | 2 | 10 | 0 | 1 | 8 | 0 | 900 | 45% | 42% | 25.0% |
| 3 | 1 | 3 | 12 | 0 | 1 | 10 | 0 | 860 | 41% | 33% | 30.0% |
| 3 | 1.2 | 0 | 6 | 0 | 3 | 12 | 0 | 860 | 56% | 29% | 25.2% |
| 3 | 1.2 | 1 | 4 | 0 | 4 | 10 | 0 | 840 | 44% | 25% | 23.2% |
| 3 | 1.2 | 2 | 2 | 0 | 3 | 8 | 0 | 880 | 39% | 39% | 19.2% |
| 3 | 1.2 | 2 | 10 | 0 | 4 | 8 | 0 | 900 | 45% | 39% | 28.2% |
| 3 | 1.2 | 4 | 6 | 0 | 4 | 10 | 0 | 840 | 41% | 22% | 28.2% |
| 3 | 1.4 | 0 | 10 | 0 | 2 | 12 | 0 | 860 | 54% | 31% | 28.4% |
| 3 | 1.4 | 1 | 10 | 0 | 2 | 12 | 0 | 860 | 53% | 29% | 29.4% |
| 3 | 1.4 | 2 | 8 | 0 | 2 | 10 | 0 | 880 | 53% | 37% | 26.4% |
| 3 | 1.4 | 3 | 10 | 0 | 1 | 10 | 0 | 880 | 51% | 34% | 28.4% |
| 3 | 1.6 | 0 | 6 | 0 | 4 | 10 | 0 | 840 | 37% | 22% | 24.6% |
| 3 | 1.6 | 1 | 10 | 0 | 1 | 10 | 0 | 880 | 57% | 36% | 26.6% |
| 3 | 1.6 | 2 | 10 | 0 | 1 | 10 | 0 | 880 | 56% | 35% | 27.6% |
| 3 | 1.6 | 3 | 10 | 0 | 1 | 10 | 0 | 880 | 51% | 33% | 28.6% |
| 3 | 1.6 | 6 | 2 | 0 | 4 | 10 | 0 | 860 | 43% | 26% | 26.6% |
| 3 | 1.8 | 2 | 2 | 0 | 4 | 6 | 0 | 900 | 50% | 44% | 18.8% |
| 3 | 1.8 | 3 | 4 | 0 | 3 | 8 | 0 | 880 | 35% | 41% | 22.8% |
| 3 | 1.8 | 4 | 4 | 0 | 1 | 10 | 0 | 880 | 34% | 37% | 23.8% |
| 3 | 2 | 0 | 4 | 0 | 4 | 10 | 0 | 840 | 30% | 23% | 23.0% |
| 3 | 2 | 3 | 2 | 0 | 3 | 10 | 0 | 880 | 48% | 31% | 23.0% |
| 3 | 2 | 4 | 2 | 0 | 2 | 6 | 0 | 900 | 45% | 47% | 19.0% |
| 3 | 2 | 5 | 4 | 0 | 1 | 10 | 0 | 880 | 35% | 38% | 25.0% |
| 3 | 2.2 | 3 | 2 | 0 | 4 | 8 | 0 | 880 | 51% | 37% | 22.2% |
| 3 | 2.2 | 4 | 4 | 0 | 2 | 6 | 0 | 900 | 42% | 49% | 21.2% |
| 3 | 2.2 | 5 | 4 | 0 | 4 | 10 | 0 | 840 | 36% | 22% | 28.2% |
| 3 | 2.4 | 3 | 4 | 0 | 2 | 12 | 0 | 860 | 49% | 27% | 26.4% |
| 3 | 2.4 | 4 | 6 | 0 | 1 | 8 | 0 | 900 | 41% | 42% | 24.4% |
| 3 | 2.4 | 5 | 8 | 0 | 1 | 8 | 0 | 900 | 35% | 38% | 27.4% |
| 3 | 2.6 | 3 | 4 | 0 | 3 | 8 | 0 | 880 | 52% | 40% | 23.6% |
| 3 | 2.6 | 4 | 8 | 0 | 2 | 8 | 0 | 900 | 39% | 38% | 27.6% |
| 3 | 2.6 | 6 | 2 | 0 | 4 | 8 | 0 | 900 | 46% | 39% | 25.6% |
| 3 | 2.8 | 3 | 4 | 0 | 2 | 12 | 0 | 860 | 52% | 27% | 26.8% |
| 3 | 2.8 | 4 | 8 | 0 | 2 | 8 | 0 | 900 | 38% | 37% | 27.8% |
| 3 | 2.8 | 6 | 2 | 0 | 1 | 8 | 0 | 900 | 55% | 41% | 22.8% |
| 3 | 3 | 1 | 12 | 0 | 3 | 8 | 0 | 880 | 57% | 35% | 30.0% |
| 3 | 3 | 4 | 4 | 0 | 2 | 8 | 0 | 900 | 58% | 41% | 24.0% |
| 3 | 3 | 5 | 6 | 0 | 0 | 10 | 0 | 880 | 32% | 34% | 27.0% |
| 3 | 3 | 6 | 12 | 0 | 0 | 6 | 0 | 880 | 43% | 37% | 30.0% |
| 4 | 0 | 0 | 0 | 0 | 0 | 12 | 0 | 850 | 53% | 21% | 16.0% |
| 4 | 0 | 0 | 0 | 6 | 0 | 17 | 3 | 800 | 52% | 10% | 27.0% |
| 4 | 0 | 0 | 0 | 8 | 0 | 12 | 3 | 900 | 52% | 25% | 24.0% |
| 4 | 0 | 0 | 0 | 10 | 0 | 11 | 2 | 850 | 52% | 25% | 25.0% |
| 4 | 0.5 | 0 | 0 | 0 | 5 | 18 | 0 | 750 | 58% | 0% | 27.5% |
| 4 | 2 | 0 | 0 | 0 | 11 | 10 | 2 | 650 | 33% | 34% | 27.0% |
| 5 | 1 | 0 | 0 | 7 | 0 | 14 | 2 | 650 | 46% | 15% | 27.0% |
| 5 | 2 | 0 | 0 | 8 | 0 | 11 | 1 | 600 | 53% | 6% | 26.0% |
| 3 | 0 | 0 | 0 | 6 | 0 | 15 | 1 | 900 | 40% | 33% | 24.0% |
| 3 | 2 | 0 | 0 | 6 | 0 | 11 | 1 | 800 | 46% | 38% | 22.0% |
| 4 | 1 | 0 | 0 | 6 | 0 | 13 | 2 | 800 | 39% | 14% | 24.0% |
| 5 | 1 | 0 | 0 | 6 | 0 | 11 | 2 | 700 | 55% | 2% | 23.0% |
| 0 | 4 | 0 | 0 | 6 | 0 | 12 | 1 | 800 | 32% | 43% | 22.0% |
| 1 | 4 | 0 | 0 | 6 | 0 | 11 | 1 | 650 | 42% | 39% | 22.0% |
| 2 | 3 | 0 | 0 | 9 | 0 | 10 | 0 | 800 | 39% | 37% | 24.0% |
| 4 | 1 | 0 | 0 | 7 | 0 | 11 | 1 | 900 | 53% | 19% | 23.0% |
| 2.4 | 2 | 3 | 12 | 0 | 0 | 12 | 0 | 840 | 32% | 30% | 31.4% |
| 1.8 | 1 | 2 | 8 | 0 | 4 | 12 | 0 | 840 | 30% | 30% | 28.8% |
| 1.8 | 2.2 | 6 | 4 | 0 | 4 | 12 | 0 | 840 | 44% | 30% | 30.0% |
| 2.2 | 1.6 | 3 | 12 | 0 | 3 | 12 | 0 | 840 | 34% | 29% | 33.8% |
| 2.2 | 2 | 3 | 12 | 0 | 2 | 12 | 0 | 840 | 32% | 29% | 33.2% |
| 2.2 | 2.2 | 3 | 12 | 0 | 2 | 12 | 0 | 840 | 32% | 29% | 33.4% |
| 2.2 | 2.4 | 3 | 12 | 0 | 3 | 12 | 0 | 840 | 33% | 28% | 34.6% |
| 2 | 0.8 | 0 | 6 | 0 | 4 | 12 | 0 | 840 | 33% | 28% | 24.8% |
| 2.2 | 2.8 | 2 | 12 | 0 | 2 | 12 | 0 | 840 | 31% | 29% | 33.0% |
| 2 | 1 | 1 | 12 | 0 | 4 | 12 | 0 | 840 | 33% | 28% | 32.0% |
| 2 | 1.2 | 0 | 6 | 0 | 4 | 12 | 0 | 840 | 33% | 28% | 25.2% |
| 2.2 | 3 | 2 | 12 | 0 | 3 | 12 | 0 | 840 | 32% | 28% | 34.2% |
| 2 | 1.4 | 2 | 8 | 0 | 4 | 12 | 0 | 840 | 32% | 27% | 29.4% |
| 2 | 1.6 | 3 | 4 | 0 | 4 | 12 | 0 | 840 | 30% | 30% | 26.6% |
| 2 | 1.8 | 5 | 6 | 0 | 4 | 12 | 0 | 840 | 32% | 25% | 30.8% |
| 2 | 2 | 6 | 6 | 0 | 4 | 12 | 0 | 840 | 32% | 24% | 32.0% |
| 2.8 | 2 | 2 | 2 | 0 | 0 | 12 | 0 | 860 | 55% | 29% | 20.8% |
| 2.4 | 1 | 3 | 12 | 0 | 3 | 12 | 0 | 840 | 37% | 29% | 33.4% |
| 2 | 2.6 | 6 | 4 | 0 | 4 | 12 | 0 | 840 | 46% | 27% | 30.6% |
| 2.4 | 1.4 | 3 | 12 | 0 | 2 | 12 | 0 | 840 | 35% | 29% | 32.8% |
| 2 | 3 | 1 | 2 | 0 | 4 | 12 | 0 | 860 | 99% | 29% | 24.0% |
| 2 | 3 | 6 | 4 | 0 | 4 | 12 | 0 | 840 | 45% | 26% | 31.0% |
| 2.4 | 1.6 | 3 | 12 | 0 | 3 | 12 | 0 | 840 | 36% | 28% | 34.0% |
| 2.8 | 3 | 3 | 8 | 0 | 0 | 12 | 0 | 860 | 46% | 29% | 28.8% |
| 2.2 | 0.4 | 5 | 6 | 0 | 4 | 12 | 0 | 860 | 33% | 30% | 29.6% |
| 2.2 | 2.3 | 3 | 12 | 0 | 1 | 12 | 0 | 840 | 30% | 30% | 32.4% |
| 2.2 | 0.6 | 4 | 6 | 0 | 4 | 12 | 0 | 840 | 33% | 27% | 28.8% |
| 2.2 | 0.8 | 1 | 4 | 0 | 4 | 12 | 0 | 840 | 35% | 29% | 24.0% |
| 3 | 0.4 | 3 | 12 | 0 | 0 | 12 | 0 | 860 | 41% | 28% | 30.4% |
| 2.2 | 0.8 | 6 | 6 | 0 | 4 | 12 | 0 | 840 | 34% | 25% | 31.0% |
| 2.2 | 1 | 1 | 8 | 0 | 4 | 12 | 0 | 840 | 35% | 25% | 28.2% |
| 2.2 | 1 | 3 | 6 | 0 | 4 | 12 | 0 | 840 | 35% | 25% | 28.2% |
| 2.4 | 2.6 | 0 | 12 | 0 | 3 | 12 | 0 | 860 | 35% | 29% | 32.0% |
| 2.2 | 1.2 | 1 | 6 | 0 | 4 | 12 | 0 | 840 | 35% | 25% | 26.4% |
| 2.4 | 2.8 | 2 | 10 | 0 | 2 | 12 | 0 | 860 | 33% | 29% | 31.2% |
| 2.2 | 1.2 | 5 | 4 | 0 | 4 | 12 | 0 | 840 | 35% | 28% | 28.4% |
| 3 | 1 | 1 | 2 | 0 | 0 | 12 | 0 | 860 | 61% | 28% | 19.0% |
| 2.2 | 1.4 | 2 | 8 | 0 | 4 | 12 | 0 | 840 | 34% | 24% | 29.6% |
| 2.4 | 3 | 2 | 10 | 0 | 2 | 12 | 0 | 860 | 33% | 29% | 31.4% |
| 2.2 | 1.6 | 0 | 2 | 0 | 4 | 12 | 0 | 860 | 56% | 30% | 21.8% |
| 3 | 1.2 | 1 | 12 | 0 | 0 | 12 | 0 | 860 | 40% | 29% | 29.2% |
| 2.4 | 3 | 2 | 10 | 0 | 3 | 12 | 0 | 860 | 34% | 28% | 32.4% |
| 2.2 | 1.6 | 6 | 4 | 0 | 4 | 12 | 0 | 840 | 39% | 27% | 29.8% |
| 2.2 | 1.8 | 3 | 10 | 0 | 4 | 12 | 0 | 820 | 31% | 23% | 33.0% |
| 2.2 | 2 | 0 | 2 | 0 | 4 | 12 | 0 | 860 | 72% | 29% | 22.2% |
| 3 | 1.6 | 3 | 10 | 0 | 0 | 12 | 0 | 860 | 40% | 28% | 29.6% |
| 2.2 | 2 | 6 | 6 | 0 | 4 | 10 | 0 | 840 | 34% | 29% | 30.2% |
| 3 | 1.8 | 4 | 2 | 0 | 0 | 12 | 0 | 860 | 43% | 29% | 22.8% |

TABLE 17-continued

Example Compositions and Thermodynamic Criteria

| B | C | Cr | Mn | Mo | Nb | Ni | Si | 1 | 2 | 3 | 4 |
|---|---|---|---|---|---|---|---|---|---|---|---|
| 3 | 2 | 1 | 12 | 0 | 0 | 12 | 0 | 860 | 39% | 28% | 30.0% |
| 2.2 | 2.4 | 6 | 6 | 0 | 4 | 12 | 0 | 840 | 34% | 22% | 32.6% |
| 3 | 2.2 | 1 | 12 | 0 | 0 | 12 | 0 | 860 | 39% | 27% | 30.2% |
| 2.6 | 0.8 | 3 | 10 | 0 | 3 | 12 | 0 | 860 | 39% | 30% | 31.4% |
| 3 | 2.4 | 1 | 4 | 0 | 0 | 12 | 0 | 860 | 79% | 28% | 22.4% |
| 3 | 2.4 | 4 | 2 | 0 | 0 | 12 | 0 | 860 | 55% | 28% | 23.4% |
| 3 | 2.6 | 0 | 2 | 0 | 0 | 12 | 0 | 860 | 81% | 25% | 19.6% |
| 3 | 2.6 | 2 | 12 | 0 | 0 | 12 | 0 | 860 | 38% | 25% | 31.6% |
| 2.6 | 1.2 | 2 | 12 | 0 | 3 | 12 | 0 | 840 | 39% | 28% | 32.8% |
| 3 | 2.8 | 1 | 6 | 0 | 0 | 12 | 0 | 860 | 75% | 29% | 24.8% |
| 3 | 2.8 | 4 | 4 | 0 | 0 | 12 | 0 | 860 | 44% | 29% | 25.8% |
| 3 | 3 | 0 | 6 | 0 | 0 | 12 | 0 | 860 | 79% | 28% | 24.0% |

Thus, as shown in the above Table 17, the thermal wire composition can have the following compositional range, in wt. % with Fe:
B—0 to 5 (or about 0 to about 5)
C—0 to 5 (or about 0 to about 5)
Cr—0 to 13 (or about 0 to about 13)
Mn—0 to 12 (or about 0 to about 12)
Mo—0 to 12 (or about 0 to about 12)
Nb—0 to 15 (or about 0 to about 15)
Ni—4 to 19 (or about 4 to about 19)
Si—0 to 3 (or about 0 to about 3)

Further, the thermal wire composition can have the following thermodynamic criteria ranges:

FCC-BCC Transition Temperature in K—500 to 900 (or about 500 to about 900)

Sum of Hard Phase in mole %—30 to 99 (or about 30 to about 99)

Sum of Magnetic Phases at 500° C. in volume %—0 to 50 (or about 0 to about 50)

Solute Element Content in wt. %—13.4 to about 42.0 (or about 13.4 to about 42.0)

The disclosed alloys can incorporate the above elemental constituents to a total of 100 wt. %. In some embodiments, the alloy may include, may be limited to, or may consist essentially of the above named elements. In some embodiments, the alloy may include 2% or less of impurities. Impurities may be understood as elements or compositions that may be included in the alloys due to inclusion in the feedstock components, through introduction in the manufacturing process.

Further, the Fe content identified in all of the compositions described in the above tables may be the balance of the composition as indicated above, or alternatively, the balance of the composition may comprise Fe and other elements. In some embodiments, the balance may consist essentially of Fe and may include incidental impurities. In some embodiments, the compositions can have at least 60 wt. % Fe (or at least about 60 wt. % Fe). In some embodiments, the composition can have between 60 and 80 wt. % Fe (or between about 60 and about 80 wt. % Fe).

Embodiments of the disclosed alloys can be described by elemental ranges that make up a reasonable manufacturing tolerance when producing this alloy in the form of 1/16" cored wire.

For all of the compositions discussed above, in some embodiments the compositions can be for a cored wire and include both the outer sheath and the powder within the sheath.

In some embodiments, the alloys disclosed herein can be readable. In some embodiments, the alloys disclosed herein can be fully readable.

Applications and Processes for Use:

Embodiments of the alloys described in this patent can be used in a variety of applications and industries. Some non-limiting examples of applications of use include:

Surface Mining applications include the following components and coatings for the following components: Wear resistant sleeves and/or wear resistant hardfacing for slurry pipelines, mud pump components including pump housing or impeller or hardfacing for mud pump components, ore feed chute components including chute blocks or hardfacing of chute blocks, separation screens including but not limited to rotary breaker screens, banana screens, and shaker screens, liners for autogenous grinding mills and semi-autogenous grinding mills, ground engaging tools and hardfacing for ground engaging tools, drill bits and drill bit inserts, wear plate for buckets and dumptruck liners, heel blocks and hardfacing for heel blocks on mining shovels, grader blades and hardfacing for grader blades, stacker reclaimers, sizer crushers, general wear packages for mining components and other comminution components.

Upstream oil and gas applications include the following components and coatings for the following components: Downhole casing and downhole casing, drill pipe and coatings for drill pipe including hardbanding, mud management components, mud motors, fracking pump sleeves, fracking impellers, fracking blender pumps, stop collars, drill bits and drill bit components, directional drilling equipment and coatings for directional drilling equipment including stabilizers and centralizers, blow out preventers and coatings for blow out preventers and blow out preventer components including the shear rams, oil country tubular goods and coatings for oil country tubular goods.

Downstream oil and gas applications include the following components and coatings for the following components: Process vessels and coating for process vessels including steam generation equipment, amine vessels, distillation towers, cyclones, catalytic crackers, general refinery piping, corrosion under insulation protection, sulfur recovery units, convection hoods, sour stripper lines, scrubbers, hydrocarbon drums, and other refinery equipment and vessels.

Pulp and paper applications include the following components and coatings for the following components: Rolls used in paper machines including yankee dryers and other dryers, calendar rolls, machine rolls, press rolls, digesters, pulp mixers, pulpers, pumps, boilers, shredders, tissue machines, roll and bale handling machines, doctor blades, evaporators, pulp mills, head boxes, wire parts, press parts, M.G. cylinders, pope reels, winders, vacuum pumps, deflakers, and other pulp and paper equipment, Power generation applications include the following components and coatings for the following components: boiler tubes, precipitators, fireboxes, turbines, generators, cooling towers, condensers, chutes and troughs, augers, bag houses, ducts, ID fans, coal piping, and other power generation components.

Agriculture applications include the following components and coatings for the following components: chutes, base cutter blades, troughs, primary fan blades, secondary fan blades, augers and other agricultural applications.

Construction applications include the following components and coatings for the following components: cement chutes, cement piping, bag houses, mixing equipment and other construction applications Machine element applications include the following components and coatings for the following components: Shaft journals, paper rolls, gear boxes, drive rollers, impellers, general reclamation and dimensional restoration applications and other machine element applications Steel applications include the following components and coatings for the following components: cold rolling mills, hot rolling mills, wire rod mills, galvanizing lines, continue pickling lines, continuous casting rolls and other steel mill rolls, and other steel applications.

The alloys described in this patent can be produced and or deposited in a variety of techniques effectively. Some non-limiting examples of processes include:

Thermal spray process including those using a wire feedstock such as twin wire arc, spray, high velocity arc spray, combustion spray and those using a powder feedstock such as high velocity oxygen fuel, high velocity air spray, plasma spray, detonation gun spray, and cold spray. Wire feedstock can be in the form of a metal core wire, solid wire, or flux core wire. Powder feedstock can be either a single homogenous alloy or a combination of multiple alloy powder which result in the desired chemistry when melted together.

Welding processes including those using a wire feedstock including but not limited to metal inert gas (MIG) welding, tungsten inert gas (TIG) welding, arc welding, submerged arc welding, open arc welding, bulk welding, laser cladding, and those using a powder feedstock including but not limited to laser cladding and plasma transferred arc welding. Wire feedstock can be in the form of a metal core wire, solid wire, or flux core wire. Powder feedstock can be either a single homogenous alloy or a combination of multiple alloy powder which result in the desired chemistry when melted together.

Casting processes including processes typical to producing cast iron including but not limited to sand casting, permanent mold casting, chill casting, investment casting, lost foam casting, die casting, centrifugal casting, glass casting, slip casting and process typical to producing wrought steel products including continuous casting processes.

Post processing techniques including but not limited to rolling, forging, surface treatments such as carburizing, nitriding, carbonitriding, heat treatments including but not limited to austenitizing, normalizing, annealing, stress relieving, tempering, aging, quenching, cryogenic treatments, flame hardening, induction hardening, differential hardening, case hardening, decarburization, machining, grinding, cold working, work hardening, and welding.

From the foregoing description, it will be appreciated that an inventive thermal spray product and methods of use are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A thermal spray wire comprising:
a powder core surrounded by a sheath, wherein the core and the sheath have a combined iron-based composition comprising, in wt. %:
C: 4.76 to 5;
Cr: 11.9 to 19;
Ni: 17 to 19;
V: greater than 0 and less than or equal to 2;
Al: greater than 0 and less than or equal to 2;
Mn: greater than 0 and less than or equal to 1.5;
Si: greater than 0 and less than or equal to 0.5; and
Fe: balance,
wherein upon melting and solidifying, the thermal spray wire forms an alloy including a total volume fraction of magnetic phases at 500° C. of below 30%.

2. The thermal spray wire of claim 1, wherein upon melting and solidifying, the thermal spray wire forms the alloy further comprising:
an FCC-BCC transition temperature at or below 950K; and
one or more hard phases selected from the group consisting of carbides, borides and aluminides, wherein the hard phases are present at a hard phase fraction sum of 20 mol % or greater.

3. The thermal spray wire of claim 1, wherein the combined composition comprises, in weight percentages:
Mn: 0.93 to 1.13 and Si: 0.28 to 0.34.

4. The thermal spray wire of claim 1, wherein the combined composition comprises, in weight percentages:
Mn: 0.90 to 1.10 and Si: 0.28 to 0.34.

5. The thermal spray wire of claim 1, wherein the combined composition comprises, in weight percentages:
Cr: 11.97 to 14.63, Mn: 0.90 to 1.10 and Si: 0.21 to 0.25.

6. The thermal spray wire of claim 1, wherein the combined composition comprises, in weight percentage: V: 1.2 to 2.

7. The thermal spray wire of claim 1, wherein the combined composition comprises inevitable impurities.

8. A thermal spray wire comprising:
a powder core surrounded by a sheath, wherein the core and the sheath have a combined iron-based composition, in wt. %:
C: 4.75 to 5;
Cr: 17 to 19;
Ni: greater than 15 and less than or equal to 19;
V: 1.25 to 2.75;
Al: 0.75 to 2.75;
Mn: 0.25 to 2.25;
Si: 0.1 to 0.9; and
Fe: balance,
wherein upon melting and solidifying, the thermal spray wire forms an alloy including a total volume fraction of magnetic phases at 500° C. of below 30%.

9. The thermal spray wire of claim 8, wherein the thermal spray wire is further configured to form the alloy comprising:
an FCC-BCC transition temperature at or below 950K; and
one or more hard phases selected from the group consisting of carbides, borides and aluminides, wherein the hard phases are present at a hard phase fraction sum of 20 mol % or greater.

10. The thermal spray wire of claim 8, wherein the combined composition comprises, in weight percentages:
Mn: 0.93 to 1.13, Ni: 15.48 to 18.92, Si: 0.28 to 0.34, V: 1.71 to 2.09 and Al: 1.73 to 2.11.

11. The thermal spray wire of claim 8, wherein the combined composition comprises, in weight percentages:
Mn: 0.90 to 1.10, Ni: 15.3 to 18.7, Si: 0.28 to 0.34, V: 1.71 to 2.09 and Al: 1.71 to 2.09.

12. The thermal spray wire of claim 8, wherein the combined composition comprises, in weight percentages:
Mn: 0.90 to 1.10 and Si: 0.21 to 0.25.

13. The thermal spray wire of claim 8, wherein the combined composition comprises, in wt. %: V: 1.25 to 2.

* * * * *